(12) United States Patent
Tasaka et al.

(10) Patent No.: US 7,916,591 B2
(45) Date of Patent: Mar. 29, 2011

(54) RECORDABLE OPTICAL DISC, OPTICAL DISC RECORDING APPARATUS, OPTICAL DISC REPRODUCTION APPARATUS, AND METHOD FOR RECORDING DATA ONTO RECORDABLE OPTICAL DISC

(75) Inventors: Shuichi Tasaka, Takarazuka (JP); Mamoru Shoji, Sakai (JP)

(73) Assignee: Panasonic Corporation, Osaka (JP)

( * ) Notice: Subject to any disclaimer, the term of this patent is extended or adjusted under 35 U.S.C. 154(b) by 329 days.

(21) Appl. No.: 12/178,025

(22) Filed: Jul. 23, 2008

(65) Prior Publication Data
US 2008/0304380 A1 Dec. 11, 2008

Related U.S. Application Data

(60) Division of application No. 11/357,519, filed on Feb. 17, 2006, now Pat. No. 7,414,936, which is a continuation of application No. 10/312,827, filed as application No. PCT/JP02/04007 on Apr. 22, 2002, now Pat. No. 7,068,579.

(30) Foreign Application Priority Data

Apr. 27, 2001 (JP) ................................ 2001-133006
Dec. 14, 2001 (JP) ................................ 2001-381338

(51) Int. Cl.
*G11B 7/00* (2006.01)
(52) U.S. Cl. .................................................. 369/47.53
(58) Field of Classification Search .................. 369/47.5, 369/47.51, 47.52, 47.53, 116, 275.3, 47.27, 369/47.54, 47.55
See application file for complete search history.

(56) References Cited

U.S. PATENT DOCUMENTS

| | | | |
|---|---|---|---|
| 5,457,674 A | 10/1995 | Watanabe et al. | |
| 5,898,655 A | 4/1999 | Takahashi | |
| 6,442,119 B1 | 8/2002 | Sunagawa | |
| 6,487,152 B1 | 11/2002 | Nakamura | |
| 6,580,684 B2 | 6/2003 | Miyake et al. | |
| 6,704,269 B1 | 3/2004 | Ogawa | |
| 6,711,107 B2 * | 3/2004 | Chao et al. ................. | 369/47.52 |
| 6,982,939 B2 * | 1/2006 | Powelson et al. .......... | 369/47.53 |

FOREIGN PATENT DOCUMENTS

| | | |
|---|---|---|
| EP | 0557584 A1 | 9/1993 |
| EP | 0802531 A2 | 10/1997 |
| EP | 1026669 A2 | 8/2000 |
| JP | 4114318 A | 4/1992 |
| JP | 5314479 A | 11/1993 |

(Continued)

OTHER PUBLICATIONS

Notification of Reason(s) for Refusal issued Mar. 17, 2009 in corresponding Japanese Patent Application No. 2002-586336.

(Continued)

*Primary Examiner* — Nabil Z Hindi
(74) *Attorney, Agent, or Firm* — Panitch Schwarze Belisario & Nadel LLP

(57) ABSTRACT

An optical disk, which has a storage area is disclosed. Data is recorded and reproduced by emitting laser light into the storage area on the optical disk Power condition information and recording write strategy information which correspond to recording speed information for recording and reproducing data are recorded. The recording speed information is indicative of constant linear velocity and different linear velocity from the constant linear velocity.

6 Claims, 25 Drawing Sheets

FOREIGN PATENT DOCUMENTS

| | | |
|---|---|---|
| JP | 9-016964 A | 1/1997 |
| JP | 10-106008 A | 4/1998 |
| JP | 5-242480 A | 9/1998 |
| JP | 11-513521 T | 11/1999 |
| JP | 2000-293857 A | 10/2000 |
| JP | 2001101660 A | 4/2001 |
| JP | 200011382 A | 7/2001 |
| JP | 2002-245625 A | 8/2002 |
| WO | 97/13244 A1 | 4/1997 |

OTHER PUBLICATIONS

Decision to Dismiss the Amendment issued Jun. 8, 2009 in corresponding Japanese Patent Application No. 2002-586336.

* cited by examiner (a)

(b)

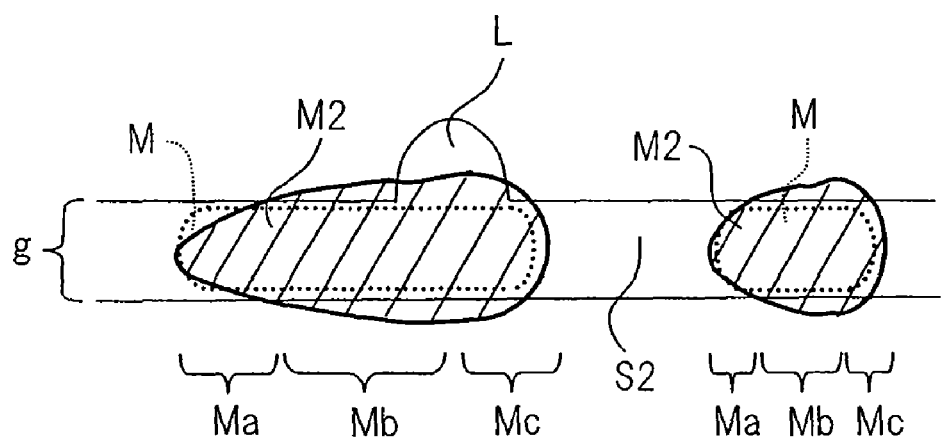
F I G. 2 5

RECORDABLE OPTICAL DISC, OPTICAL DISC RECORDING APPARATUS, OPTICAL DISC REPRODUCTION APPARATUS, AND METHOD FOR RECORDING DATA ONTO RECORDABLE OPTICAL DISC

CROSS-REFERENCE TO RELATED APPLICATIONS

This application is a divisional application of U.S. patent application Ser. No. 11/357,519, filed Feb. 17, 2006, which is a continuation of U.S. patent application Ser. No. 10/312,827, filed Dec. 30, 2002, now U.S. Pat. No. 7,068,579, issued Jun. 27, 2006, which in turn is a U.S. National Phase of PCT/JP2002/004007 filed Apr. 22, 2002, the disclosures of which are incorporated herein by reference.

BACKGROUND OF THE INVENTION

The present invention relates to recordable optical disks and optical disk recording and reproducing apparatuses and, in particular, a method for determining a write strategy and a recording power level.

Optical information recording technology, i.e., the technology for recording data onto recordable optical disks has remarkably advanced in recent years. With the advance of the technology, various types of optical disk recording and reproducing apparatuses have been developed. In particular, the applications to storage devices external to computers, such as DVD-RAM drives, have come into widespread use.

Here, optical information recording technology especially refers to the following recording technology. An optical head (which is also referred to as a pickup) radiates the recording layer of a recordable optical disk with laser light. The portions of the recording layer radiated with the laser light change the properties, thereby changing the optical reflectances (which are hereafter referred to as reflectances). Accordingly, changes in radiation power of the laser light between two levels essentially achieve changes in reflectance of the recording layer between two values from area to area. Portions with the low and high reflectances in the recording layer are referred to as recording marks and recording spaces, respectively. According to the optical information recording technology, data is recorded as a sequence of recording marks and recording spaces on the recordable optical disk. For example, in mark-edge recording scheme, each boundary between the recording marks and the recording spaces (namely a mark edge) represents a pulse edge of a digital signal, while each length of the recording marks represents a pulse width of the digital signal.

Recordable optical disks are classified as write-once type or rewritable type.

A write-once optical disk refers to an optical disk onto which data can be recorded only once. The write-once optical disks include CD-Rs (Recordable) and DVD-Rs.

In the write-once optical disks, recording marks are formed as follows. A recording layer contains organic dyes. When the recording layer is radiated with laser light of a predetermined power, the organic dyes are decomposed and thereby the reflectance decreases. Thus, portions of the recording layer radiated with the laser light form recording marks.

The write-once optical disks allow data recording only once for the following reason. The formation of the recording marks generates large amounts of heat at the portions of the recording layer radiated with the laser light. The heat deforms the likes of plastic portions of the surroundings. Since the deformation is irreversible, the portions cannot be restored to the original state before radiated with the laser light. Therefore, the write-once optical disks allow data recording only once.

A rewritable optical disk refers to an optical disk on which data can be recorded and erased multiple times. The rewritable optical disks include CD-RWs (ReWritable), DVD-RAMs, DVD-RWs, DVD+RWs, and so on.

In phase-change types of the rewritable optical disks, recording marks are formed as follows. A recording layer contains alloys, which have two types of solid phases, a crystal phase and an amorphous phase. The reflectance of the recording layer is high in the crystal phase and low in the amorphous phase. Accordingly, the portions in the amorphous phase of the recording layer form recording marks. The formation of the recording marks, i.e., the transition from the crystal phase to the amorphous phase is achieved as follows. The recording layer is radiated with pulses of laser light of a rather high power level. Thereby, small areas of the recording layer are instantaneously heated to a temperature equal to or exceeding the melting point, and then, rapidly cooled to a temperature equal to or below the glass transition point. As a result, the small areas of the recording layer undergo the transition to the amorphous phase.

The phase-change types of the rewritable optical disks allow existing recording marks to be erased as follows. The recording marks are portions in the amorphous phase of the recording layer as described above. Accordingly, a transition from the amorphous phase to the crystal phase within the areas of the recording marks may erase the recording marks. The deletion of the recording marks, i.e., the transition from the amorphous phase to the crystal phase is achieved as follows. The recording layer of the rewritable optical disk during the revolution is radiated for a relatively long time with laser light of a relatively low power level. Thereby, large areas of the recording layer are once heated to a temperature beyond the glass transition point and below the melting point, and then, cooled with a relatively slow pace. As a result, the large areas of the recording layer undergo the transition to the crystal phase.

Actual data recordings onto the phase-change types of the rewritable optical disks use the laser light emitted with changes in power between the above-mentioned high and low levels. Thereby, the deletions and formations of the recording marks are alternately performed, and an overwriting of data can be achieved on the optical disk.

A known apparatus for recording and reproducing data onto and from the above-mentioned recordable optical disks is, for example, an optical disk recording and reproducing apparatus disclosed in Japanese Laid-Open Patent Publication No. 2000-200418.

FIG. 23 is a block diagram showing an example of the prior art optical disk recording and reproducing apparatus.

Regarding the prior art optical disk recording and reproducing apparatus, the following describes an example of its reproducing block.

A spindle motor 14 revolves an optical disk D around its center axis.

In a data reproducing, a pickup 1 radiates the optical disk D with laser light and converts the reflected light into an analog signal as follows. A semiconductor laser 1a emits laser light at a predetermined power level. The power level is referred to as a reproducing power level. Since the reproducing power level is sufficiently low, the laser light causes no change in the property of the recording layer of the optical disk D. The laser light R1 emitted by the semiconductor laser 1a passes through a collimator lens 1b, a splitter 1c, and an objective lens 1d in this order, thereby focused and reflected within the optical disk D. The reflected laser light R2 passes through the objective lens 1d, the splitter 1c, and a detection lens 1e in this order, thereby focused onto a photodetector 1f. The photodetector 1f detects and converts the reflected laser light R2 into an analog signal d1. Then, the amplitude of the analog signal d1 is substantially proportional to the intensity of the reflected laser light R2.

A head amplifier 2 receives and amplifies the analog signal d1 from the pickup 1. An equalizer 3 performs shaping on the analog signal d2 amplified by the head amplifier 2. A binarizer 4 compares the analog signal d3 undergoing the shaping of the equalizer 3 with a predetermined threshold value, and binarizes the analog signal d3 with respect to the threshold value, thereby converting the analog signal d3 undergoing the shaping into a digital signal d4. A phase locked loop (PLL) 5 synchronizes the digital signal d4 and a reference clock signal d5a, and then a digital signal d5 is decoded into data.

Regarding the prior art optical disk recording and reproducing apparatus, the following describes an example of its recording block.

A recording-pattern-determination section 8 determines a recording pattern corresponding to target data of recording. The recording pattern is a rectangular pulse train representing a sequence of recording marks and recording spaces to be written onto the optical disk D. In the recording pattern, a pulse width, i.e., an assertion time, represents the length of one of the recording marks (which is hereafter referred to as a mark length). In addition, an interval from the rear end of a pulse to the front end of the next pulse (which is hereafter referred to as a negation time) represents the length of one of the recording spaces (which is hereafter referred to as a space length).

A recording-pulse-determination section 9 determines recording pulses d9 based on the recording pattern d8 determined by the recording-pattern-determination section 8. Here, the recording pulses d9 are rectangular pulses, and the pulse widths and intervals represent the pulse widths and intervals of the laser pulses that the semiconductor laser 1a should emit. The recording pattern d8 is converted into the recording pulses d9 according to fixed conversion criteria. In particular, one pulse in the recording pattern d8 is generally divided into more than one of the recording pulses d9. Then, the pulse width of the recording pulses d9 is generally narrower than the pulse width of the recording pattern d8. Thereby, an actual value of the mark length does not exceed the width of the corresponding pulse in the recording pattern d8, when heat resulting from the laser light is diffused outside the radiated area. A set of the above-mentioned conversion criteria is referred to as a write strategy, or alternatively, a recording pulse condition or a recording pulse structure. The detail of the write strategy is described later.

A recording-power-determination section 12, at the time of a data recording, determines laser pulse heights of the semiconductor laser 1a, i.e., power levels of the semiconductor laser 1a at a constant level. The power level determined is referred to as a recording power level. The recording power level d12 is sent out to a laser driver 13 along with the recording pulses d9.

The laser driver 13 controls a driving current d13 in the semiconductor laser 1a according to the recording pulses d9 and the recording power level d12, and, especially during assertion times of the recording pulses d9, conducts an amount of the driving current d13 corresponding to the recording power level d12. Thereby, the semiconductor laser 1a emits laser pulses substantially identical in shape with the recording pulses d9 at the recording power level d12.

The actual shapes of the recording marks are not uniquely determined only by the recording pulses and the recording power levels. For example, fluctuations of an ambient temperature causes fluctuations of the areas changing into the amorphous phase in the recording layer of the optical disk D, since the cooling rate of the recording layer depends on the ambient temperature. Furthermore, the wavelength of laser light of a semiconductor laser fluctuates in a range substantially proportional to the range of fluctuations of temperature, and varies around a standard value from one device to another. In the case of DVD-Rs, for example, the fluctuations of wavelength of the laser light change the amounts of energy absorbed by the recording layer, since light absorption characteristics of the organic dye depend on the wavelength of the light absorbed. In addition, the likes of the structures of optical disks vary from one product to another. Such variables cause distortions of the recording marks. Accordingly, the formation of the recording marks, especially the positioning of the mark edges is performed with an insufficient accuracy when the recording pulses and the recording power levels are determined merely according to standards of write strategy and recording power condition. This causes high error rates of data actually recorded.

The prior art optical disk recording and reproducing apparatuses corrects the write strategy and calibrates the recording power levels in a manner appropriate to the optical disks and the apparatuses, in order to improve the accuracy of formation of the recording marks. The following describes an example of a write-strategy-correction block and a recording-power-calibration block in the prior art optical disk recording and reproducing apparatus.

A β-value measurement section 11 measures the β value of the analog signal d3 undergoing the shaping of the equalizer 3. The β value of an analog signal is defined as the formula: $\beta=(a+b)/(a-b)$, using the maximum level a and the minimum level b within one period of the analog signal. The β value of the analog signal is equal to the mesial level of the waveform $((a+b)/2)$ normalized with the amplitude $(a-b)$.

The β value of the analog signal is a parameter used as one of the determinants of the recording power levels of the semiconductor laser 1a as follows. The binarizer 4 binarizes the analog signal d1 reproduced by the pickup 1 with respect to a predetermined threshold value. The error rate of digital data rises in the binarization, when the mesial level of the waveform of the analog signal d1 largely shifts from the threshold value and then the β value largely shifts from a target value. Accordingly, reduction of the error rate equal to or below a predetermined, acceptable limit requires the β value of the analog signal d1 within acceptable limits. Since the reflectances and shapes of the recording marks substantially determine the β value of the analog signal d1, the recording power levels of the semiconductor laser 1a determines the β value. Conversely, a fixed β value of the analog signal d1 determines corresponding levels of the recording power. A recording power condition refers to correspondences between parameters representing the quality of the analog signal and the recording power levels, such as the correspondence between the β value of the analog signal d1 and the recording power levels.

On an optical disk D, histories of the write strategies and the recording power conditions used in the previous data recordings are stored, together with a standard write strategy and a standard recording power condition defined by specifications. A write strategy decoder 60 decodes a digital signal d5 received from the PLL 5 into a write strategy d6 and provides it to a write-strategy-correction section 7. A recording-power-condition decoder 100 decodes the digital signal d5 received from the PLL 5 into a recording power condition d10 and provides it to a recording-power-determination section 12.

An edge shift detector 20 receives a digital signal d4 from the binarizer 4, and a clock signal d5a from the PLL 5. Then, the edge shift detector 20 detects front-end edge shifts d20a and rear-end edge shifts d20b on the digital signal d4, through a comparison between the digital signal d4 and the clock signal d5a. Here, the edge shifts refer to phase differences between the digital signal d4 and the clock signal d5a, which is expressed in terms of time. The detected edge shifts d20a and d20b are provided to the write-strategy-correction section 7.

The write-strategy-correction section 7 receives the write strategy d6 from the write strategy decoder 60 and stores it in an inside memory. In a correction to the write strategy d6 stored, the write-strategy-correction section 7 compares the front-end edge shifts d20a and the rear-end edge shifts d20b of the digital signal d4 with predetermined, acceptable limits. The section brings results of the comparisons into correspondence with the write strategy d6 stored and stores the results, then correcting the write strategy d6 stored with predetermined correction values. The section stores the write strategy d7 corrected and provides it for the recording-pulse-determination section 9.

The following describes a relation between a recording pattern and recording pulses. FIG. 7 is a schematic diagram showing a relation between a recording pattern and recording pulses when a DVD-R is used as the optical disk D. The parts (a)-(c) of FIG. 7 show waveforms of a recording pattern, recording pulses, and laser pulses of the semiconductor laser 1a, respectively. The part (d) of FIG. 7 shows recording marks M and recording spaces S formed in the recording layer of the optical disk D by the laser pulses shown in (c) of FIG. 7. Here, let T denotes the unit of the pulse widths. The unit length 1 T corresponds to a clock period. Each of the pulse widths and intervals in the recording pattern is set substantially equal to an integral multiple of the clock period. Furthermore, a recording speed of FIG. 7 equals a standard reproducing speed (namely single speed).

When the recording layer of the DVD-R is radiated with laser light of the semiconductor laser 1a, heat resulting from the laser light is diffused from the radiated area into the surroundings. The heat propagates especially along a groove of the DVD-R. Accordingly, laser pulses substantially identical in shape with the recording pattern actually form the recording marks longer than the corresponding portions of the recording pattern. When the heat further reaches the preceding or subsequent recording mark through the recording spaces, the preceding or subsequent recording mark is distorted. In particular, the mark edges shift from the positions corresponding to the recording pattern. The distortions cause errors in the data recording.

In order to avoid such distortions, the prior art optical disk recording and reproducing apparatus converts the recording pattern into the following recording pulses. In particular, one pulse in the recording pattern is generally divided into two or more of the recording pulses. Then, each width of the recording pulses is narrower than the pulse widths of the recording pattern. Thereby, the amount of heat delivered from the laser light to the recording layer of the DVD-R is reduced in the formation of one of the recording marks.

Each pulse in the recording pattern has a width integral times as long as the clock period T. Here, the minimum pulse width in the recording pattern is triple the clock period T.

A top pulse refers to the first pulse in a train of the recording pulses corresponding to a pulse in the recording pattern. The front end of the top pulse is set at a point corresponding to the front end of the pulse in the recording pattern with a lag of a predetermined length (which is hereafter referred to as a front-end lag). The rear end of the top pulse is set at a point the minimum pulse width 3 T behind the front end of the pulse in the recording pattern. If the pulse in the recording pattern is a pulse of the minimum width, then the rear end of the pulse agrees with the rear end of the top pulse. Thus, the top pulse has a width narrower than the minimum pulse width 3 T in the recording pattern.

Multi-pulses, i.e., a pulse train having a period equal to the clock period T are set during the interval from the rear end of the top pulse to a point corresponding to the rear end of the pulse in the recording pattern. The rear extremity of the multi-pulses agrees with the rear end of the pulse in the recording pattern since each pulse width of the recording pattern is an integral multiple of the clock period T. The multi-pulses have a constant pulse width and a constant pulse interval.

Each pulse in the recording pattern is converted into two or more of the recording pulses generally including a top pulse and multi-pulses as described above. In particular, each pulse width of the top pulse and the multi-pulses is narrower than that of the corresponding pulse in the recording pattern. Thereby, the amount of heat delivered from the laser light to the recording layer of the DVD-R is reduced in the formation of one of the recording marks. This prevents excessively large size of the recording marks from appearing, and excessive amounts of heat from being diffused into the adjacent recording marks.

The front-end lags of the top pulses and the pulse widths of the multi-pulses in the recording pulses are further optimized for proper correspondences between ends of the pulses in the recording pattern and edges of the recording marks as follows.

For example, a recording pattern is assumed as shown in (a) of FIG. 7. The recording pattern consists of a first pulse P1 having a width of 7 T, a pulse separation having a length of 3 T, and a second pulse P2 having a width of 3 T, in this order. Recording pulses shown in (b) of FIG. 7 correspond to the recording pattern.

The portion of the recording pulses corresponding to the first pulse P1 in the recording pattern consists of a first top pulse P10 and multi-pulses P11.

The first top pulse P10 has a width $Tt1 = p1 \times T$ (p1: a positive rational number). The front end P10a of the first top pulse P10 is set at a point corresponding to the front end P1a of the first pulse P1 in the recording pattern with a front-end lag $F1 = f1 \times T$ (f1: a positive rational number). On the other hand, the rear end P10b of the first top pulse P10 is set at a point corresponding to the front end P1a of the first pulse P1 in the recording pattern with a lag of 3 T. Thus, $f1 + p1 = 3$.

The multi-pulses P11 have a constant period of 1 T. Each pulse of the multi-pulses P11 has a constant width $Tm = m \times T$ (m: a positive rational number). The interval from the rear end P10b of the first top pulse P10 to the front extremity P11a of the multi-pulses P11 and negation times in the multi-pulses P11 each have a constant value $Sm = s \times T$ (s: a positive rational number). Thus, $m + s = 1$. The rear extremity P11b of the multi-pulses P11 agrees with the rear end P1b of the first pulse P1 in the recording pattern.

The portion corresponding to the second pulse P2 in the recording pattern consists of a second top pulse P20 only. The second top pulse P20 has a width $Tt2 = p2 \times T$ (p2: a positive rational number). The front end P20a of the second top pulse P20 is set at a point corresponding to the front end P2a of the second pulse P2 in the recording pattern with a front-end lag $F2 = f2 \times T$ (f2: a positive rational number). The rear end P20b of the second top pulse P20 agrees with the rear end P2b of the second pulse P2 in the recording pattern. Thus, f2+p2=3.

The semiconductor laser 1a emits laser pulses substantially identical in waveform with the above-mentioned recording pulses. The part (c) of FIG. 7 shows the waveform of the laser pulses. The height H0 of the laser pulses represents the recording power level of the semiconductor laser 1a. The radiation of the laser pulses forms a train of recording marks M and recording spaces S into the recording layer of the optical disk D as shown in (d) of FIG. 7.

When the front-end lag of the top pulse and the pulse width of the multi-pulses in the recording pulses are optimum, the train of recording marks and recording spaces properly corresponds to the recording pattern as shown in (a) and (d) of FIG. 7. More specifically, the front-end lags f1 and f2 and the pulse width m of the multi-pulses P11, which are expressed in the unit of the clock period T, are fixed at respective optimum values selected among predetermined values as follows.

The optimum pulse widths of the multi-pulses are set in advance for respective widths of the corresponding pulses in the recording pattern (namely mark lengths). The set values are determined mainly for bringing the rear edges of the recording marks into good agreement with the rear ends of the pulses in the recording pattern. For example, a value corresponding to the mark length 7 T is selected among the set values as the pulse width m of the multi-pulses P11.

The optimum values of the front-end lags are set in advance for respective combinations of widths of the corresponding pulse in the recording pattern (namely mark lengths) and intervals between the front end of the pulse and the rear end of the preceding pulse (which are hereafter referred to as preceding space lengths), as shown in the following Table 1. The set values are determined mainly for bringing the front edges of the recording marks into good agreement with the front ends of the pulses in the recording pattern.

Table 1 is a list showing correspondences between the front-end lags Fij (i, j=3, ..., 5) and combinations of the mark lengths and the preceding space lengths.

TABLE 1

| | | MARK LENGTH | | |
|---|---|---|---|---|
| | | ≧5T | 4T | 3T |
| PRECEDING | ≧5T | F55 | F54 | F53 |
| SPACE | 4T | F45 | F44 | F43 |
| LENGTHS | 3T | F35 | F34 | F33 |

Here, each value of the front-end lags Fij (i, j=3, ..., 5) is expressed by a rational number in the unit of the clock period T. In FIG. 7, for example, the mark length and the preceding space length of the second pulse P2 in the recording pattern are both equal to 3 T. Then, the front-end lag F2 of the second top pulse P20 in the recording pulses is set at the value F33 corresponding to the combination of the mark length 3 T and the preceding space length 3 T according to Table 1.

In this description of the invention, the write strategy refers to the above-mentioned criteria on which to determine waveforms of the recording pulses corresponding to the recording pattern, especially positions of the ends of the recording pulses, based on the mark lengths and the space lengths in the recording pattern. For example, the write strategies for DVD-Rs and DVD-RWs are criteria on which to determine: (a) correspondences between the pulse widths of the multi-pulses of the recording pulses and the mark lengths in the recording pattern; and (b) correspondences between the front-end lags of the top pulses of the recording pulses and the combinations of the mark lengths and the preceding space lengths in the recording pattern as shown in Table 1. On the other hand, the write strategy for DVD-RAMs includes, in addition to the above-mentioned criteria for the front-end lags of the top pulses, another criteria on which to determine an amount by which the rear extremity of the multi-pulses or the rear end of the last pulse following the multi-pulses leads the rear end of the corresponding pulse in the recording pattern (namely rear-end leads).

The prior art optical disk recording and reproducing apparatus as shown in FIG. 23, at the beginning of a data recording, optimizes the write strategy and the recording power condition for the recording-pulse-determination section 9 and the recording-power-determination section 12, respectively, as follows.

On the optical disk D, the standard write strategy and the standard recording power condition are stored in advance, and, in addition, the histories of write strategy and recording power condition used in the previous data recordings are stored. The prior art optical disk recording and reproducing apparatus first selects one write strategy and one recording power condition from among the ones stored on the optical disk D, and reads the selections as the initial conditions. The reading is similar to the ordinary data reproduction. The pickup 1 reproduces an analog signal d1 from the optical disk D. The analog signal d1 is converted into a digital signal d5 through the head amplifier 2, the equalizer 3, the binarizer 4, and the PLL 5 (see FIG. 23). The write strategy decoder 60 and the recording-power-condition decoder 100 decode the digital signal d5 into the write strategy and the recording power condition of the initial conditions, respectively.

The decoded write strategy d6 is provided for and stored in the write-strategy-correction section 7. The decoded write strategy d6 further passes through the write-strategy-correction section 7 and enters the recording-pulse-determination section 9. On the other hand, the decoded recording power condition d10 is provided for the recording-power-determination section 12.

For neither the optical disk nor the optical disk recording and reproducing apparatus, the write strategy selected as the initial conditions is generally optimum. Accordingly, the write strategy is corrected as follows. First, the recording-pattern-determination section 8 outputs a predetermined test recording pattern d8. The recording-pulse-determination section 9 determines test recording pulses d9 corresponding to the test recording pattern d8 according to the write strategy selected as the initial conditions. The recording-power-determination section 12 determines recording power levels d12 according to the recording power condition selected as the initial conditions. The laser driver 13 drives and causes the semiconductor laser 1a to emit laser light R1 at the recording power level d12. Thereby, a train of recording marks corresponding to the test recording pattern (namely test recording marks) is formed in a power calibration area (PCA) on the optical disk D. The pickup 1 radiates the test recording marks in the PCA with laser light of the reproducing power level and detects the reflected light. Variations in intensity of the reflected light are transmitted as an analog signal d1 and converted into a digital signal d4 through the head amplifier 2, the equalizer 3, and the binarizer 4. The PLL 5 synchronizes the digital signal d4 to the clock signal d5a, and in addition, provides the clock signal d5a for the edge shift detector 20. The edge shift detector 20 compares the digital signal d4 from the binarizer 4 with the clock signal d5a from the PLL 5, thereby detecting the front-end edge shifts d20a and the rear-end edge shifts d20b on the digital signal d4. The write-strategy-correction section 7 compares the front-end edge shifts d20a and the rear-end edge shifts d20b with respective, acceptable limits. The section brings results of the comparisons into correspondence with the current write strategy d6 and stores the results. The write-strategy-correction section 7 further corrects the write strategy d6 with predetermined correction values and provides it as a new write strategy d7 for the recording-pulse-determination section 9. The recording-pulse-determination section 9 determines new test recording pulses d9 based on the test recording pattern d8 according to the new write strategy d7. The above-described process is repeated for write strategies with various correction values. Among the write strategies, one write strategy is selected, which achieves both the front-end edge shifts d20a and the rear-end edge shifts d20b at or below the acceptable limits. Thus, the write strategy is optimized.

After the optimization of the write strategy, a calibration of recording power level is performed as follows. The recording-pattern-determination section 8 outputs another test recording pattern d8. The recording-pulse-determination section 9 determines test recording pulses d9 based on the test recording pattern d8. The recording-power-determination section 12 sets the recording power level d12 at a predetermined initial value. As the initial value, a recording power level corresponding to a target β value is selected from the recording power condition. Here, the target β values are, for example, set in advance for the optical disk recording and reproducing apparatus to be appropriate to respective types of the recordable optical disks. The setting reduces error rates of the digital signal reproduced at or below predetermined acceptable limits. The laser driver 13 drives and causes the semiconductor laser 1a to emit laser light R1 at the recording power level d12. Thereby, test recording marks are formed in the PCA on the optical disk D.

The pickup 1 radiates the test recording marks in the PCA with laser light of the reproducing power level, and detects the reflected light. Variations in intensity of the reflected light are transmitted as an analog signal d1. The β-value measurement section 11 measures the β value of the analog signal d1. The β value d11 is stored in the recording-power-determination section 12. Then, the above-described process is repeated for every change of the recording power level from the initial value in predetermined steps. In other words, the β values of the analog signals reproduced from the test recording marks are measured and stored at every time when the recording power level is changed and new recording marks are formed at the recording power level. This produces a list showing correspondences between the numbers of changes in the recording power levels (namely step numbers) and the β values, namely a new recording power condition. The recording power level corresponding to the target β value is selected under the new recording power condition. Thus, the recording power level is optimized. The above-described optimization of the recording power levels is referred to as an optimum power calibration (OPC).

Speeding up the data recording is desired for the above-mentioned optical disk recording and reproducing apparatus. The desire requires an increase in rotation speed of the optical disk during the data recording (namely recording speed). However, when the recording speed is positive-integer n times as high as the single speed (namely n-times speed), the recording marks have been distorted in contrast to that of single-speed recordings. The following experiment and the consideration based on its results has clarified the distortions of the recording marks resulting from high-speed recordings.

FIG. 24 is a schematic diagram showing a recording pattern, recording pulses, and recording marks when the write strategy used in single-speed recordings is adopted into a double-speed recording. The parts (a)-(c) of FIG. 24 show the waveforms of the recording pattern, the recording pulses, and laser pulses of the semiconductor laser 1a, respectively. The part (d) of FIG. 24 shows recording marks M1 and recording spaces S1 formed in the recording layer of the optical disk D by the laser pulses shown in (c) of FIG. 24.

As seen from the comparison between FIGS. 7 and 24, the recording patterns are substantially identical in shape and the recording pulses are substantially identical in shape. Here, being substantially identical in shape refers to having pulse widths and pulse intervals in common, expressed in the unit of the clock period. In FIG. 24, the same reference symbols as those in FIG. 7 designate parts in common with FIG. 7. The recording patterns in (a) of FIG. 7 and (a) of FIG. 24 are substantially identical in shape, and the recording pulses in (b) of FIG. 7 and (b) of FIG. 24 are substantially identical in shape. In (b) of FIG. 24, for example, the first top pulse P10 in the recording pulses has a width $Tt1=p1 \times T1$ and a front-end lag $F1=f1 \times T1$. The multi-pulses P11 have a pulse width $Tm=m \times T1$ and a negation time $Sm=s \times T1$. The second top pulse P20 has a similar size.

The unit length of pulse width, namely the clock period 1 T1 in FIG. 24 corresponds to ½ of the clock period 1 T in FIG. 7 ($1\ T1=(½)T$). Accordingly, the actual pulse widths and intervals of the recording pattern and the recording pulses in FIG. 24 are half the lengths of those in FIG. 7. On the other hand, the rotation speed of optical disk in FIG. 24 is twice as high as that in FIG. 7. Thus, if the laser pulses are identical in shape with the recording pulses regardless of the rotation speeds, the radiated areas have the same shapes in common regardless of the recording speeds. Then, the recording marks of the same shapes are expected in FIGS. 7 and 24, where a recording power level H1 of FIG. 24 higher than the recording power level H0 of FIG. 7 is required for substantial equalization of absorbed energy densities of the recording marks between single-speed recordings and double-speed recordings.

As seen from the comparison between (d) of FIG. 7 and (d) of FIG. 24, the recording mark M1 resulting from the double-speed recordings is distorted with a tapered front edge Ma in contrast to the recording mark M resulting from the single-speed recordings. The following is considered as the reason for the distortion of the recording mark with the tapered front edge associated with increases in recording speed. The increase in recording speed reduces the pulse widths of the laser light and increases the pulse heights. Accordingly, lags of rising edges of the laser pulses are increased too largely with increase in recording speed to be ignored when compared with the total of the pulse width. As a result, power levels of the laser light are low in the front ends of the pulses, and thereby cause front edges of the recording marks to taper. In the tapered front edge, the mark edge shifts from the front end of the corresponding pulse in the recording pattern. Thus, the edge shifts of the digital signal are increased at the front mark edges. This increases error rates of data.

Further increases in recording speed cause additional distortions of the recording marks as follows. FIG. 25 is a schematic diagram showing recording marks M2 when the write strategy used in single-speed recordings is adopted into a quadruple-speed recording. As seen from the comparison between (d) of FIG. 7 and FIG. 25, the middle portion Mb of the recording mark M2 formed in the quadruple-speed recording is thicker than that of the recording mark M formed in the single-speed recording (shown by broken lines in FIG. 25). In particular, the middle portion Mb exceeds the groove g in width.

Furthermore, the rear edge Mc of the recording mark M2 formed in the quadruple-speed recording is longer than that of the recording mark M formed in the single-speed recording. The distortions reveal that the range from the middle portion Mb to the rear edge Mc of the recording mark M2 is overheated in the quadruple-speed recording.

The following is considered as the reason for the overheated range from the middle portion to the rear edge of the recording mark with increases in recording speed. The increase in recording speed reduces intervals of the laser pulses. Accordingly, the radiation of one of the laser pulses starts immediately after the radiation of the previous one of the laser pulses is finished and before the previously radiated areas cool sufficiently. In particular, the multi-pulses with short pulse intervals cause excessive amounts of heat to be built up in the recording layer. As a result, the range from the middle portion to the rear edge of the recording mark expands beyond a predetermined area.

When the recording mark has a long rear edge, the mark edge shifts from the rear end of the corresponding pulse in the recording pattern. Thus, the edge shifts of the digital signal increase at the rear mark edges. In addition, the above-mentioned excessive amount of heat, when propagating through the recording space to the subsequent recording mark, distorts the front edge of the recording mark, thereby causing the edge shifts of the digital signal to be increased at the front mark edges. The above-described increases of the edge shifts increase error rates of data.

When dusts, for example, settle on the surface of the optical disk D, raising the recording power level is required in order to suppress the increases of error rates of data. However, even ordinary level of the recording power causes excessive amounts of heat to be built up in the latter half portion of the recording mark M2. Accordingly, the increase in recording power level largely distorts the recording marks, thereby increasing the edge shifts and error rates of data, contrary to expectations. In other words, recording power margins substantially decrease with increases in recording speed. Here, the recording power margin refers to the range of the recording power level where the edge shifts may fall within acceptable limits. Thus, the prior art optical disk recording and reproducing apparatus substantially reduces the recording power margins with the increases in recording speed, thereby reducing its reliability of the data recordings.

The following problem, in addition, results from the expansion of the middle portion Mb of the recording mark M2 beyond the width of the groove g as shown in FIG. 25. The grooves g of CD-Rs and DVD-Rs slightly meander and thereby provide predetermined wobble signals. Furthermore, DVD-RWs have land pri-pits (LPPs) L on the land tracks, on which predetermined LPP signals are recorded. The wobble signals and the LPP signals specify, for example, addresses on the groove tracks. When the middle portion Mb of the recording mark M2 excessively expands, the edges of the groove g undergo plastic deformations and, in addition, the reflectances of the LPPs L drop. This reduces the S/N ratios of the wobble signal and the LPP signal, thereby increasing errors of reading addresses.

Avoiding the above-described problems associated with increases in recording speed requires the prior art optical disk recording and reproducing apparatus to change the write strategy and the recording power condition in a manner complicated and appropriate to the recording speed, and adjust the proper shapes of the recording marks. For example, achieving the ability of recording on a common type of optical disks at single- to quadruple-recording speeds requires properly using four types of the write strategies and the recording power conditions for the respective recording speeds.

However, the changes of the write strategies and the recording power conditions depending on the recording speeds cause the following problem. When the write strategy and the recording power condition stored on the prior art optical disk are set as the initial conditions, the corresponding recording speed is generally different from the recording speed of a new data recording. Accordingly, the write strategy and the recording power condition which are set as the initial conditions are not optimum, in general, for the new data recording. Furthermore, no information on the recording speed corresponding to the above-mentioned write strategy and recording power condition is store on the prior art optical disks. Accordingly, the recording speed corresponding to the write strategy and the recording power condition set as the initial conditions are quite different from the recording speed of the new data recording in many cases. Thereby, reductions of error rates of data are difficult through the above-described correction of write strategy and OPC. For example, the write strategy of single-speed recordings is set as the initial conditions for a quadruple-speed recording. In this case, the recording power level is insufficient for the top pulses, but excessive for the multi-pulses. Since the difference between the insufficiency and the excess is generally large, the optimization is difficult by means of the above-described correction of write strategy. Even if the correction may reduce error rates of data below acceptable limits, a large number of parameters is to be adjusted. Therefore, the adjusting time excessively increases the time for the correction of write strategy, thereby delaying the start of the data recording onto the optical disk.

BRIEF SUMMARY OF THE INVENTION

An object of the invention is to provide a recordable optical disk, an optical disk recording and reproducing apparatus, and its method of recording and reproducing, which optimize the write strategy and the recording power level for any recording speeds from single- to n-times speeds within a short time, thereby achieving high-speed and high-quality data recordings.

A recordable optical disk according to the invention is used to store recording speed information together with a write strategy and a recording power condition corresponding to the recording speed information.

The recording speed information refers to data specifying rotation speeds of the optical disk during recordings, namely recording speeds. The item of the recording speed information may, for example, be a positive integer n, when the recording speed is positive-integer n times as high as a standard speed, namely an n-times speed.

The write strategy (or recording pulse condition) refers to criteria on which to determine waveforms of recording pulses corresponding to a recording pattern, especially positions of the ends of the recording pulses based on mark lengths and space lengths in the recording pattern. Here, the recording pattern refers to a rectangular pulse train representing a sequence of recording marks and recording spaces to be written onto the optical disk. In the recording pattern, each pulse width represents the length of the recording mark (namely the mark length). In addition, each interval from the rear end of one pulse to the front end of the subsequent pulse (namely a negation time) represents the length of the recording space (namely the space length). The recording pulses refer to rectangular pulses representing laser pulses to be used in the data recordings. The recording pulses generally include top pulses and the subsequent multi-pulses. Alternatively, the recording pulses may include a top pulse only, or additionally include last pulses following the multi-pulses. One pulse in the recording pattern is generally divided into two or more of the recording pulses according to the write strategies. Then, the pulse widths of the recording pulses are generally narrower than the pulse width in the recording pattern. Thereby, an actual value of the mark length does not exceed the width of the corresponding pulse in recording pattern, when heat resulting from the laser light is diffused outside the radiated area. Thus, the recording marks are accurately formed according to the write strategies used in the data recordings. As a result, shifts of the mark edges are tiny and hence error rates of data are reduced.

The recording power condition refers to, regarding a train of the recording marks and the recording spaces written on the optical disk, correspondences between parameters representing the quality of an analog signal read from the train and the recording power levels at the recording of the train. Here, the parameter is preferably the $\beta$ value of the analog signal, which is defined as the formula: $\beta=(a+b)/(a-b)$, using the maximum level a and the minimum level b within one period of the analog signal. The $\beta$ value is equal to the mesial level of the waveform $((a+b)/2)$ normalized with the amplitude $(a-b)$. In the binarization of the analog signal, the mesial level of the waveform is normally set to agree with a threshold value. Accordingly, reductions of the error rates of data resulting from the binarization requires shifts of the mesial level from the threshold value, namely the $\beta$ value within acceptable limits. The $\beta$ values of the analog signal are determined by the reflectances of the recording marks and the recording spaces, and hence can be adjusted with the recording power levels. Thus, the recording power levels corresponding to the $\beta$ values within the acceptable limits are selected on the basis of the recording power conditions in the data recordings.

Both of the write strategy and the recording power condition generally vary with recording speed. The above-described recordable optical disk according to the invention is used to store the write strategies and the recording power conditions that are organized according to the recording speeds and brought into correspondence with the recording speed information specifying the recording speeds. Here, the write strategies and the recording power conditions organized according to the recording speeds are determined and stored on the optical disk, for example, at the time of the manufacture of the optical disk. Alternatively or additionally, the recording speed information, the write strategy, and the recording power condition may be stored at each time when data is recorded onto the optical disk.

An optical disk recording apparatus, when recording data onto the above-described recordable optical disk, may read from the optical disk the write strategies and the recording power conditions organized according to the recording speeds. Thereby, the optical disk recording apparatus may retrieve the write strategy and the recording power condition appropriate to its recording speed from the optical disk. As a result, the write strategy and recording power condition may be optimized within a short time.

An optical disk reproducing apparatus, when reproducing data from the above-described recordable optical disk, may read the recording speed information on target data of reproduction. Accordingly, the optical disk reproducing apparatus may optimize the correction values of its equalizer and the threshold values of its binarizer to suit the recording speeds in the recordings of the target data of reproduction. As a result, error rates of the data reproductions are reduced.

The above-described recordable optical disk may comprise a recording management information area, wherein recording management information including the recording speed information together with the corresponding write strategy and the corresponding recording power condition is stored. Here, the recording management information includes items of drive information, the write strategies, and the recording power conditions used in the data recordings, and items of address information organized according to files of recorded data. The recording management information, for example, corresponds to information stored in a recording management area (RMA) of a DVD and, in particular, includes recording management data (RMD). The recording management information may be stored at the time of the manufacture of the optical disk, or at each time of the data recordings.

An optical disk recording apparatus, on loading the recordable optical disk, first reads the recording management information. Accordingly, the recording speed information is read together with the corresponding write strategy and recording power condition on loading the recordable optical disk into the optical disk recording apparatus. Thereby, the optical disk recording apparatus may rapidly determine the write strategies and the recording power conditions appropriate to its recording speeds.

In the above-described recordable optical disk, the recording management information may be stored in a liking area at each time of data recordings. Here, the liking areas refer to areas wherein identifying information of existing files and newly appended files is stored. The liking areas correspond to border zones of a DVD-R.

An optical disk reproducing apparatus, when reproducing a file from the above-described recordable optical disk, refers to the liking area corresponding to the target file of reproduction. In the liking area, the recording management information on the target file, especially, the recording speed information, the write strategy, and the recording power condition are stored. Accordingly, the optical disk reproducing apparatus may rapidly read the recording speed of the target file, and further, optimize parameters of the shaping performed on the reproduced analog signal and the threshold value of the binarization to suit the recording speed. Then, error rates of the reproduced data are reduced. In addition, smooth and rapid switching between the files may be achieved especially when many files each recorded at different times are successively reproduced.

The above-described recordable optical disk may comprise the liking area in a data area. In a DVD-R, for example, two or more of border zones generally partition the data area (which is also referred to as a program area). One title is stored within each interval between the border zones. In the case where the above-described recordable optical disk is a DVD-R, a DVD player rapidly reads the recording speed in the recording of a target title of playback from the border zone corresponding to the target title. Then, the DVD player may optimize parameters of the shaping performed on the reproduced analog signal and the threshold value of the binarization to suit the recording speed. Thus, the error rates of the reproduced data are reduced. In addition, smooth and rapid switching between the titles may be achieved especially when many titles are successively replayed.

In a case of the recording management information with OPC information, the above-described disk may comprise an OPC information area, wherein an item of the OPC information is stored, in the recording management information area, and a set of the recording speed information, the write strategy, and the recording power condition in the OPC information.

At the beginning of a data recording, an optical disk recording apparatus performs an optimum recording power calibration (OPC), and thereby determines recording power levels of its semiconductor laser. Here, the OPC refers to operations for the calibration of the recording power levels of the semiconductor laser based on the β value of the analog signal reproduced from predetermined test recording marks that are written on the optical disk on a trial basis. The OPC information is information on the OPC and, in particular, includes the write strategy and the recording power condition in the OPC.

The above-described recordable optical disk comprises the recording speed information within the OPC information, thereby allowing an optical disk recording apparatus to read the recording speed information as the OPC information from the recordable optical disk. Accordingly, the optical disk recording apparatus may rapidly determine the write strategy and the recording power condition appropriate to the recording speed in the OPC.

In the above-described recordable optical disk, the recording management information area may include a plurality of blocks, and a set of the recording speed information, the write strategy, and the recording power condition may be stored in one of the blocks at each time of data recordings. Thereby, the optical disc recording apparatus may easily and rapidly read the write strategy and the recording power condition corresponding to a specific item of the recording speed information.

In the recordable optical disk, each of the blocks may include 16 sectors, and a set of the recording speed information, the write strategy, and the recording power condition may be stored in one of the sectors. In a case where the recordable optical disk is a DVD, for example, the recordable optical disk includes a plurality of the blocks as a standardized physical format. Each block further includes 16 sectors. An optical disk recording apparatus processes the target data of recording on a sector-by-sector basis. Accordingly, the optical disk recording apparatus may easily process the OPC information when the OPC information is stored in one of the sectors.

In the recordable optical disk, the recording power condition may include information of a correspondence between a recording pattern and a recording power level. The information of the correspondence refers to information on the distribution of the recording power levels over each of the recording marks and the recording spaces represented by the recording pattern. The information of the correspondence preferably includes information for assigning a first recording power level to a recording pulse corresponding to a specific portion in the recording pattern and assigning a second recording power level lower than the first recording power level to other recording pulses. The information is, for example, a pair of the difference between the first and second recording power levels (which is hereafter referred to as an additional recording power level) and the second recording power level. Alternatively, the information may be a pair of the ratio between the additional recording power level and the first recording power level, and the first recording power level. Furthermore, the information may be a pair of the first recording power level itself and the second recording power level. The first and second recording power levels are easily calculated from the information.

When the recording pulses are determined for a fixed recording pattern according to the same write strategy, the distortions of the recording marks are increased with increases in recording speed as follows. When the recording speed is increased, lags of the rising edges of the laser pulses are increased, and thereby the recording marks are distorted with tapered front edges. On the other hand, the pulse separations of the recording pulses are short within the range from the middle portion to the rear edge of the recording mark. Therefore, heat resulting from the laser light is excessively built up, thereby causing the latter half portion of the recording mark to expand excessively. Shifts of the mark edges resulting from the distortions of the recording marks cause increases in error rate of data.

Reduction of the above-described distortions of the recording marks requires, with increases in recording speed, raising the laser power level and/or moving the rising edges of the laser pulses ahead in the front edges of the recording marks, and suppressing the heat resulting from the laser light in the latter half portions. Such adjustment of the recording pulses is complicated and hard-to-achieve only by the correction of the write strategy. In the above-described recordable optical disk, the recording power condition includes the information of the correspondence between the recording pattern and the recording power levels. Accordingly, an optical disk recording apparatus may change its recording power level for each portion of the recording pattern based on the information of the correspondence, thereby reducing the distortions of the recording marks.

For example, the first recording power level may be assigned to the recording pulses corresponding to the front edge of the recording mark. Then, an increase of the first recording power level compensates for the lack of power resulting from the lag of the rising edge of the laser pulse at the front edge of the recording mark. On the other hand, a reduction of the second recording power level suppresses overheating of the latter half portion of the recording mark resulting from the laser light.

The first recording power level may be further assigned to the recording pulses corresponding to the rear edge of the recording mark, thereby compensating for a lack of laser power at the rear edge of the recording mark having a relatively long length, when the second recording power level is reduced in order to avoid the overheating of the latter half portion of the recording mark. Thus, the rear mark edge of the recording mark does not shift.

An optical disk recording apparatus according to the invention is for optically recording data onto a recordable optical disk comprising a recording speed information area, wherein an item of recording speed information is stored, and a write strategy area, wherein a write strategy corresponding to the item of the recording speed information is stored. The optical disk recording apparatus comprises:

(A) a semiconductor laser for emitting laser light to the recordable optical disk at a predetermined power level;
(B) a photodetector for detecting the laser light emitted from the semiconductor laser at a predetermined reproducing power level and reflected off the recordable optical disk, and converting the laser light into an analog signal;
(C) an analog-to-digital (AD) converter for converting the analog signal into a digital signal;
(D) a recording-speed-information decoder for decoding the digital signal into an item of the recording speed information and producing an output as a decoded item of recording speed information;
(E) a recording-speed setting section for setting a recording speed and producing an output as a set item of recording speed information;
(F) a recording speed comparator for comparing the decoded item of recording speed information with the set item of recording speed information;
(G) a write strategy decoder for decoding the digital signal into the write strategy corresponding to the decoded item of recording speed information, when the recording speed comparator detects agreement between the decoded item of recording speed information and the set item of recording speed information;

(H) a recording-pattern-determination section for determining a recording pattern corresponding to the data;

(I) a recording-pulse-determination section for converting the recording pattern into a recording pulse according to the write strategy;

(J) a recording-power-determination section for performing an OPC based on the analog signal, thereby determining a recording power level of the semiconductor laser; and (K) a laser driver for driving the semiconductor laser according to the recording pulse and the recording power level.

This optical disk recording apparatus, when recording data, may read the write strategies organized according to recording speeds from the target optical disk. Thereby, the optical disk recording apparatus may retrieve the write strategy appropriate to the set recording speed from the optical disk, and thus, optimize the write strategy within a short time.

The optical disk recording apparatus may further comprise a memory wherein a list showing correspondences between items of recording speed information and write strategies is stored. The optical disk recording apparatus may select the write strategy corresponding to the set recording speed from the list stored in the memory even when none of the write strategies stored on the target optical disk corresponds to the set recording speed.

The optical disk recording apparatus may further comprise:

an edge shift detector for detecting an edge shift of the digital signal derived from the AD converter; and a write-strategy-correction section for correcting the write strategy on the basis of the digital signal and the edge shift and providing the corrected write strategy for the recording-pulse-determination section. Thereby, this optical disk recording apparatus may correct the write strategy as follows: First, the recording-pulse-determination section determines test recording pulses from a test recording pattern according to the write strategy. Then, the semiconductor laser radiates the recording layer of the target optical disk with laser pulses of a predetermined power level and substantially identical in shape with the test recording pulses. Thereby, a train of recording marks corresponding to the test recording pattern (which are hereafter referred to as test recording marks) is formed in the recording layer of the optical disk. After that, the semiconductor laser radiates the test recording marks with laser light of a reproducing power level. The photodetector detects the reflected light, and reproduces an analog signal based on the reflected light. The AD converter converts the analog signal into a digital signal. Then, the edge shift detector detects the phase difference between the digital signal and the clock signal, namely the edge shift. The write-strategy-correction section corrects the write strategy by a predetermined correction value based on the detected edge shift. These operations are repeated until the edge shifts of the data reproduced from the test recording marks are reduced to or below a predetermined, acceptable limit. Thus, the write strategy is optimized under actual conditions of data recordings. This reduces error rates of the data recorded on the optical disk. The above-described optical disk recording apparatus, in particular, may set the write strategy at the beginning of the correction to be appropriate to the set recording speed. Accordingly, the above-described correction of the write strategy may be performed reliably and within a short time.

The above-described optical disk recording apparatus may further comprise:

a block error rate detector for detecting a block error rate on the digital signal derived from the AD converter; and a write-strategy-correction section for correcting the write strategy on the basis of the digital signal and the block error rate and providing the corrected write strategy for the recording-pulse-determination section. Thereby, the apparatus, in the above-described correction of the write strategy, may evaluate the digital signal reproduced from the test recording marks in terms of the block error rates instead of the edge shifts. In other words, the above-described correction of the write strategy is repeated until the block error rates are reduced to or below predetermined acceptable limits. Thus, the apparatus optimizes the write strategy under actual conditions of data recordings. As a result, the error rates of data recorded onto the target optical disk are reduced. The above-described optical disk recording apparatus, in particular, may set the write strategy at the beginning of the correction to suit the set recording speed. Accordingly, the above-described correction of the write strategy may be performed reliably and within a short time.

The above-described optical disk recording apparatus may establish a correspondence between the write strategy and the set item of recording speed information, which are adopted in a recording of data, and store them in the write strategy area and the recording speed information area of the recordable optical disk, respectively. In other words, the write strategy adopted in an actual data recording is recorded onto the target optical disk, together with the recording speed of the recording. Thereby, the write strategy stored on the optical disk may be adopted when another data is recorded onto the optical disk at the same recording speed. Thus, the apparatus may achieve rapidly and easily the optimization of the write strategy in the data recording.

According to another aspect of the invention, an optical disk recording apparatus is for optically recording data onto a recordable optical disk comprising a recording speed information area, wherein an item of recording speed information is stored, and a recording power condition area, wherein a recording power condition corresponding to the item of the recording speed information is stored. The apparatus comprises:

(A) a semiconductor laser for emitting laser light to the recordable optical disk at a predetermined power level;

(B) a photodetector for detecting the laser light emitted from the semiconductor laser at a predetermined reproducing power level and reflected off the recordable optical disk, and converting the laser light into an analog signal;

(C) an AD converter for converting the analog signal into a digital signal;

(D) a β-value measurement section for measuring the β value of the analog signal;

(E) a recording-speed-information decoder for decoding the digital signal into the recording speed information and producing an output as a decoded item of recording speed information;

(F) a recording-speed setting section for setting a recording speed and producing an output as a set item of recording speed information;

(G) a recording speed comparator for comparing the decoded item of recording speed information with the set item of recording speed information;

(H) a recording-power-condition decoder for decoding the digital signal into the recording power condition corresponding to the decoded item of recording speed information, when the recording speed comparator detects agreement between the decoded item of recording speed information and the set item of recording speed information;

(I) a recording-pattern-determination section for determining a recording pattern corresponding to the data;

(J) a recording-pulse-determination section for determining a recording pulse from the recording pattern;

(K) a recording-power-determination section for performing an OPC based on the recording power condition and the β value, thereby determining a recording power level of the semiconductor laser; and (L) a laser driver for driving the semiconductor laser according to the recording pulse and the recording power level.

This optical disk recording apparatus establishes a correspondence between a new item of the recording power condition obtained through the OPC of the recording-power-determination section and the set item of recording speed information, and stores the items in the recording power condition area and the recording speed information area of the recordable optical disk, respectively. The optical disk recording apparatus, when recording data, may further read the recording power conditions organized according to recording speeds from the target optical disk of recording. Thereby, the apparatus may search the optical disk for the recording power condition appropriate to the set recording speed. Thus, the optical disk recording apparatus may optimize the recording power condition reliably and within a short time.

According to still another aspect of the invention, an optical disk recording apparatus is for optically recording data onto a recordable optical disk, and comprises:

(A) a semiconductor laser for emitting laser light to the recordable optical disk at a predetermined power level;

(B) a photodetector for detecting laser light emitted from the semiconductor laser at a predetermined reproducing power level and reflected off the recordable optical disk, and converting the laser light into an analog signal;

(C) a recording-pattern-determination section for determining a recording pattern corresponding to the data;

(D) a recording-pulse-determination section for converting the recording pattern into a recording pulse according to a predetermined write strategy;

(E) a recording-power-determination section for performing an OPC based on the analog signal, thereby determining a recording power level of the semiconductor laser at (a) a first recording power level for the recording pulse corresponding to a specific portion in the recording pattern and (b) a second recording power level lower than the first recording power level for the others of the recording pulses; and (F) a laser driver for driving the semiconductor laser according to the recording pulses and the recording power levels.

The distortions of the recording marks are increased with increases in recording speed as described above. That is, the recording marks are distorted with tapered front edges, while excessively expand in the latter half portions. The above-described optical disk recording apparatus independently adjusts the first and second recording power levels, thereby reducing the distortions of the recording marks with ease.

The above-described optical disk recording apparatus, for example, may assign the first recording power level to the recording pulses corresponding to the front edge of the recording mark. Then, an increase of the first recording power level compensates for the lack of power resulting from a lag of the rising edge of the laser pulse at the front edge of the recording mark. On the other hand, a reduction of the second recording power level suppresses overheating of the latter half portion of the recording mark resulting from the laser light.

Furthermore, the first recording power level may be assigned to the recording pulses corresponding to the rear edge of the recording mark, thereby compensating for a lack of laser power at the rear edge of the recording mark with a relatively long length, when the second recording power level is reduced in order to avoid the overheating of the latter half portion of the recording mark.

Thus, the formation of the recording marks maintains high accuracy regardless of increases in recording speed. Therefore, the above-described optical disk recording apparatus may maintain low error rates of data in its high-speed data recordings.

The above-described optical disk recording apparatus may further comprise a memory wherein a list showing correspondences between items of recording speed information and the first and second recording power levels is stored. The list includes, for example, the additional and second recording power levels. Alternatively, the list may include the ratios between the additional and second recording power levels and the second recording power levels, or, the first recording power levels themselves and the second recording power levels. The above-described optical disk recording apparatus can easily and rapidly determine the first and second recording power levels appropriate to actual recording speeds in the data recordings, through referring to the list.

The above-described optical disk recording apparatus may further comprise:

(A) a β-value measurement section for measuring the β value of the analog signal;

(B) a degree-of-modulation measurement section for measuring the degree of modulation of the analog signal;

(C) a recording power correction section for correcting the recording power level on the basis of the β value and the degree of modulation. Here, the degree of modulation of the analog signal refers to the ratio between the maximum level within one period and the amplitude in the period of the analog signal, more specifically defined by the formula: degree of modulation=(a−b)/a, using the maximum level a and the minimum level b within one period of the analog signal. When the above-described distortions of the recording marks are increased, for example, the recording spaces are provided with excessive amounts of heat, and then, shrunk in size and degraded in reflectance on an average. Thereby, an analog signal reproduced from a train of the recording marks is degraded in overall signal level and increased in degree of modulation. Accordingly, the degree of modulation of the analog signal is adaptable for use as a parameter indicating the distortions of the recording marks.

The above-described optical disk recording apparatus performs adjustments to the first and second recording power levels based on the degrees of modulation simultaneously with performing the OPC based on the β values, thereby correcting the recording power levels such that the β value and the degree of modulation fall within predetermined, acceptable limits. As a result, the apparatus may reduce the distortions of the recording marks, and hence error rates in high-speed data recordings.

In a case of the recordable optical disk with land pri-pits (LPPs), such as a DVD-R or a DVD-RW, the above-described optical disk recording apparatus may further comprise:

(A) a β-value measurement section for measuring the β value of the analog signal;
(B) an LPP error detector for detecting the LPP signal from the LPPs in the analog signal and one of the jitter and the block error rate on the LPP signal; and
(C) a recording power correction section for correcting the recording power level on the basis of one of the jitter and the block error rate. Here, the LPPs of a recordable optical disk refer to small areas provided at predetermined intervals on parts of lands near grooves. On the LPPs, predetermined signals are written at the time of the manufacture of the optical disk. The signal is referred to as an LPP signal. The LPP signal includes, for example, address information of the groove tracks.

High-speed data recordings increase the above-described distortions of the recording marks. When the resulting areas of the recording marks expand into the LPPs, the excessive amounts of heat causing the distortions of the recording marks corrupt data on the LPPs, and further cause plastic deformation in the LPPs themselves. Then, the S/N ratio of the LPP signal drops. Accordingly, both of the jitter and the block error rate of the LPP signal are adapted for use as a parameter indicating the distortions of the recording marks.

The above-described optical disk recording apparatus performs adjustments to the first and second recording power levels based on one of the jitter and the block error rate of the LPP signal simultaneously with performing the OPC based on the β values, thereby correcting the recording power levels such that the β value and one of the jitter and the block error rate fall within predetermined, acceptable limits. As a result, the apparatus may reduce the above-described distortions of the recording marks, and hence error rates in high-speed data recordings.

In a case where a recordable optical disk comprises a recording speed information area, wherein an item of recording speed information is stored, and a recording power condition area, wherein a recording power condition corresponding to the item of the recording speed information is stored, and the recording power condition includes the first recording power level and the second recording power level, in the above-described optical disk recording apparatus:

(A) the recording-power-determination section may read the first and second recording power levels corresponding to a predetermined recording speed from the recordable optical disk; and
(B) a new recording power condition obtained through the OPC includes the pair of the first and second recording power levels determined by the recording-power-determination section, corresponds to the recording speed information specifying the recording speed, and is stored in the recording power condition area of the recordable optical disk while the recording speed information is stored in the recording speed information area of the recordable optical disk. That is, the recording power conditions used in actual data recordings, especially the first and second recording power levels, are recorded onto the optical disk, together with the respective recording speeds. More specifically, pairs of the additional and second recording power levels, for example, are recorded. Alternatively, pairs of the ratio between the additional and second recording power levels and the second recording power level may be recorded. Furthermore, pairs of the first recording power level itself and the second recording power level may be recorded. Thereby, the apparatus may adopt the recording power condition stored on the optical disk, when recording another data onto the optical disk at the same recording speed. Thus, the apparatus may achieve easily and rapidly the optimization of the recording power levels in data recordings.

An optical disk reproducing apparatus according to the invention comprises:

(A) a semiconductor laser for emitting laser light of a predetermined reproducing power level to an optical disk on which items of recording speed information are stored at the times of data recordings;
(B) a photodetector for detecting the laser light reflected off the optical disk and converting the laser light into an analog signal;
(C) an equalizer for compensating for distortions of the analog signal resulting from the frequency characteristics with predetermined correction values;
(D) a binarizer for binarizing the analog signal compensated by the equalizer with respect to a predetermined threshold value, thereby converting the analog signal into a digital signal;
(E) a recording-speed-information decoder for decoding the digital signal into an item of the recording speed information and producing an output as a decoded item of recording speed information;
(F) a correction value determination section for determining a correction value of the equalizer according to the decoded item of recording speed information; and
(G) a threshold determination section for determining a threshold value of the binarizer according to the decoded item of recording speed information.

Shapes of recording marks on an optical disk generally depend on recording speeds. Especially for a recording pattern, the recording marks are distorted with increases in recording speed. Therefore, the amplitudes and frequency characteristics of the analog signals reproduced from the respective recording marks vary with the recording speeds.

Regarding data on the target optical disk, the above-described optical disk reproducing apparatus may read the recording speed adopted for the recording of the data, and further, determine correction values of the equalizer and threshold values of the binarizer to be appropriate to the recording speeds. Thereby, the apparatus, when reproducing data, may compensate for blunt waveforms of the reproduced analog signals and shifts of their mesial levels from the respective threshold values. As a result, the apparatus may reduce error rates of reproduced data.

According to the invention, a method of optically recording data onto a recordable optical disk is applied to a recordable optical disk comprising a recording speed information area, wherein an item of recording speed information is stored, and a write strategy area, wherein a write strategy corresponding to the item of the recording speed information is stored, and the method comprises the steps of:

(A) setting a recording speed and producing an output as a set item of recording speed information;
(B) optically reading and detecting an item of the recording speed information from the recordable optical disk, and producing an output as a decoded item of recording speed information;
(C) comparing the decoded item of recording speed information with the set item of recording speed information;
(D) optically reading the write strategy corresponding to the decoded item of recording speed information from the recordable optical disk, when the decoded item of recording speed information agrees with the set item of recording speed information;

(E) performing an OPC, thereby determining a recording power level of a semiconductor laser; and (F) recording the data at the recording speed and the recording power level according to the write strategy.

In this data recording method, the write strategies may be read from the target optical disk in a manner organized according to recording speeds. Thereby, the write strategy appropriate to the set recording speed may be retrieved from the optical disk, and thus optimized within a short time.

The above-described data recording method may further comprise the steps of referring to a list stored in a memory, which shows correspondences between items of recording speed information and write strategies, and reading the write strategy corresponding to the set item of recording speed information. The write strategy corresponding to the set recording speed may be selected from the list in the memory even when none of the write strategies stored on the target optical disk corresponds to the set recording speed.

In the data recording method, the OPC may comprise the substeps of:

(A) determining a predetermined write strategy as a test write strategy;

(B) converting a predetermined test recording pattern into a test recording pulse according to the test write strategy;

(C) driving the semiconductor laser according to the test recording pulses, thereby forming a train of recording marks corresponding to the test recording pattern in the recording layer of the recordable optical disk;

(D) radiating the train of recording marks with laser light of a predetermined reproducing power level from the semiconductor laser, then detecting and converting the reflected light into an analog signal with a photodetector;

(E) converting the analog signal into a digital signal;

(F) detecting one of the edge shift and the block error rate on the digital signal; and (G) correcting the test write strategy on the basis of the detected one of the edge shift and the block error rate.

In the data recording method, the test recording marks corresponding to the test recording pattern are actually written into the recording layer of the target optical disk of recording on a trial basis. In digital signals reproduced from the test recording marks, either edge shifts or block error rates are detected. The write strategy is corrected with a predetermined correction value based on the detected edge shifts or block error rates. This correction is repeated until the edge shifts or the block error rates of the digital signals reproduced from the test recording marks are reduced to or below a predetermined acceptable limit. Thus, the write strategy is optimized under actual conditions of data recordings. This reduces error rates of data recorded on the target optical disk.

In the above-described data recording method, the write strategy at the beginning of the correction, in particular, may be set to be appropriate to the set recording speed. Accordingly, the above-described correction of the write strategy may be achieved reliably and within a short time.

The data recording method may further comprise the step of establishing a correspondence between the test write strategy corresponding to the recording power level and the set item of recording speed information, and storing them in the write strategy area and the recording speed information area of the recordable optical disk, respectively. That is, the write strategies adopted in actual data recordings are recorded onto the target optical disk, together with the respective recording speeds. Thereby, the write strategy stored on the optical disk may be adopted when another data is recorded onto the optical disk at the same recording speed. Thus, the optimization of the write strategy may be easily and rapidly achieved in the data recording.

According to another aspect of the invention, a method of optically recording data onto a recordable optical disk is applied to a recordable optical disk comprising a recording speed information area, wherein an item of recording speed information is stored, and a recording power condition area, wherein a recording power condition corresponding to the item of the recording speed information is stored, and the method comprises the steps of:

(A) setting a recording speed and producing an output as a set item of recording speed information;

(B) optically reading and decoding the item of the recording speed information from the recordable optical disk, and producing an output as a decoded item of recording speed information;

(C) comparing the decoded item of recording speed information with the set item of recording speed information;

(D) optically reading the recording power condition corresponding to the decoded item of recording speed information from the recordable optical disk, when the decoded item of recording speed information agrees with the set item of recording speed information;

(E) performing an OPC based on the recording power condition, thereby determining a recording power level of a semiconductor laser;

(F) recording the data on the recordable optical disk at the recording power level determined through the OPC; and (G) establishing a correspondence between a new recording power condition obtained through the OPC and the set item of recording speed information, and storing the new recording power condition and the set item of recording speed information in the recording power condition area and the recording speed information area of the recordable optical disk, respectively.

In this data recording method, recording power conditions may be read from the target optical disk in a manner organized according to recording speeds. Thereby, the recording power condition appropriate to the set recording speed may be retrieved from the optical disk. As a result, the recording power levels may be optimized reliably and within a short time in the above-described data recording method.

According to still another aspect of the invention, a method of optically recording data onto a recordable optical disk comprises the steps of:

(A) determining a recording pattern corresponding to target data of recording;

(B) converting the recording pattern into a recording pulse according to a predetermined write strategy;

(C) performing an OPC, thereby determining a recording power level of a semiconductor laser at (a) a first recording power level for the recording pulse corresponding to a specific portion in the recording pattern and (b) a second recording power level lower than the first recording power level for the others of the recording pulses; and (D) driving the semiconductor laser according to the recording pulses and the recording power levels, thereby recording the target data of recording on the recordable optical disk.

The distortions of the recording marks are increased with increases in recording speed as described above. That is, the recording marks are distorted with tapered front edges, while excessively expand in the latter half portions. In the above-described data recording method, the first and second recording power levels are independently adjusted and thereby, the distortions of the recording marks may be easily reduced.

In the above-described data recording method, for example, the first recording power level may be assigned to the recording pulses corresponding to the front edge of the recording mark. Then, an increase of the first recording power level compensates for the lack of power resulting from a lag of the rising edge of the laser pulse at the front edge of the recording mark. On the other hand, a reduction of the second recording power level suppresses overheating of the latter half portion of the recording mark resulting from the laser light.

Furthermore, the first recording power level may be assigned to the recording pulses corresponding to the rear edge of the recording mark, thereby compensating for a lack of laser power at the rear edge of the recording mark with a relatively long length, when the second recording power level is reduced in order to avoid the overheating of the latter half portion of the recording mark.

Thus, the formation of the recording marks maintains high accuracy regardless of increases in recording speed. Therefore, low error rates of data may be maintained in high-speed data recordings in the above-described data recording method.

The above-described data recording method may further comprise the step of referring to a list stored in a memory, which shows correspondences between items of recording speed information and the first and second recording power levels, and reading the first and second recording power levels corresponding to a predetermined recording speed. The list includes, for example, the additional and second recording power levels. Alternatively, the list may include the ratios between the additional and second recording power levels and the second recording power levels, or, the first recording power levels themselves and the second recording power levels. Thereby, the first and second recording power levels appropriate to the actual recording speed may be easily and rapidly determined in the data recordings.

In the above-described data recording method, the OPC may comprise the substeps of:
  (A) converting a predetermined test recording pattern into a test recording pulse according to a predetermined write strategy;
  (B) setting a test recording power level of the semiconductor laser at (a) the first recording power level for the test recording pulse corresponding to the specific portion in the test recording pattern and (b) the second recording power level for the others of the test recording pulses;
  (C) driving the semiconductor laser according to the test recording pulses and the test recording power levels, thereby forming a train of recording marks corresponding to the test recording pattern in the recording layer of the recordable optical disk;
  (D) radiating the train of recording marks with laser light of a predetermined reproducing power level from the semiconductor laser, then detecting and converting the reflected light into an analog signal with a photodetector;
  (E) measuring the β value of the analog signal;
  (F) measuring the degree of modulation of the analog signal; and
  (G) correcting the first and second recording power levels on the basis of the β value and the degree of modulation.

In the above-described data recording method, the adjustments to the first and second recording power levels based on the degrees of modulation are performed simultaneously with performing the OPC based on the β values. Thereby, the recording power levels are corrected such that the β value and the degree of modulation fall within predetermined, acceptable limits. As a result, the above-described distortions of the recording marks may be reduced, and hence, error rates may be reduced in high-speed data recordings.

In a case of the recordable optical disk with LPPs such as a DVD-R or a DVD-RW, the OPC in the above-described data recording method, may comprise the substeps of:
  (A) converting a predetermined test recording pattern into a test recording pulse according to a predetermined write strategy;
  (B) setting a test recording power level of the semiconductor laser at (a) the first recording power level for the test recording pulse corresponding to the specific portion in the test recording pattern and (b) the second recording power level for the others of the test recording pulses;
  (C) driving the semiconductor laser according to the test recording pulses and the test recording power levels, thereby forming a train of recording marks corresponding to the test recording pattern;
  (D) radiating the train of recording marks with laser light of a predetermined reproducing power level from the semiconductor laser, then detecting and converting the reflected light into an analog signal with a photodetector;
  (E) measuring the β value of the analog signal;
  (F) detecting a LPP signal from the LPPs in the analog signal and measuring one of the jitter and the block error rate on the LPP signal; and
  (G) correcting the first and second recording power levels on the basis of the β value and one of the jitter and the block error rate.

In this data recording method, the adjustments to the first and second recording power levels based on one of the jitter and the block error rate of the LPP signal are performed simultaneously with performing the OPC based on the β values. Thereby, the recording power levels are corrected such that the β value and one of the jitter and the block error rate fall within predetermined, acceptable limits. As a result, the above-described distortions of the recording marks may be reduced, and hence, error rates may be reduced in high-speed data recordings.

In a case where the recordable optical disk comprises a recording speed information area, wherein an item of recording speed information is stored, and a recording power condition area, wherein a recording power condition corresponding to the item of said recording speed information is stored, and the recording power condition includes the first and second recording power levels, the above-described data recording method may further comprise the steps of:
  (A) reading the first and second recording power levels corresponding to a predetermined recording speed from the recordable optical disk; and
  (B) incorporating the pair of the first and second recording power levels determined through the OPC into a new recording power condition obtained through the OPC, establishing a correspondence between an item of recording speed information specifying the recording speed and the new recording power condition, and storing the item of recording speed information and the new recording power condition in the recording speed information area and the recording power condition area of the recordable optical disk, respectively. That is, the recording power conditions used in actual data recordings, especially the first and second recording power levels, are recorded onto the optical disk, together with the respective recording speeds. More specifically, pairs of the additional and second recording power levels, for example, are recorded. Alternatively, pairs of the ratio between the additional and second recording power levels and the second recording power level may be recorded. Furthermore, pairs of the first recording power level itself and the second recording power level may be recorded. Thereby, the recording power condition stored on the optical disk may be adopted in the above-described data recording method, when another data is recorded onto the optical disk at the same recording speed. Thus, the optimization of the recording power levels may be easily and rapidly achieved in the data recordings.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 25 is a schematic diagram showing recording marks M2 when a quadruple-speed recording of the prior art optical disk recording and reproducing apparatus adopts the write strategy used in single-speed recordings.

It will be recognized that some or all of the figures are schematic representations for purposes of illustration and do not necessarily depict the actual relative sizes or locations of the elements shown.

DETAILED DESCRIPTION OF THE INVENTION

The best embodiment of the invention is described with presenting some preferred examples and referring to the attached drawings as follows.

Example 1

Figure 1:
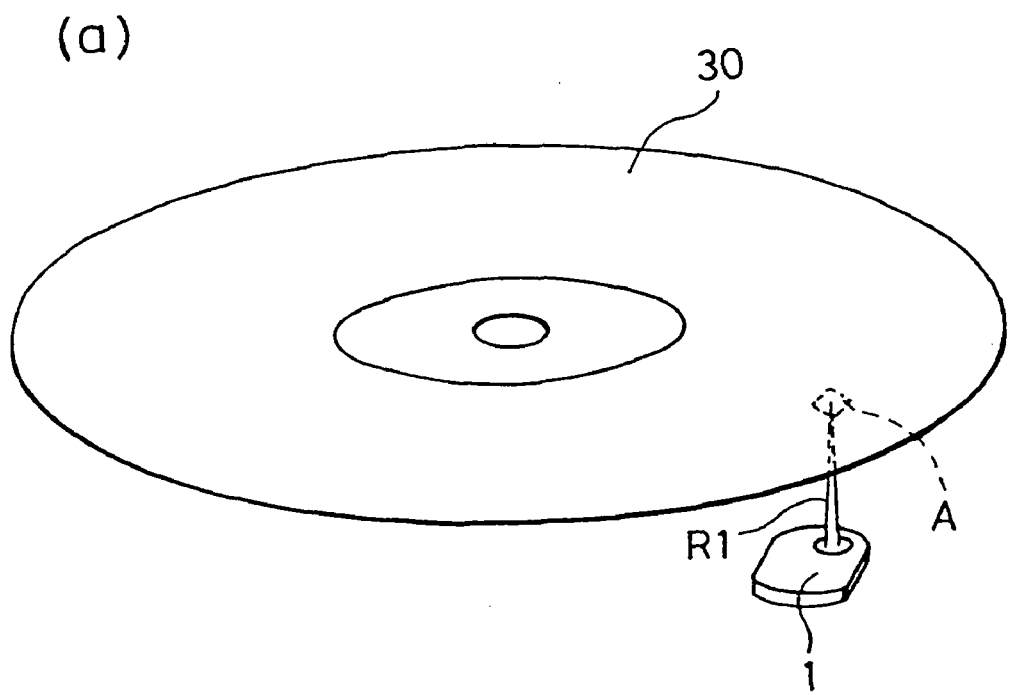
FIG. 1 shows a DVD-R 30 according to Example 1 of the invention, where (a) is a perspective view showing the overall appearance of the DVD-R 30 and the appearance of a radiation by a pickup 1 of a DVD-R recorder with laser light R1, and (b) is an enlarged view of a small area A surrounded by broken lines in (a) when viewed from the back side.
Figure 1:
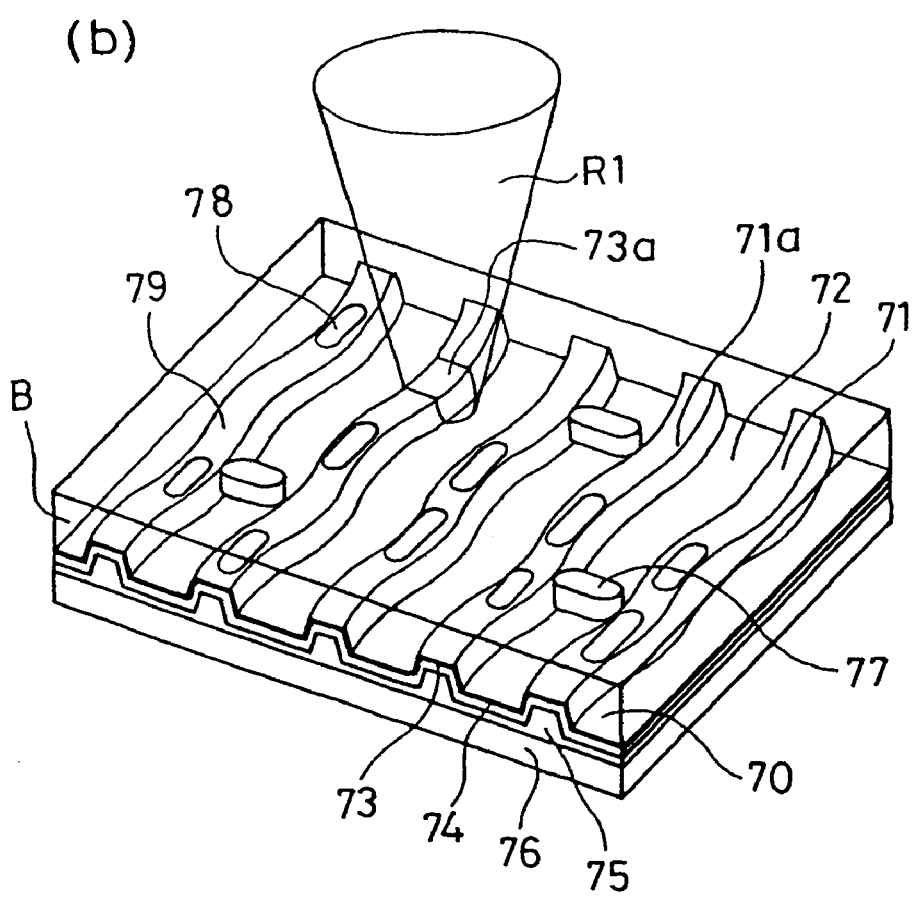

The following describes a DVD-R 30 serving as a recordable optical disk according to Example 1 of the invention. The part (a) of FIG. 1 is a perspective view showing the overall appearance of the DVD-R 30 and the appearance of a radiation by a pickup 1 of a DVD-R recorder with laser light R1. The part (b) of FIG. 1 is an enlarged view of a small area A surrounded by broken lines in (a) of FIG. 1 when viewed from the back side. A cross section B of the DVD-R 30 perpendicular to its surface and parallel to its radial direction is shown in (b) of FIG. 1.

The DVD-R 30 is a disk based on the standard, the DVD-R for General Ver. 2.0, and measuring about 120 mm in diameter and about 1.2 mm in thickness. The disk substrate 70 measures about 0.6 mm in thickness and is made of polycarbonate. The surface of the disk substrate 70 comprises grooves 71. The grooves 71 are a spiral groove concentric with the disk substrate 70. The groove 71 has a wobble 71a, i.e., a transversely and finely wavy shape. A land 72 refers to a region between the adjacent grooves 71 of the surface of the disk substrate 70. The land 72 has one to three small pits or land pri-pits (LPPs) 77 spaced every 16 periods of the wobble 71a. The LPP 77 is, in particular, located at a place close to the outermost portion of one period of the wobble 71a in the radial direction of the disk substrate 70 (which are hereafter referred to as a top of the wobble 71a). The LPP 77 is at a tiny distance from, or in contact with the adjacent groove 71. The above-mentioned standard specifies a length of the LPPs 77 in the circumferential direction of the disk substrate 70.

The disk substrate 70 includes a thin recording layer 73 on the surface. The recording layer 73 contains organic dyes. The organic dyes are preferably purple types. A semiconductor laser 1a of the pickup 1 radiates the recording layer 73, especially on the groove 71, with intense laser light R1, preferably red laser light, at a power level of about 30 mW. In a portion 73a of the recording layer 73 radiated with the laser light R1, the organic dyes are then decomposed and, in particular, changes the light absorption characteristics. Thereby, the reflectances of the portion 73a drop below those of the other portions. Thus, recording marks 78 are formed on the grooves 71. On the other hand, surface portions 79 between the recording marks 78 on the grooves 71 maintain an original high reflectance, and serve as recording spaces.

Portions of the disk substrate 70 are irreversibly deformed in the vicinities of the recording marks 78, because of temperature rises during the formations of the recording marks. Accordingly, the DVD-R 30 does not allow the recording marks 78 once formed to be erased, and therefore, does allow a data write based on the formations of the recording marks 78 only once.

A reflection layer 74 is a thin film on the recording layer 73 and made of metal of high reflectance, preferably gold. Overcoat and adhesive layers 75 cover the reflection layer 74, thereby flattening asperities resulting from the grooves 71 and the lands 72 and tightly bonding the disk substrate 70 and a support plate 76. The support plate 76 is a disk measuring about 0.6 mm in thickness and made of polycarbonate.

On the DVD-R 30, digital data undergoes the 8-16 modulation and is stored according to a mark-edge scheme. According to the 8-16 modulation, the recorded data includes at least two "0" following every "1". On the DVD-R 30, a mark edge (i.e., a boundary between the recording mark 78 and the recording space 79) represents a flip from "0" to "1". As a result, the minimum recording mark 78 (about 0.40 μm in length) corresponds to 3 bits of data. The minimum recording space 79 is alike. Regarding the recording areas on the grooves 71, namely the groove tracks, the length per bit of data is hereafter expressed as 1 U. In particular, the minimum length of the recording mark 78 is 3 U.

One sync frame is assigned to every 1488 U length of continuous region on the groove tracks. In each of the sync frames, 4 bytes of a synchronization signal and 182 bytes of data are recorded.

One period of the wobble 71a is equal to 186 U. Accordingly, each of the sync frames includes 8 periods of the wobble 71a. The front ends of the sync frames are fixed to agree with the tops of the wobble 71a.

One sector refers to successive 26 sync frames on the groove tracks. In each of the sectors, 182 bytes×26 of data are recorded. On the DVD-R 30, recorded data undergoes the 8-16 modulation. Therefore, an essential amount of storage is reduced by half, and equal to 182 bytes×13 per sector. According to the DVD logical format, data in each of the sector includes a sector ID (4 bytes), sector-ID error correction codes (2 bytes), a reserve area (6 bytes), error detection codes (4 bytes), internal parity codes (10 bytes×13), and external parity codes (172 bytes) (the values in the parentheses indicates the respective amounts of data). Except for these areas, the essential amount of storage is, accordingly, 2048 bytes=2 KB per sector.

One ECC block refers to successive 16 sectors on the groove tracks. Here, ECC stands for error correction code. According to the DVD-R logical format, the essential amount of storage is 2 KB×16=32 KB per ECC block.

Onto the LPPs 77, predetermined LPP signals are recorded at the time of the manufacture of the DVD-R 30. The LPP signals include, for example, synchronization signals for synchronization with the sync frames during the data recordings and reproductions. The LPP signals, in addition, include items of address information of the sync frames on the adjacent groove tracks.

Figure 2:
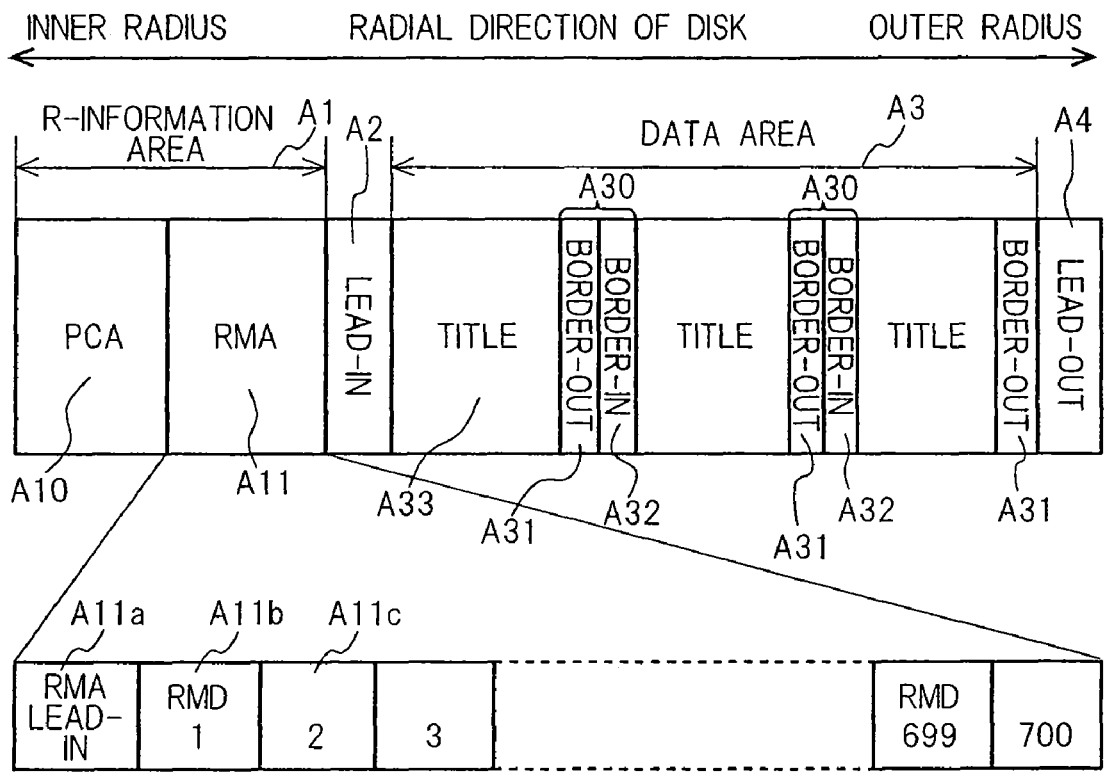
FIG. 2 shows physical formats of the whole of the recording area of the DVD-R 30 according to Example 1 of the invention and a recording management information area (RMA) A11 in the recording area.

FIG. 2 shows physical formats of the whole of the recording area of the DVD-R 30 and a recording management information area (RMA) A11 in the recording area. The whole of the recording area of the DVD-R 30 is divided into an R-information area A1, a lead-in area A2, a data area A3, and a lead-out area A4 in radial order from the inner radius of the disk. Each of these areas consists of an integral number of the ECC blocks and is identified with the LPPs 77 (see FIG. 1).

The R-information area A1 includes a recording power calibration area (PCA) A10 and an RMA A11. The PCA A10 is an area where a predetermined test pattern is written on a trial basis during the corrections of write strategy and the optimum recording power calibrations (OPCs) described later. The RMA A11 is an area where information on the file-system of the DVD-R 30 and recording management data (RMD) are to be stored. The RMA A11 consists, for example, of 701 ECC blocks. Except for the front-end block, each of the other 700 ECC blocks A11b, A11c, . . . is an area where the RMD of one title is to be stored (which is hereafter referred to as a RMD block). The front-end ECC block is referred to as an RMA lead-in area A11a and serves as a buffer between the PCA A10 and the RMD blocks A11b, A11c, . . . . The trial writings into the PCA A10 thereby avoid overwriting into the RMD blocks, and hence, prevent corruption of the RMD.

The lead-in area A2 represents the front end of the data area A3. When the first recording of a data stream onto the DVD-R 30 is finished, i.e., at the end of the recording of the first title A33, data is recorded onto the lead-in area A2.

The data area A3 is an area where target data streams of recording, namely titles are to be written. At each time of the title recordings, the data area A3 is partitioned with a border zone A30 into a recording area A33 of the title and the outer yet-to-be recorded area. When a plurality of titles is recorded onto the DVD-R 30, each of the titles is recorded onto an interval between two of the border zones A30.

The border zone A30 consists of a border-out area A31 and a border-in area A32 faced toward the inner and outer radius of the disk, respectively. A linking process at the start of the title recording allocates the border-in area A32 and the border-out area A31 to immediately preceding and immediately following areas of the title recording area, respectively. At the end of the title recording, data is recorded into the border-in area A32 and the border-out area A31.

The lead-out area A4 represents the rear end of the data area A3. A finalizing process at the end of the recording of the final title onto the DVD-R 30 records data into the lead-out area A4.

Figure 3:
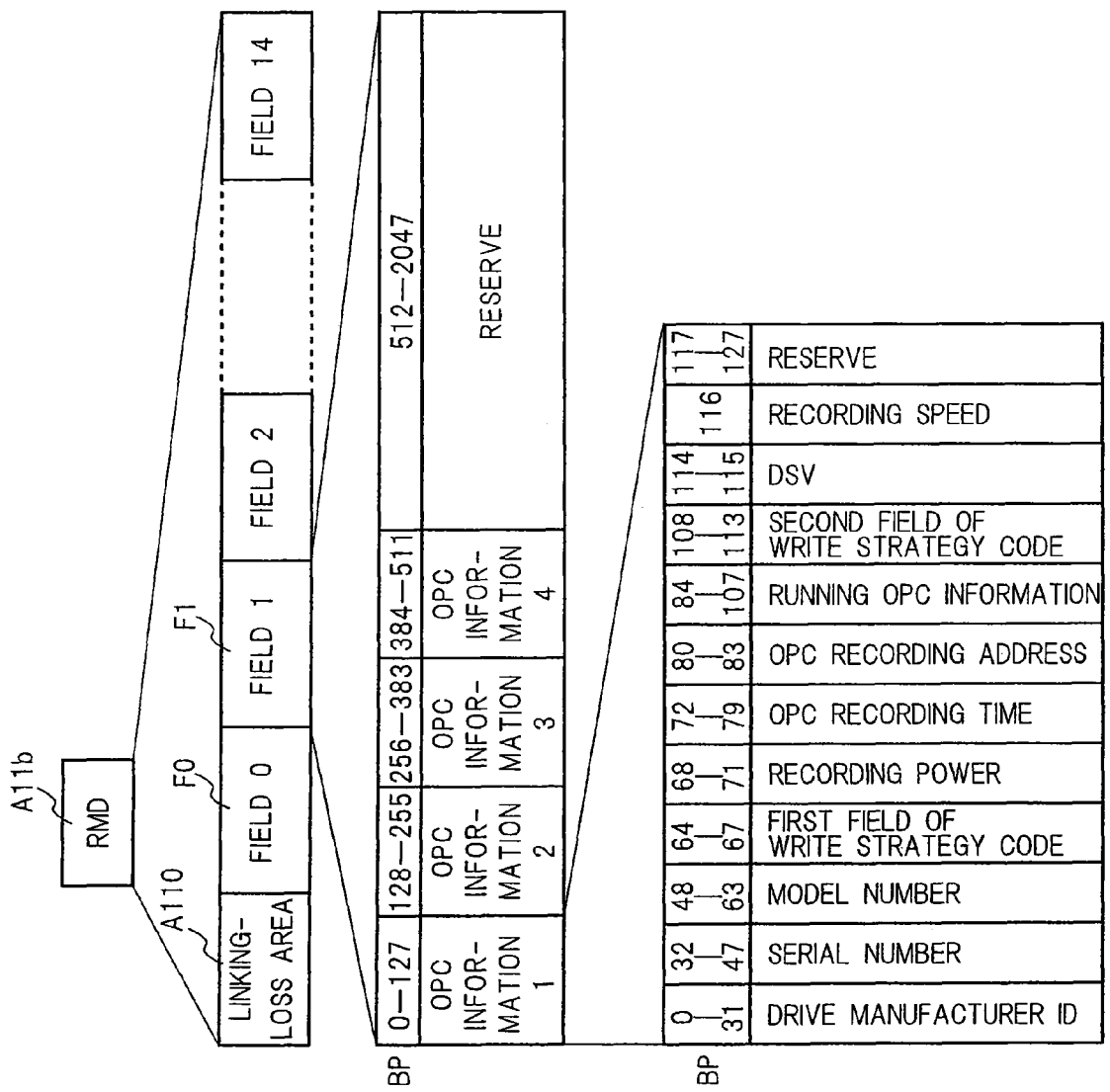
FIG. 3 shows a detail of the physical format of an RMD block A11b in the RMA A11 shown in FIG. 2.

FIG. 3 shows a detail of the physical format of an RMD block A11b in the RMA A11. The RMD block A11b consists of one ECC block and includes 16 sectors.

The first sector, referred to as a linking-loss area A110, serves as a buffering area between the preceding data recording area. Only 00h is recorded into the linking-loss area A110 as an item of data representing blank. Appending one title after the recording of another title thereby avoids overwriting new items of RMD into the RMD block immediately preceding the recording area of another title. Thus, corruptions of recorded RMD are prevented.

The 15 sectors except for the linking-loss area A 10 are referred to as fields and numbered from 0 to 14 in consecutive order, starting at the first one. In the first field 0 F0, general information on the DVD-R 30 is stored. The information, for example, includes a disk status and a copy of the data indicated by the LPP signal.

In the second field 1 F1, OPC information is stored. The detail of the logical format of the field 1 F1 is shown in FIG. 3. The field 1 F1 consists of one sector wherein 2048 bytes=2 KB of data is stored. Each byte of the data has a serial number, referred to as byte position (BP), from 0 to 2047 in consecutive order, starting at the front end. The OPC information includes 128 bytes of data for each time of title recording, as described later. In BP 0-127, BP 128-255, BP 256-383, and BP 384-511, respective items of the OPC information are stored in a common physical format, organized according to the recorded titles. That is, the field 1 is available for recording of four items of the OPC information. The other areas BP 512-2047 are reserved.

In BP 0-127, for example, the OPC information on the recording of a title corresponding to the RMD block A11b is stored. On the other hand, in BP 128-255, BP 256-383, and BP 384-511, the history of the OPC information on title recordings before the title recording is stored. Thereby, just referring to one of the RMD when recording one title allows a rapid search over the history of the OPC information on the last four times of the title recordings.

FIG. 3 shows a detail of the physical format of the OPC information stored in BP 0-127. In BP 0-31, BP 32-47, and BP 48-63, a drive manufacturer ID, a serial number of a drive, and a model number of the drive are stored, respectively. These items of data are items of information for identifying the DVD-R recorder used for a data recording.

In the first field of write strategy code BP 64-67, a standard write strategy defined in a specification is stored. In the second field of write strategy code BP 108-113, a write strategy actually adopted for the data recording. The write strategy, in general, is a corrected one of the standard write strategy.

In BP 68-107, information on an OPC performed in a data recording is stored. In BP 67-71, a recording power condition actually obtained through the OPC is stored together with an reference value and an amount of a change per step of recording power levels, labeled as recording power. As the reference value, the amount of a change per step, and the recording power condition of the recording power, for example, 6.0 mW, 0.5 mW, and a list showing correspondences between the step numbers and the β values are respectively stored. In BP 72-79, the time when the OPC is performed is stored, labeled as a time stamp. In BP 80-83, the addresses in the PCA A10 undergoing trial writings during the OPC are stored, labeled as power calibration addresses. In BP 84-107, running OPC information is stored. Each of optical disk recording apparatuses is allowed to freely define the running OPC information. For example, fluctuations of recording power levels are measured during title recordings, and stored as the running OPC information.

The running OPC information may include information on correspondences between recording patterns and recording power levels. Here, the information on correspondences between recording patterns and recording power levels refers to information indicating the distributions of the recording power levels for each of recording marks and recording spaces represented by the recording patterns. The information on the correspondences preferably includes information for assigning a first recording power level to the recording pulses corresponding to the front edges of the recording marks, and a second recording power level lower than the first recording power level to the other recording pulses. More specifically, the information is a pair of the difference between the first and second recording power levels (which is hereafter referred to as an additional recording power level) and the second recording power level (which is hereafter referred to as a reference recording power level). Alternatively, the information may be a pair of the ratio between the additional recording power level and the first recording power level and the first recording power level. Furthermore, the information may be a pair of the first recording power level itself and the second recording power level.

In BP 114-115, a DSV (digital sum value) of the data A33 of a title corresponding to the RMD block A11b is stored. The DSV is used for the linking process in the next title recording.

BP 117-127 are reserved.

In BP 116, the recording speed in the title recording is stored, labeled as a recording speed. On a DVD-R according to the prior art, BP 116 was reserved as well as BPI 17-127. On the DVD-R 30 according to the invention, one byte of the reserve areas is used as a recording speed information area. The recording speed of a DVD-R recorder is positive-integer n times as high as the standard speed (single speed) 3.49 m/s (namely an n-times speed). Accordingly, the recording speed information is defined with values corresponding to the positive integer n as follows: single speed (3.49 m/s)=0000b, double speed (6.98 m/s)=0001b, triple speed (10.47 m/s)= 001b, quadruple speed (13.96 m/s)=0011b.

The items of the OPC information are organized according to the recorded titles and stored on the DVD-R 30 as described above. In particular, the items of the OPC information include the items of the recording speed information together with the write strategies and the recording power conditions. In a title recording onto the DVD-R 30, a DVD-R recorder first refers to the RMA, thereby searching the history of the recording speed information in a plurality of the RMD for the recording speed information indicating the recording speed agreeing with the set recording speed of the recorder. When finding the recording speed information indicating the recording speed agreeing with the set recording speed, the recorder further reads the write strategy and the recording power condition from the OPC information including the recording speed information. Thus, the recorder may select the write strategy and the recording power condition appropriate to the set recording speed within a short time. In addition, the recorder performs the corrections of the write strategy and the OPC based on the selected write strategy and the selected recording power condition. As a result, the recorder may reliably and rapidly optimize the write strategy and the recording power condition.

In the case where the OPC information includes the above-mentioned reference and additional recording power levels, a DVD-R recorder may rapidly select the reference and additional recording power levels appropriate to the set recording speed. When recording marks are formed with the recording pulses of the reference and additional recording power levels, distortions of the resulting recording marks are small. Thus, the formations of the recording marks maintain high accuracy regardless of the set recording speeds. This may reduce error rates of the recorded data.

In the above-described DVD-R 30, the OPC information includes the reference and additional recording power levels. Alternatively, the OPC information may include a pair of the ratio between the additional and reference recording power levels and the reference recording power level. Furthermore, the OPC information may include a pair of the first recording power level itself and the second recording power level.

A DVD player, when replaying a title from the above-described DVD-R 30, refers to the RMA and reads the OPC information on the target title. Then, the player may perform proper shaping on analog signals reproduced from the DVD-R 30, and binarize the signal according to the OPC information read, especially the recording speed information. As a result, the player may reduce error rates of reproduced digital signals.

Into the border-out area A31, the RMD of all titles previously recorded may be copied. Thereby, a DVD player, when replaying a title, may read the OPC information more rapidly than referring to the RMA, if referring to the border-out area A31 immediately following the recording area of the target title. Therefore, the player may reduce a switching time from one title to another, especially when successively replaying a plurality of titles. This allows the player to achieve the successive replay of a plurality of titles smoothly and seamlessly.

On the above-described DVD-R 30, the recording speed information is stored in the reserve area, for example, BP 116-127, of one of the OPC information areas of the field 1. Alternatively, the recording speed information may be stored in, for example, BP 512-2047, as an item of the running OPC information of the same OPC information. In addition, the recording speed information may be stored in the reserve area BP 512-2047 of the field 1, or the field 13 or 14 only having reserve areas. In these cases, the recording speed information needs to be recorded, linked with the corresponding write strategy and recording power condition. Preferably, the recording speed information, the write strategy, and the recording power condition are recorded in the same format as the OPC information. Alternatively, information on the link to the write strategy and the recording power condition may be stored together with the recording speed information.

The recording speed information may be stored in a blank area within the PCA or the data area, together with the corresponding write strategy and recording power condition. For example, writing into the border-out area is vulnerable to noises resulting from the likes of surge currents since it is performed in the finishing process of a title recording. In contrast, the likes of the recording speed information may be recorded into the PCA at the end of the OPC and into the blank area during the recording of the title. Accordingly, these recordings resist damage from the noises more than the recordings into the border-out area and hence may reliably record the likes of the recording speed information.

Especially the recordings into the PCA may distribute the likes of the recording speed information among areas except for the RMA, while maintaining the large data area. This may enhance the number of items of the histories of the recording speed information and the like. Note that the recordings into the PCA require recording the link information such as addresses on the PCA, into the RMA. A DVD-R recorder and a DVD player may retrieve the likes of the recording speed information based on the link information.

Onto the DVD-R 30, the OPC information is recorded at each time of the title recordings, and thereby the write strategies and the recording power conditions organized according to the recording speeds are built up as their histories. Alternatively, the write strategies and the recording power conditions organized according to the recording speeds may be measured at the time of the manufacture of the DVD-R 30, and thereby the result of the measurements may be stored on the DVD-R 30.

The recordable optical disk 30 according to Example 1 is the DVD-R, i.e., the write-once optical disk. Alternatively, the recordable optical disk according to the invention may be a rewritable optical disk such as a DVD-RW and a DVD-RAM. When data is overwritten onto the rewritable optical disk, existing recording marks must be reliably erased. On the other hand, shapes of recording marks are distorted with increases in recording speed. In the case where the rewritable optical disk includes the histories of the likes of the recording speed information similar to the histories included by the above-described DVD-R 30, an optical disk recording apparatus may refer to the recording speed information on the target data of erasing. Thereby, the apparatus may optimize the write strategy and the erasing power level according to the recording speed specified by the recording speed information. As a result, traces of the target data of erasing may be prevented from remaining, and thereby the high reliability in overwriting may be maintained. Thus, the quality of recorded data is improved in high-speed recordings onto rewritable optical disks.

Example 2

Figure 4:
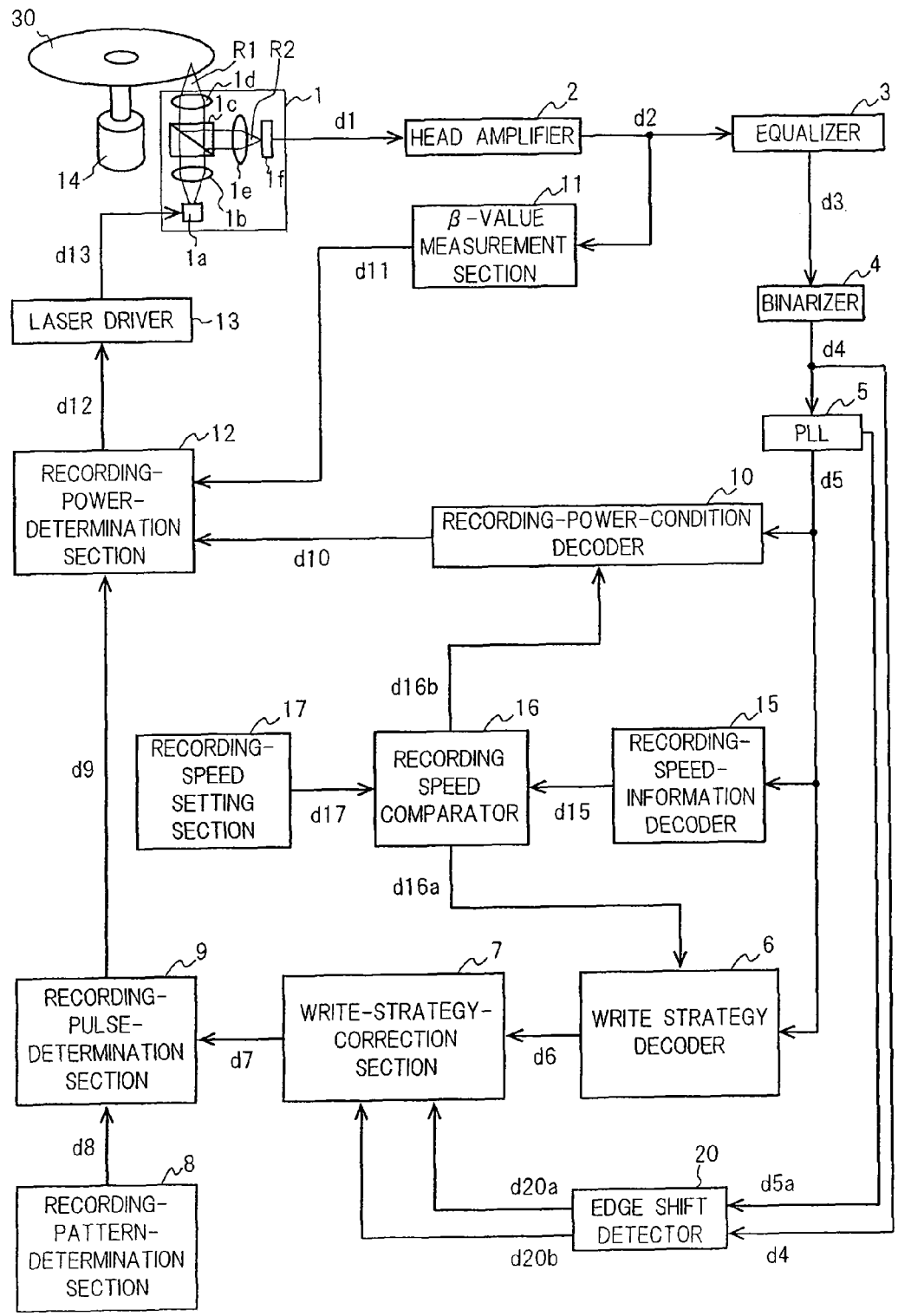
FIG. 4 is a block diagram showing a DVD-R recorder according to Example 2 of the invention.

FIG. 4 is a block diagram showing a DVD-R recorder according to Example 2 of the invention.

A DVD-R 30 is a DVD-R similar to the above-described one of Example 1 of the invention. A spindle motor 14 revolves the DVD-R 30 around its center axis. Then, the revolution per minute of the spindle motor 14 is controlled such that the line velocity of the DVD-R 30 is maintained substantially constant at the focus of the laser light R1 from a pickup 1. The line velocity is set to be equal to a positive integral multiple of the standard speed 3.49 m/s.

The pickup 1, at the time of data reproduction, radiates the DVD-R 30 with laser light R1 and converts the reflected light R2 into an analog signal d1 as follows. A semiconductor laser 1*a* emits the laser light R1 at a predetermined power level. The power level (reproducing power) is too low to change the property of the recording layer of the DVD-R 30, that is, approximately 0.7-1 mW. The laser light R1 emitted by the semiconductor laser 1*a* passes through a collimator lens 1*b*, a splitter 1*c*, and an objective lens 1*d* in this order, then focused on the recording layer of the DVD-R 30 and reflected off the reflection layer. The reflected laser light R2 passes through the objective lens 1*d*, the splitter 1*c*, and a detection lens 1*e* in this order, then focused on a photodetector 1*f*. The photodetector 1f detects and converts the reflected laser light R2 into an analog signal d1. The amplitude of the analog signal d1 is substantially proportional to the intensity of the reflected laser light R2.

A head amplifier 2 receives and amplifies the analog signal d1 from the pickup 1. An equalizer 3 performs shaping on the analog signal d2 amplified by the head amplifier 2. A binarizer 4 compares the analog signal d3 undergoing the shaping of the equalizer 3 with a predetermined threshold value, and binarizes the analog signal d3 with respect to the threshold value, thereby converting the analog signal d3 undergoing the shaping into a digital signal d4. A PLL 5 synchronizes the digital signal d4 and a reference clock signal d5a, and thereby a digital signal d5 is decoded into data.

On the DVD-R 30, a standard write strategy and the history of write strategy are both stored in a manner similar to Example 1. In a format similar to that shown in FIG. 3, for example, the standard write strategy and a write strategy actually adopted are stored in the first and second fields of write strategy code in the field 1 of the RMD block, respectively. A write strategy decoder 6 receives the digital signal d5 from the PLL 5, decodes it into a write strategy d6, and then transmits the decoded write strategy d6 to a write-strategy-correction section 7 according to a first decoding signal d16a from a recording speed comparator 16.

On the DVD-R 30, a standard recording power condition and the history of recording power condition are both stored in a manner similar to Example 1. In a format similar to that shown in FIG. 3, for example, the standard recording power condition and a recording power condition actually obtained through the OPC are both stored in the field 1 of one of the RMD blocks, labeled as recording powers. A recording-power-condition decoder 10 receives the digital signal d5 from the PLL 5, decodes it into a recording power condition d10, and transmits the decoded recording power condition d10 to a recording-power-determination section 12 according to a second decoding signal d16b from the recording speed comparator 16.

On the DVD-R 30, the history of recording speed information is brought into correspondence with the histories of write strategy and recording power condition, and stored in a manner similar to Example 1. In a format similar to that shown in FIG. 3, for example, the OPC information in the fields 1 of the RMD blocks includes the recording speed information indicating the actual recording speeds in respective title recordings. A recording-speed-information decoder 15 receives the digital signal d5 from the PLL 5, decodes it into an item of recording speed information d10, and transmits the decoded item of recording speed information d15 to the recording speed comparator 16.

A recording-speed setting section 17 sets a recording speed according to an input from a user. When the set recording speed is, for example, an n-times speed, the set item of recording speed information d17 represents the set recording speed as the positive integer n.

A recording speed comparator 16 receives the decoded item of recording speed information d15 from the recording-speed-information decoder 15 and the set item of recording speed information d17 from the recording-speed setting section 17, and compares the items with each other. When a result of the comparison indicates an agreement between the decoded item of recording speed information d15 and the set item of recording speed information d17, the recording speed comparator 16 transmits the first decoding signal d16a and the second decoding signal d16b to the write strategy decoder 6 and the recording-power-condition decoder 10, respectively. Thereby, the write strategy decoder 6 outputs the decoded write strategy d6, while the recording-power-condition decoder 10 outputs the decoded recording power condition d10.

A β-value measurement section 11 measures the β value of the analog signal d3 undergoing the shaping of the equalizer 3. The measured β value d11 is transmitted to the recording-power-determination section 12.

An edge-shift detector 20 receives the digital signal d4 from the binarizer 4, as well as the clock signal d5a from the PLL 5. The edge-shift detector 20 detects the front-end edge shifts d20a and the rear-end edge shifts d20b on the digital signal d4 through comparing the digital signal d4 with the clock signal d5a. The detected edge shifts d20a and d20b are transmitted to the write-strategy-correction section 7.

The write-strategy-correction section 7 receives the decoded write strategy d6 from the write strategy decoder 6, and stores it into an internal memory. The write-strategy-correction section 7, when correcting the stored write strategy d6, compares each of the front-end edge shifts d20a and the rear-end edge shifts d20b of the digital signal d4 with a predetermined, acceptable limit. Results of the comparison are brought into correspondence with the stored write strategy d6, and stored. After that, the write strategy d6 is corrected by a predetermined correction value. The corrected write strategy d7 is stored and transmitted to a recording-pulse-determination section 9.

A recording-pattern-determination section 8 determines a recording pattern corresponding to the target data of recording. Here, the target data of recording is modulated in the 8-16 modulation scheme, and includes two through ten of "0" following every "1". The target data of recording is converted into a recording pattern such that each flip from "0" to "1" in the target data of recording corresponds to a pulse edge in the recording pattern. Thereby, pulse widths of the recording pattern correspond to 3-11 bits of the target data of recording. When the pulse width per bit is set to be equal to the clock period 1 T of the PLL 5, the pulse widths of the recording pattern are 3-11 T. Similarly, negation times of the recording pattern are 3-11 T.

The data actually recorded onto the DVD-R 30 includes synchronization signals in addition to the target data of recording. The recording-pattern-determination section 8 converts the synchronization signal into 14 T widths of pulses in the recording pattern.

The recording-pattern-determination section 8 further stores a predetermined, test recording pattern in an internal memory. The recording-pattern-determination section 8 outputs the test recording pattern at the times of corrections of write strategy and OPCs as described later.

The recording-pulse-determination section 9 converts the recording pattern d8 determined by the recording-pattern-determination section 8 into recording pulses d9 according to a predetermined write strategy.

The recording-power-determination section 12 determines recording power levels of the semiconductor laser 1a as follows: The section, at the beginning of a title recording, performs the OPC based on the decoded recording power condition d10. In the OPC, test recording marks based on the test recording pattern are written into the DVD-R 30 on a trial basis. Next, an analog signal is reproduced from the test recording marks and the β value of the analog signal is measured by the β-value measurement section 11. The measured β value d11 is fed back to the recording-power-determination section 12. The recording-power-determination section 12 calibrates the recording power levels based on the β value d11. Thus, the recording power levels d12 are determined and then transmitted to a laser driver 13.

The laser driver 13 controls a driving current d13 of the semiconductor laser 1a in response to the recording pulses d9 and the recording power levels d12. The driving current d13 of a value corresponding to the recording power level d12 flows through the semiconductor laser 1a, especially during the assertion times of the recording pulses d9. Thereby, the semiconductor laser 1a emits the laser light R1 of the recording power levels d12 and substantially identical in waveform with the recording pulses d9. As a result, a sequence of recording marks 78 and recording spaces 79 substantially corresponding to the recording pattern d8 is formed in the groove 71 of the DVD-R 30. Here, a 1 U length of groove track corresponds to the clock period 1 T of the PLL 5.

Figure 5:
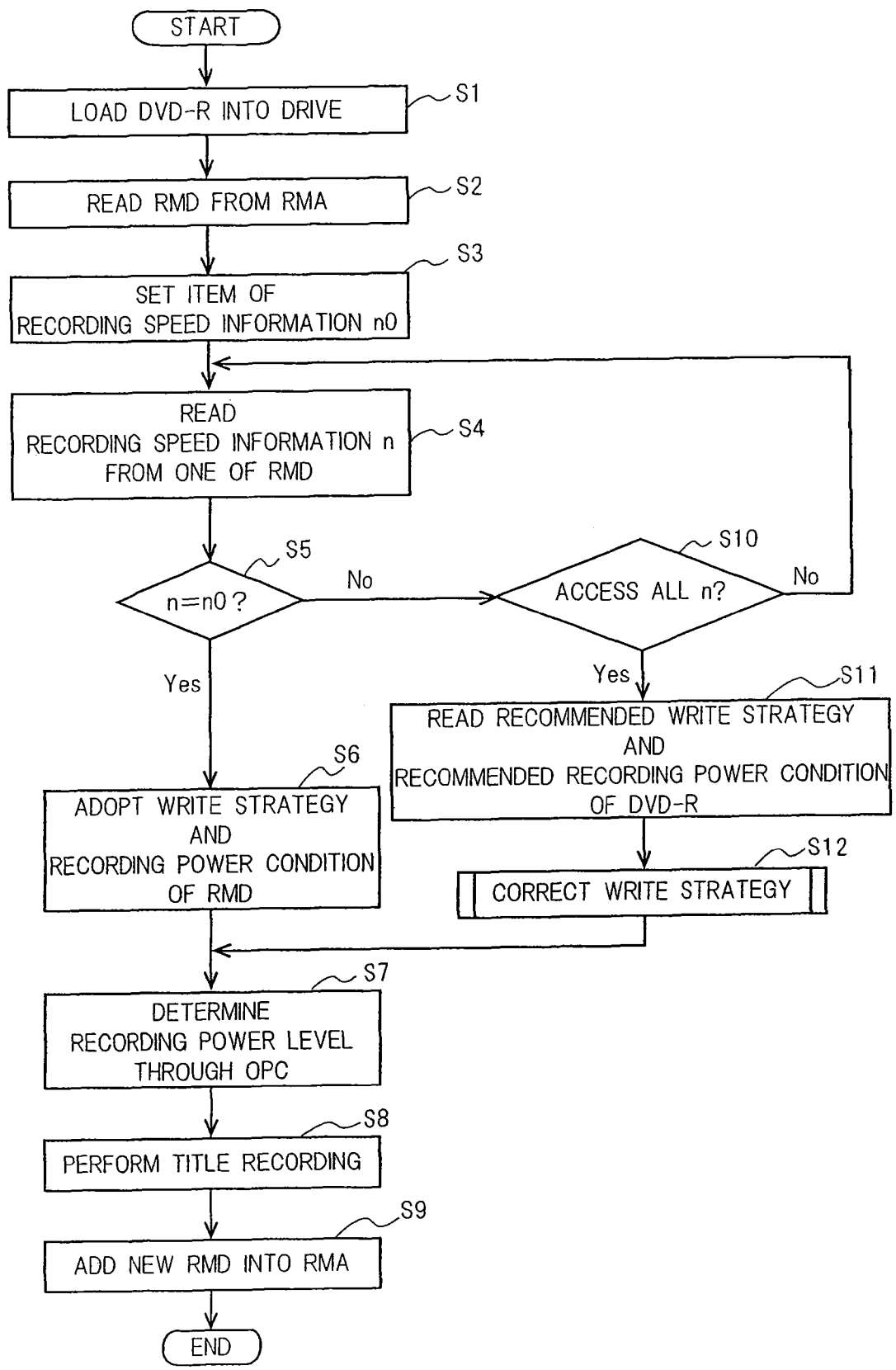
FIG. 5 is a flowchart showing a title recording of the DVD-R recorder according to Example 2 of the invention.

The DVD-R recorder according to Example 2 of the invention performs the title recording as follows: FIG. 5 is a flowchart showing the title recording of the DVD-R recorder according to Example 2 of the invention.

<Step S1>

The DVD-R 30 is loaded into the DVD-R recorder.

<Step S2>

When the loading of the DVD-R 30 is detected, the DVD-R 30 is revolved with the spindle motor 14. The pickup 1 first refers to the RMA of the DVD-R 30 and reads the RMD.

<Step S3>

A user sets a recording speed through the recording-speed setting section 17. More specifically, when the set recording speed is, for example, n0-times speed, the recording-speed setting section 17 transmits information indicating the positive integer n0 as a set item of recording speed information d17.

<Step S4>

The recording-speed-information decoder 15 decodes one of the read RMD into items of recording speed information in succession, preferably starting from the latest one. The decoded item of recording speed information d15 indicates, for example, a positive integer n.

<Step S5>

The recording speed comparator 16 compares the decoded item of recording speed information d15 with the set item of recording speed information d17, more specifically, compare the two positive integers n and n0. When they agree with each other, the process goes to Step S6. Otherwise, the process goes to Step S10.

<Step S6>

The write strategy decoder 6 and the recording-power-condition decoder 10 decode the OPC information including the decoded item of recording speed information d15 read at Step S4, into the write strategy and the recording power condition, respectively. The recording speed comparator 16 outputs the first decoding signal d16a and the second decoding signal d16b. In response to the first decoding signal d16a, the write strategy decoder 6 transmits the decoded write strategy d6 to the write-strategy-correction section 7. The write-strategy-correction section 7 stores the decoded write strategy d6 into the internal memory without correction, and transmits it to the recording-pulse-determination section 9. In response to the second decoding signal d16b, the recording-power-condition decoder 10 transmits the decoded recording power condition d10 to the recording-power-determination section 12.

Thus, the DVD-R recorder according to Example 2 searches the history of the OPC information stored on the DVD-R 30, for the write strategy and the recording power condition adopted in the title recording at the recording speed n equal to the set recording speed n0, on the basis of recording speed information. Thereby, the write strategy and the recording power condition appropriate to a set recording speed n0 may be selected within a short time.

<Step S10>

A judgment whether accessing the whole history of recording speed information stored in the RMA ends is performed. When accessing the whole history has already ended, the process goes to Step S11. Otherwise, the process returns to Step S4.

<Step S11>

A recommended write strategy and a recommended recording power condition are read from the DVD-R 30. Here, the following may be selected as the recommended write strategy and the recommended recording power condition, for example: The field 1 of the RMD block is accessed and information on the drive is read. Based on the information, the histories of write strategy and recording power condition recorded on the DVD-R 30 are searched for those recorded by the same DVD-R recorder. If they are found, they are adopted as the recommended write strategy and the recommended recording power condition. Alternatively, a write strategy and a recording power condition recorded by the same type of DVD-R recorder may be retrieved and adopted as the recommended write strategy and the recommended recording power condition.

The recommended write strategy is transmitted from the write strategy decoder 6 to the recording-pulse-determination section 9 through the write-strategy-correction section 7. Then, the write-strategy-correction section 7 stores the recommended write strategy into the internal memory.

<Step S12>

The recommended write strategy and the recommended recording power condition read at Step S11 correspond to, in general, a recording speed different from the set recording speed. In such a case, the following optimization is performed since the recommended write strategy and the recommended recording power condition are inappropriate to the current title recording.

Figure 6:
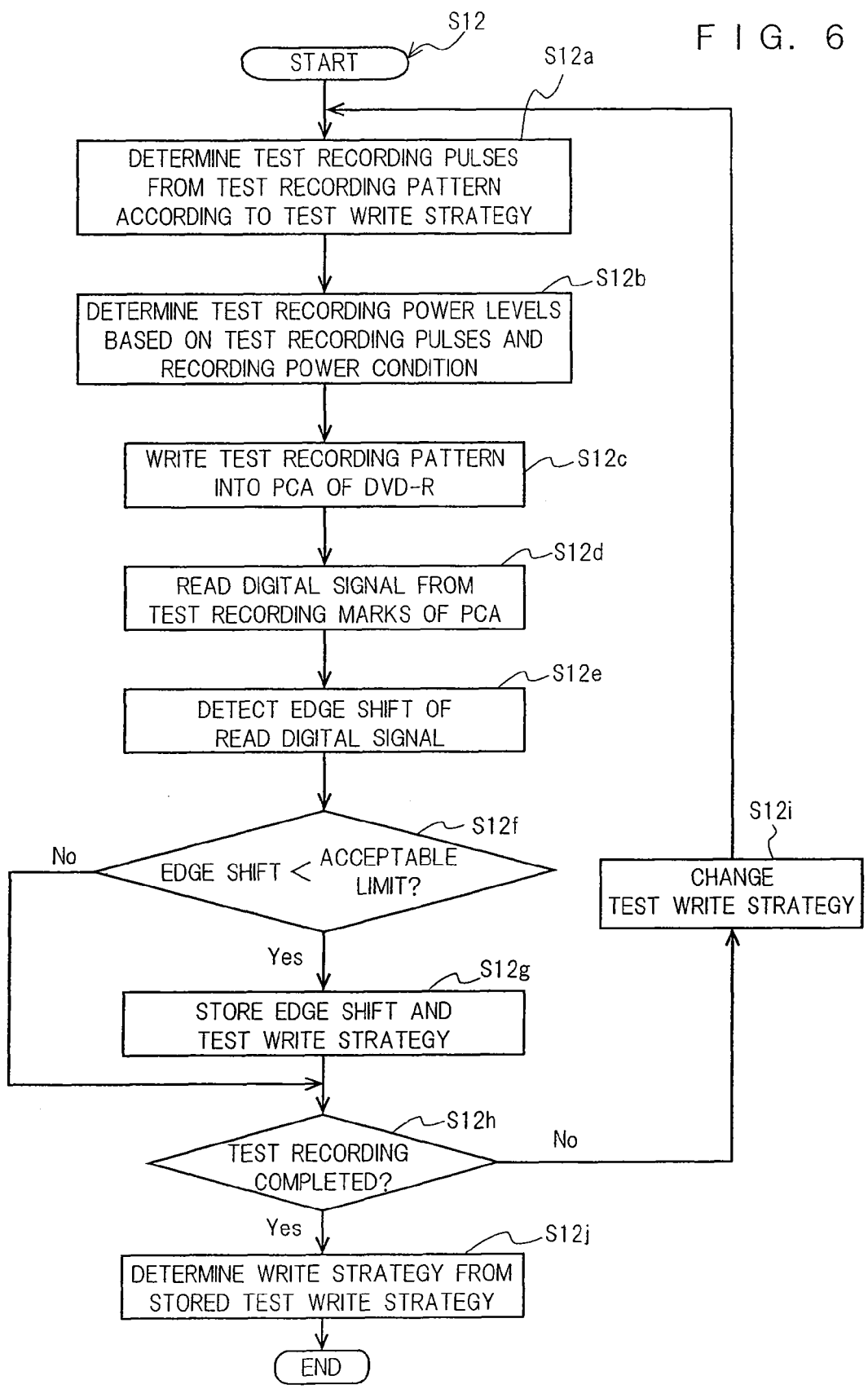
FIG. 6 is a flowchart showing Step S12 of correcting a write strategy in the DVD-R recorder according to Example 2 of the invention.

First, the following correction of the write strategy is performed, thereby optimizing the recommended write strategy. FIG. 6 is a flowchart of the correction of write strategy (Step S12).

Substep S12a: The recording-pattern-determination section 8 outputs a predetermined test recording pattern d8. The recording-pulse-determination section 9 converts the test recording pattern d8 into test recording pulses d9 according to a test write strategy. Here, the above-mentioned recommended write strategy is adopted as an initial test write strategy.

Substep S12b: The recording-power-determination section 12 determines recording power levels corresponding to test recording pulses d9 according to the recommended recording power condition.

Substep S12c: The laser driver 13 drives the semiconductor laser 1a to emit laser light at the recording power level d12. Thereby, a train of recording marks corresponding to the test recording pattern (test recording marks) is formed in the PCA of the DVD-R 30.

Substep S12d: The pickup 1 radiates the test recording marks in the PCA with laser light at a reproducing power level, and detects the reflected light. The reflected light detected is converted into an analog signal d1, and further into a digital signal d4 through the head amplifier 2, the equalizer 3, and the binarizer 4.

Substep S12e: The PLL 5 synchronizes the digital signal d4 obtained at Step S12d with the clock signal d5a, and at the same time, transmits the clock signal d5a to the edge shift detector 20.

Substep S12f: The edge shift detector 20 compares the digital signal d4 from the binarizer 4 with the clock signal d5a from the PLL 5, thereby detecting the front-end edge shifts d20a and the rear-end edge shifts d20b on the digital signal d4. The write-strategy-correction section 7 compares the front-end edge shifts d20a and the rear-end edge shifts d20b with respective, acceptable limits.

Substep S12g: When both the front-end edge shift d20a and the rear-end edge shift d20b are smaller than the acceptable limits, the write-strategy-correction section 7 brings the edge shifts into correspondence with the test write strategy, and stores the edge shifts into the internal memory.

Substep S12h: A judgment whether the formations of test recording marks are continued is performed. When the formations of recording marks end, the process goes to Substep S12j. Otherwise, the process goes to Substep S12i.

Substep S12i: The write-strategy-correction section 7 changes the test write strategy by a predetermined correction value, and then transmits the corrected test write strategy to the recording-pulse-determination section 9 and stores it into the internal memory, as a new test write strategy. After that, the process returns to Substep S12a and repeats Substeps S12a-S12h.

Substep S12j: Among the test write strategies stored in the memory of the write-strategy-correction section 7, the write strategy is determined for the title recording. For example, this determination is performed as follows. In Substep S12d, the amplitudes of the digital signals corresponding to the respective test write strategies are measured and stored. The write strategy corresponding to the maximum amplitude is selected among the test write strategies stored in the memory of the write-strategy-correction section 7.

<Step S7>

The OPC is performed after the determination of the write strategy at the above-described Step S6 or S12, as follows: The recording-pattern-determination section 8 outputs another test recording pattern d8. The recording-pulse-determination section 9 determines test recording pulses d9 based on the test recording pattern d8. The recording-power-determination section 12 sets a recording power level corresponding to the test recording pulses d9 to be a predetermined, initial level. The initial level is determined as follows. First, a recording power level corresponding to the target β value is selected from the recording power condition. For example, the recording power level is assumed to be 16.0 mW. Next, the initial level of recording power is set to be a level below the recording power level by a predetermined value. When the predetermined value is 2.0 mW, for example, the initial level is determined to be 14.0 mW. Here, the target β values are determined in advance for the DVD-R recorder according to the types of the DVD-R 30. The setting suppresses error rates of reproduced digital signals at or below a predetermined, acceptable limit. Alternatively, the target β values may be stored in the RMA of the DVD-R 30.

The laser driver 13 drives the semiconductor laser 1a to emit laser light at the recording power level d12. Thereby, test recording marks are formed in the PCA of the DVD-R 30.

The pickup 1 radiates the test recording marks in the PCA with laser light at a reproducing power level, and detects the reflected light. The reflected light detected is converted into an analog signal d1. The analog signal d1 is further amplified with the head amplifier 2 and undergoes the shaping of the equalizer 3. The β-value measurement section 11 measures a β value d11 on the analog signal d3 undergoing the shaping of the equalizer 3. The recording-power-determination section 12 stores the measured β value d11. After that, the above-described process is repeated with changes of the recording power level from the initial level in steps of a predetermined value. When the initial level is 14.0 mW and the predetermined value is 0.5 mW, for example, the recording power level set following the initial level is 14.5 mW.

After that, the β value is measured on the analog signal reproduced from the test recording marks and stored, at each time when the recording power level is changed by one step and the test recording marks are formed at the recording power level. This results in a new recording power condition, i.e., a list showing correspondences between the numbers of the changes of the recording power level (step numbers) and the measured β values. On the list, for example, according to the recording power levels varying in the steps of 0.5 mW, i.e., 14.0 mW at step number 0 (initial value), 14.5 mW at step number 1, 15.0 mW at step number 2 ..., and 18.0 mW at step number 8, the β values are organized, brought into correspondence with the step numbers 0-8, and recorded. The recording power level corresponding to the target β value is selected from the recording power condition. Thus, the optimum recording power level is determined.

In particular, the DVD-R recorder according to Example 2 of the invention retrieves the recording power condition appropriate to the set recording speed from the history stored on DVD-R 30 and provides the recording power condition for the recording-power-determination section 12. Thereby, the above-described OPC may optimize the recording power levels reliably and within a short time.

<Step S8>

The title recording starts, adopting the write strategy determined at Step S6 or S12 and the recording power levels determined through the OPC, as described above. At the start, a judgment whether other titles are recorded on the DVD-R 30 is performed first, based on the RMD. When other titles are recorded, a linking process such as allocation of border zones is performed between the data area of the titles and the data area for a new title. After that, the new title is recorded.

<Step S9>

A finishing process of title recording is performed. For example, the RMD on the current title is appended in the RMA. In addition, data is written into the border-in area and the border-out area. In particular, the recording speed information, the write strategy, and the recording power condition are recorded as the common OPC information into the field 1 of the RMD block. The RMD is further copied into the border-out area for the current title.

The DVD-R recorder according to Example 2 of the invention adopts the following write strategy according to the set recording speed, thereby achieving formations of recording marks with high accuracy in a substantially independent manner of the set recording speeds.

Figure 7:
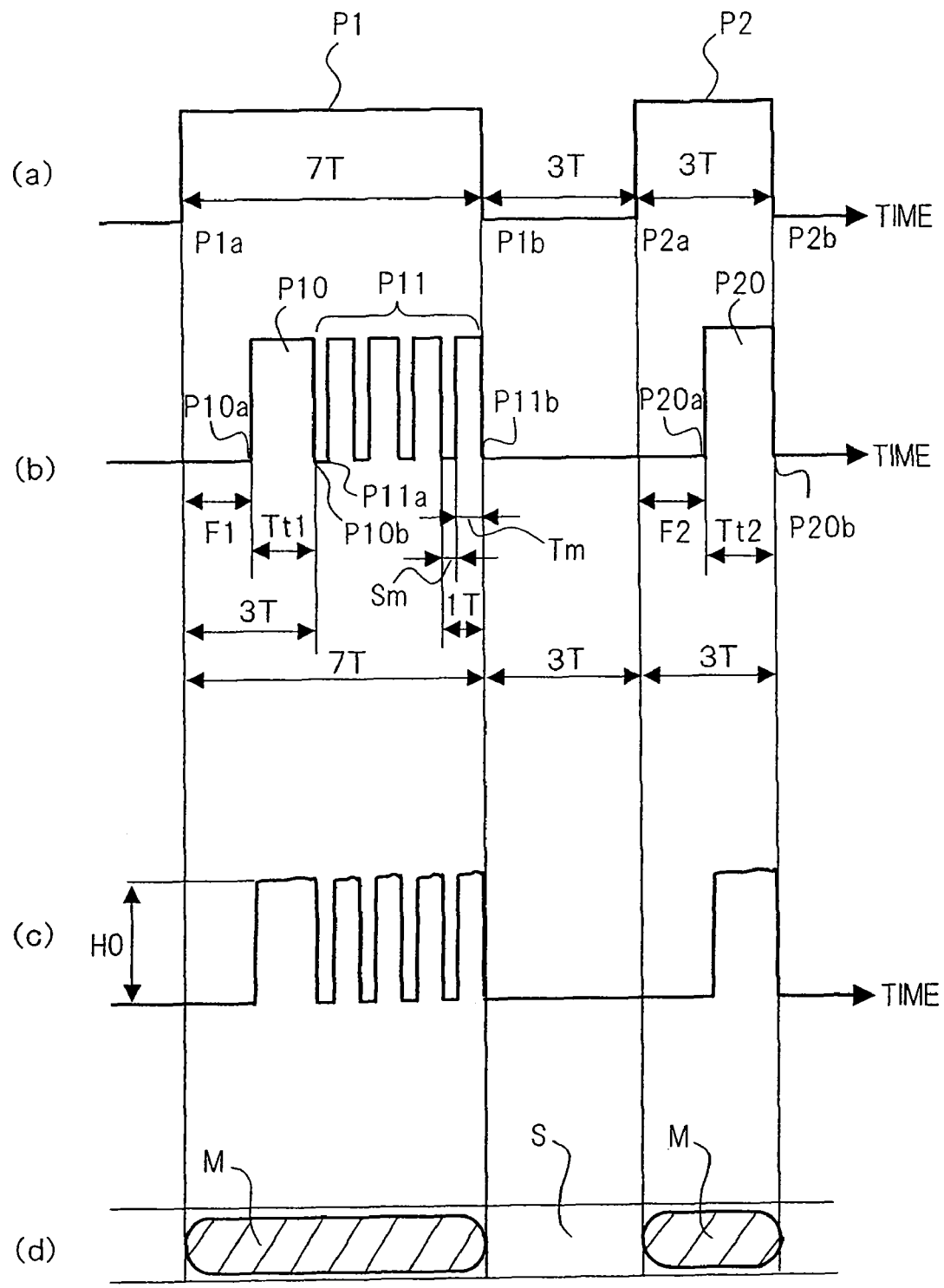
FIG. 7 is a schematic diagram showing a relation between a write strategy adopted in a single-speed recording of the DVD-R recorder according to Example 2 of the invention and recording marks, where (a)-(c) show the waveforms of a recording pattern, recording pulses, and laser pulses of a semiconductor laser 1a, respectively, and (d) shows recording marks M and recording spaces S formed in the recording layer of the DVD-R 30 by the laser pulses shown in (c)

FIG. 7 shows an example of the relation between a write strategy adopted by the DVD-R recorder according to Example 2 for single-speed recordings and recording marks. The parts (a)-(c) of FIG. 7 are diagrams showing the waveforms of a recording pattern, recording pulses, and laser pulses of the semiconductor laser 1a, respectively. The part (d) of FIG. 7 shows recording marks M and recording spaces S formed in the recording layer of the DVD-R 30 by the laser pulses of (c). Here, the unit T of pulse width corresponds to the clock period of the PLL 5. The pulse widths and intervals of the recording pattern are both set to be integral multiples of the clock period.

An example of the recording pattern is shown in (a) of FIG. 7. The recording pattern comprises a first pulse P1 having 7 T in width, a negation time having 3 T in length, and a second pulse P2 having 3 T in width, in this order starting at the front end. According to the write strategy for use in single-speed recordings, the recording pulses shown in (b) FIG. 7 correspond to the recording pattern.

The portion of the recording pulses corresponding to the first pulse P1 in the recording pattern consists of a first top pulse P10 and the subsequent multi-pulses P11. The first top pulse P10 has a width Tt1=p1×T (p1: a positive rational number). The front end P10a of the first top pulse P10 is set at a point corresponding to the front end P1a of the first pulse P1 in the recording pattern with a front-end lag F1=f1×T (f1: a positive rational number). On the other hand, the rear end P10b of the first top pulse P10 is set at a point corresponding to the front end P1a of the first pulse P1 in the recording pattern with a lag of 3 T. Thus, f1+p1=3.

The multi-pulses P11 have a constant period of 1 T. Each pulse of the multi-pulses P11 has a constant width Tm=m×T (m: a positive rational number). The interval from the rear end P10b of the first top pulse P10 to the front extremity P11a of the multi-pulses P11 and negation times in the multi-pulses P11 each have a constant value Sm=s×T (s: a positive rational number). Thus, m+s=1. The rear extremity P11b of the multi-pulses P11 agrees with the rear end P1b of the first pulse P1 in the recording pattern.

The portion corresponding to the second pulse P2 in the recording pattern consists of a second top pulse P20 only. Under the write strategy of the DVD-R recorder according to Example 2, the recording pulses may comprise multi-pulses following top pulses when pulse widths of the recording pattern exceeds the minimum mark length 3 T. In contrast, a recording pulse consists of a top pulse only for a minimum pulse (3 T in pulse width) in the recording pattern.

The second top pulse P20 has a width of Tt2=p2×T (p2: a positive rational number). The front end P20a of the second top pulse P20 is set at a point corresponding to the front end P2a of the second pulse P2 in the recording pattern with a front-end lag F2=f2×T (f2: a positive rational number). The rear end P20b of the second top pulse P20 is set at a point corresponding to the front end P2a of the second pulse P2 in the recording pattern with a lag of 3 T. Thus, f2+p2=3. In particular, the rear end P20b of the second top pulse P20 agrees with the rear end P2b of the second pulse P2 in the recording pattern.

According to the recording pulses shown in (b) of FIG. 7, the semiconductor laser 1a emits laser pulses to the DVD-R 30. The waveform of the laser pulses is then shown in (c) of FIG. 7. The height H0 of the laser pulses represents the recording power level. The radiation of the laser pulses forms a train of recording marks M and recording spaces S into the recording layer of the DVD-R 30 as shown in (d) of FIG. 7.

The comparison between (a) and (b) of FIG. 7 shows proper correspondences between ends in the recording pattern and edges of the recording marks. The DVD-R recorder according to Example 2 especially adjusts the front-end lags F1 and F2 and the pulse width Tm of the multi-pulses P11 under the write strategy used in single-speed recordings, thereby establishing proper correspondences between the recording pattern and the recording marks. More specifically, the front-end lag F2 is determined, for example, as a value corresponding to the combination of the mark length 3 T and the preceding space length 3 T of the second pulse P2.

Figure 8:
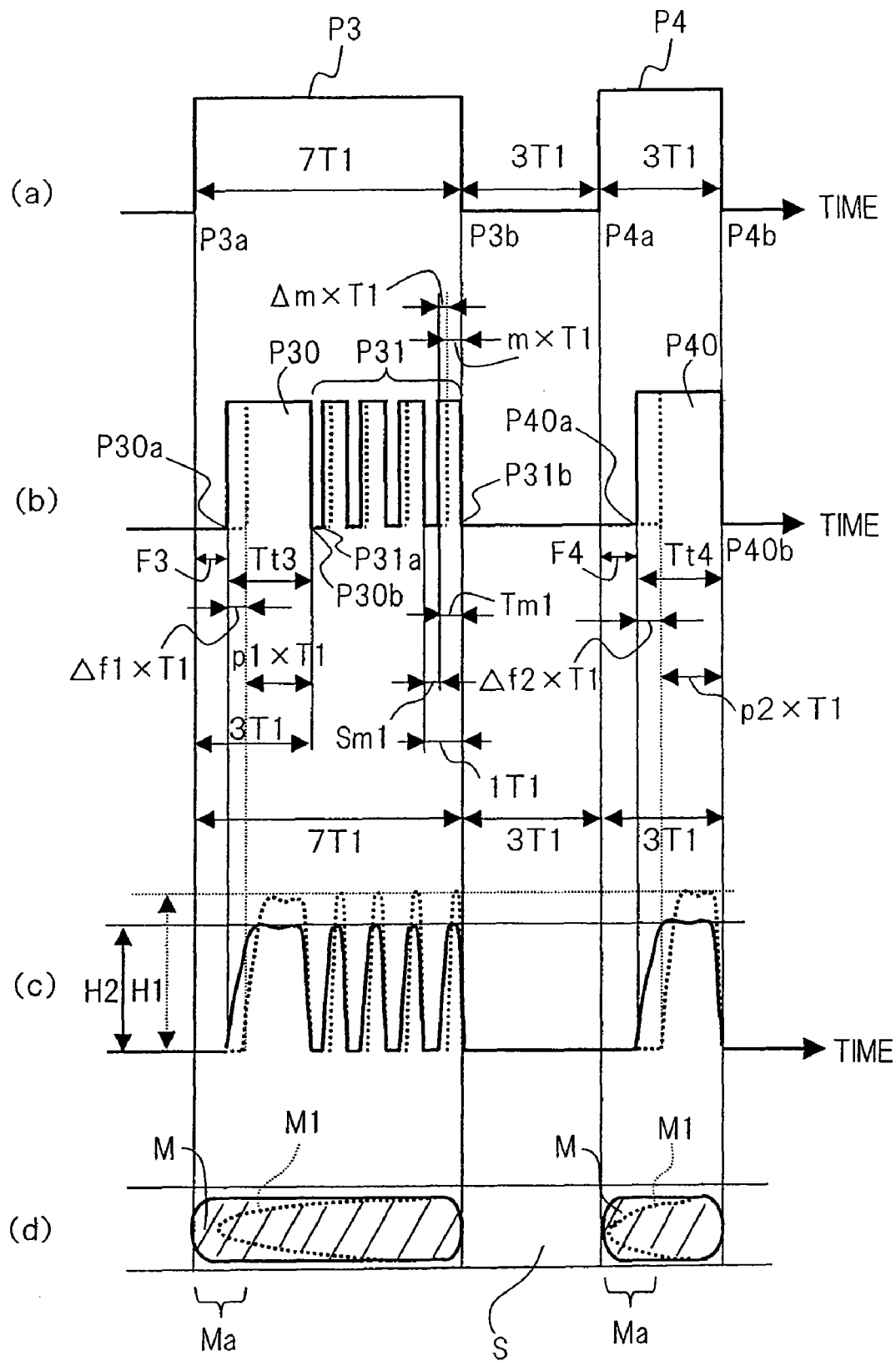
FIG. 8 is a schematic diagram showing a relation between a write strategy adopted in a double-speed recording of the DVD-R recorder according to Example 2 of the invention and recording marks, where (a)-(c) show the waveforms of a recording pattern, recording pulses, and laser pulses of a semiconductor laser 1a, respectively, and (d) shows recording marks M and recording spaces S formed in the recording layer of the DVD-R 30 by the laser pulses shown in (c)

FIG. 8 is a schematic diagram showing a relation between a write strategy used in a double-speed recording and recording marks. The parts (a)-(c) of FIG. 8 show the waveforms of a recording pattern, recording pulses, and laser pulses of the semiconductor laser 1a, respectively. The part (d) of FIG. 8 shows recording marks M and recording spaces S formed in the recording layer of the DVD-R 30 by the laser pulses of (c). As shown in (a) of FIG. 7 and (a) of FIG. 8, the recording pattern in the double-speed recording is set to be substantially identical in shape with that in the single-speed recording. Here, being substantially identical in shape refers to having pulse widths and pulse intervals in common, expressed in the unit of the clock period. The clock period 1 T1 at the double speed is half the clock period 1 T at the single speed (1 T1=1 T/2). Accordingly, the recording pattern resulting from the double-speed recording has half the actual lengths of that resulting from the single-speed recording.

The portion of the recording pulses corresponding to the first pulse P3 in the recording pattern comprises a first top pulse P30 and the subsequent multi-pulses P31.

The rear end P30b of the first top pulse P30 is set at a point corresponding to the front end P3a of the first pulse P3 in the recording pattern with a lag of 3 T1, which is substantially identical in position with the point in the single-speed recording. The front end P30a of the first top pulse P30 is set at a point corresponding to the front end P3a of the first pulse P3 in the recording pattern with a front-end lag F3=(f1−Δf1)×T1. Here, the positive rational number f1 is the front-end lag F1 of the first top pulse P10 of the single-speed recording expressed in the unit of the clock period T at the single speed. The positive rational number Δf1 is a first correction value for the front-end lag F3 of the first top pulse P30 expressed in the unit of the clock period T1 at the double speed. As a result, the first top pulse P30 has a width of Tt3=(p1+Δf1)×T1. Here, the positive rational number p1 is the pulse width of the first top pulse P10 in the single-speed recording expressed in the unit of the clock period T at the single speed. That is, the pulse width Tt3/T1 of the first top pulse P30 expressed in the unit of the clock period T1 at the double speed is fixed through the correction adding the first correction value Δf1 to the pulse width p1 expressed in the unit of the clock period T at the single speed. Since f1+p1=3 in particular, then F3+Tt3=3 T1.

The multi-pulses P31 have a constant period of 1 T1. Each pulse of the multi-pulses P31 has a constant width of Tm1=(m+Δm)×T1 (m, Δm: positive rational numbers). The interval from the rear end P30b of the first top pulse P30 to the front extremity P31a of the multi-pulses P31 and each of negation times of the multi-pulses P31 are a constant value of 5 ml=(s−Δm)×T1 (s: a positive rational number). That is, the pulse width and the negation time of the multi-pulses P31 in the double-speed recording expressed in the unit of the clock period T1 at the double speed are fixed through the corrections adding and subtracting the correction value Δm to the pulse width m and from the negation time s of the multi-pulses P11 in the single-speed recording expressed in the unit of clock period T at the single speed. In particular, m+s=1. Accordingly, the rear extremity P31b of the multi-pulses P31 agrees with the rear end P3b of the first pulse P3 in the recording pattern in a manner similar to that of the recording pulses in the single-speed recording.

The portion of the recording pulses corresponding to the second pulse P4 in the recording pattern consists of a second top pulse P40 only under the write strategy for use in the double-speed recording, similar to the write strategy for use in the single-speed recording. The front end P40a of the second top pulse P40 is set at a point corresponding to the front end P4a of the second pulse P4 in the recording pattern with a front-end lag of F4=(f2−Δf2)×T1. Here, the positive rational number f2 is the front-end lag F2 of the second top pulse P20 in the single-speed recording, expressed in the unit of the clock period T at the single speed. The positive rational number Δf2 is a second correction value for the front-end lag F4 of the second top pulse P40 expressed in the unit of the clock period T1 at the double speed. As a result, the second top pulse P40 has a width of Tt4=(p2+Δf2)×T1. Here, the positive rational number p2 is the pulse width of the second top pulse P20 in the single-speed recording, expressed in the unit of the clock period T at the single speed. That is, the pulse width Tt4/T1 of the second top pulse P40 expressed in the unit of the clock period T1 at the double speed is fixed through the correction adding the second correction value Δf2 to the pulse width p2 expressed in the unit of the clock period T at the single speed. Since f2+p2=3 in particular, then F4+Tt4=3 T1.

The semiconductor laser 1a emits to the DVD-R 30 the laser pulses based on the recording pulses shown in (b) of FIG. 8. The laser pulses have then the waveform shown in (c) of FIG. 8. The height H2 of the laser pulses represents the recording power level. The radiation with the laser pulses forms a train of the recording marks M and the recording spaces S in the recording layer of the DVD-R 30 as shown in (d) of FIG. 8.

The above-described double-speed recording corrects the front-end lags F3 and F4 and the pulse width Tm1 of the multi-pulses P31 in contrast to the single-speed recording. In the correction, the first correction value Δf1 and the second correction value Δf2 for the front-end lags and the correction value Δm for the pulse width of the multi-pulses are determined as follows. Here, the broken lines shown in (b)-(d) of FIG. 8 indicate recording pulses, laser pulses, and recording marks M1, respectively, in a case where the write strategy used in the single-speed recording is adopted for the double-speed recording, in order to contrast the effect of the correction. As seen from (b) of FIG. 8, top pulses of the recording pulses under the write strategy for use in the double-speed recording are longer than the write strategy for use in the single-speed recording. The differences, i.e., the first and second correction values Δf1 and Δf2 are, for example, about 10% of the front-end lags f1 and f2 in the single-speed recording, respectively. Accordingly, laser pulses corresponding to the top pulses are long as shown in (c) of FIG. 8. Thereby, the recording power level H2 corresponding to the write strategy for use in the double-speed recording may be reduced below the recording power level H1 corresponding to the write strategy for use in the single-speed recording. As a result, the amount of heat provided for the front edge Ma of the recording mark M may be increased than that in the single-speed recording, and the laser pulses may achieve a rapid rise. Thus, the recording mark M resulting from the write strategy for use in the double-speed recording is free from the distortion of the front edge Ma, in contrast to the recording mark M1 resulting from the write strategy for use in the single-speed recording. As a result, the front mark edge of the recording mark M properly corresponds to the front end of the pulse in the recording pattern regardless of increases in recording speed. In addition, the pulse width of the multi-pulses P31 set under the write strategy for use in the double-speed recording equals the sum of the pulse width m set under the write strategy for use in the single-speed recording and the correction value Δm. The adjustment of the correction value Δm enables the adjustment of amounts of heat built up in the latter half portion of the recording mark M according to the recording power level H2. As a result, the rear mark edge of the recording mark M properly corresponds to the rear end of the pulse in the recording pattern.

The DVD-R recorder according to Example 2 changes the write strategy appropriate to the recording speed as described above, thereby enabling to maintain high accuracy of the formations of the recording marks regardless of increases in recording speed. This may accordingly reduce error rates of data in high-speed recordings.

The DVD-R recorder according to Example 2 reads the recommended write strategy and the recommended recording power condition from the DVD-R 30. Alternatively, the recommended write strategy and the recommended recording power condition may be stored in advance in an internal memory.

Example 2 is the DVD-R recorder. Alternatively, the optical disk recording apparatus according to the invention may be a DVD-RW or DVD-RAM drive. Overwriting data on rewritable optical disks such as DVD-RWs and DVD-RAMs is required to reliably erase existing data (recording marks). On the other hand, shapes of recording marks are distorted with increases in recording speed. DVD-RW and DVD-RAM drives according to the invention refers to the recording speed information on target data of erasing which is stored on a DVD-R, in a manner similar to the above-described DVD-R recorder according to Example 2. The drives optimize write strategies and erasing power levels based on the recording speed information. This may prevent traces of the target data of erasing from degrading overwritten data. Thus, the quality of recorded data may be improved regarding high-speed recordings onto DVD-RWs and DVD-RAMs.

Example 3

Figure 9:
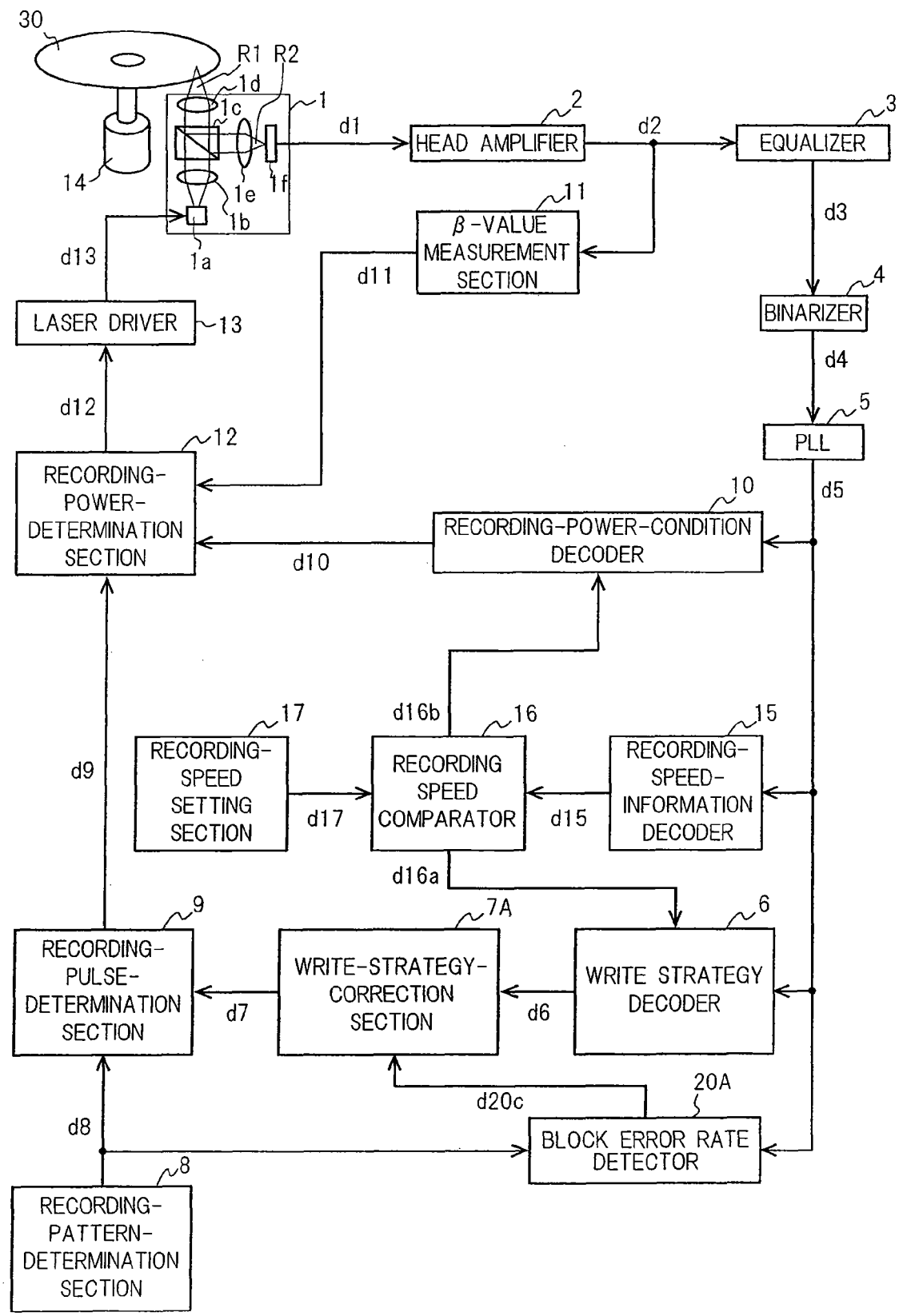
FIG. 9 is a block diagram showing a DVD-R recorder according to Example 3 of the invention.

FIG. 9 is a block diagram showing a DVD-R recorder according to Example 3 of the invention. In contrast to the DVD-R recorder according to Example 2 (See FIG. 4), the DVD-R recorder according to Example 3 comprises a block error rate detector 20A in place of the edge shift detector. In FIG. 9, the same reference symbols as those in FIG. 4 designate components similar to those of Example 2 shown in FIG. 4. Furthermore, the description of Example 2 is cited as details of the similar components.

The block error rate detector 20A compares the digital signal d5 from the PLL 5 with the test recording pattern d8 from the recording-pattern-determination section 8 and detects the block error rate of the digital signal d5. Here, the block error rate refers to the error rate of the digital signal d5 measured for each of the ECC blocks of the DVD-R 30. Each of the ECC blocks comprises 16 sectors and each of the sector is available for recorded data of substantially 182 bytes×13 in amount, as mentioned in the description of Example 1. The data includes internal parity codes (10 bytes×13) and external parity codes (172 bytes) as Reed-Solomon error correction codes. The above-mentioned block error rate is an error rate measured for each of the ECC block based on the internal parity codes. The measured block error rate d20c is provided to the write-strategy-correction section 7A.

The write-strategy-correction section 7A receives the decoded write strategy d6 from the write strategy decoder 6, and stores it into an internal memory. Furthermore, the write-strategy-correction section 7A, when correcting the write strategy, compares the block error rate d20c of the digital signal d5 with a predetermined, acceptable limit, brings results of the comparison into correspondence with the decoded write strategy d6, and stores the results. After that, the write-strategy-correction section 7A corrects the decoded write strategy d6 by a predetermined correction value, and further, transmits the corrected write strategy d7 to the recording-pulse-determination section 9 as well as storing it again.

Title recordings of the DVD-R recorder according to Example 3 use the block error rates in place of the edge shifts at the step S12 of correcting the write strategy, in particular, at its substeps S12E-S12G, in contrast to those according to Example 2. The other steps are similar to those of Example 2 (See FIGS. 4 and 5). Thus, the description of Example 2 is cited as details of the other steps.

Figure 10:
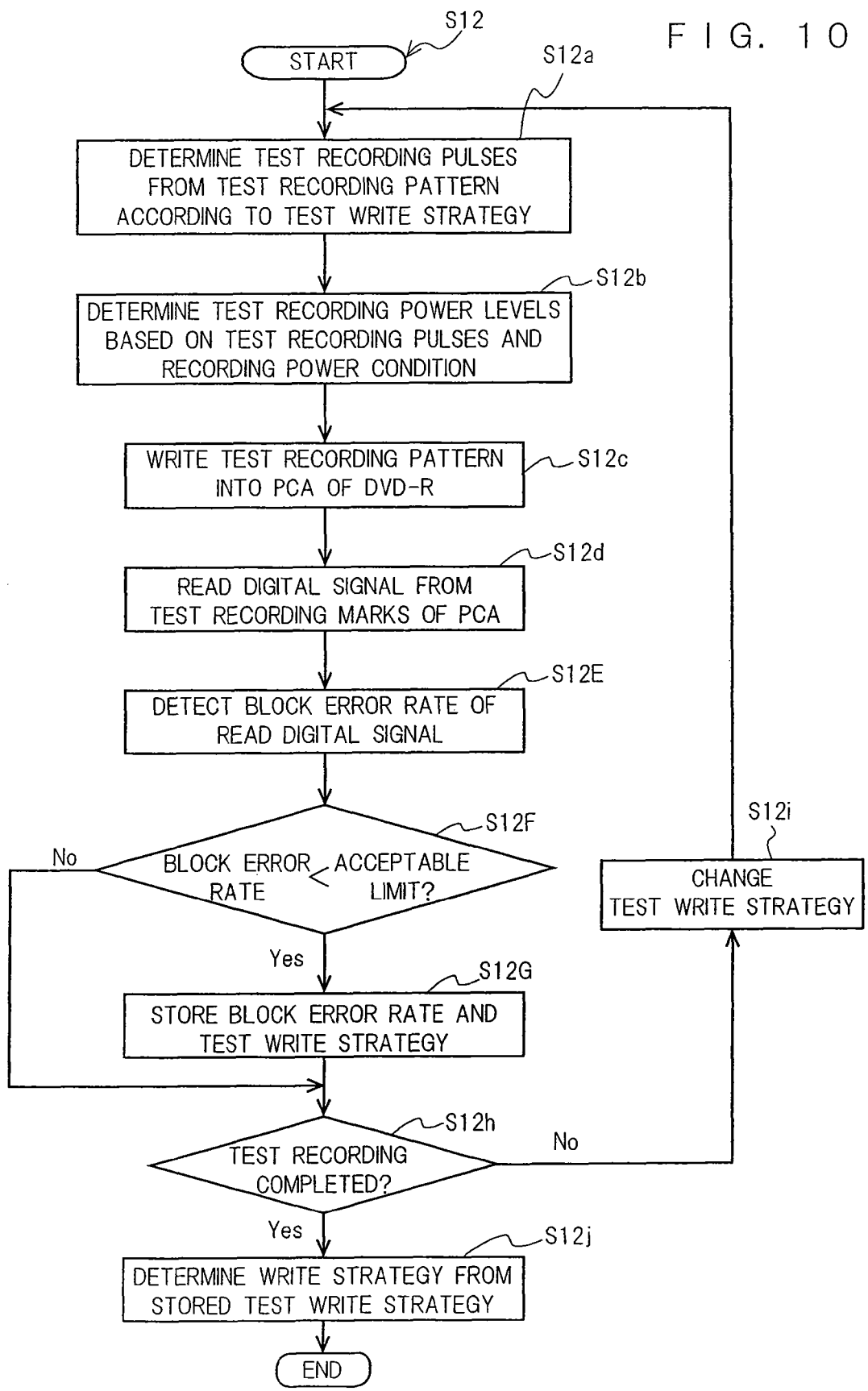
FIG. 10 is a flowchart of Step S12 of correcting a write strategy in a title recording of the DVD-R recorder according to Example 3 of the invention.

FIG. 10 is a flowchart of Step S12 of correcting a write strategy in a title recording of the DVD-R recorder according to Example 3. The following describes Substeps S12E-S12G, which are different from those of Example 2. The description of Example 2 is cited as details of the other substeps.

<Step S12>

Substep S12E: The PLL 5 synchronizes the digital signal d4 obtained at Step S12d and the clock signal d5a and outputs the signal. The block error rate detector 20A compares the digital signal d5 from the PLL 5 with the corresponding test recording pattern d8 and detects the block error rate d20c of the digital signal d5.

Substep S12F: The write-strategy-correction section 7A compares the block error rate d20c of the digital signal d5 with an acceptable limit.

Substep S12G: When the block error rate d20c is below the acceptable limit, the write-strategy-correction section 7A brings the block error rate d20c into correspondence with the test write strategy d6 stored in advance, and stores it into the internal memory.

The recommended write strategy is corrected at the above-described Step S12. This may reduce the block error rates of the digital signals reproduced from the DVD-R 30 to or below the acceptable limit.

Example 4

Figure 11:
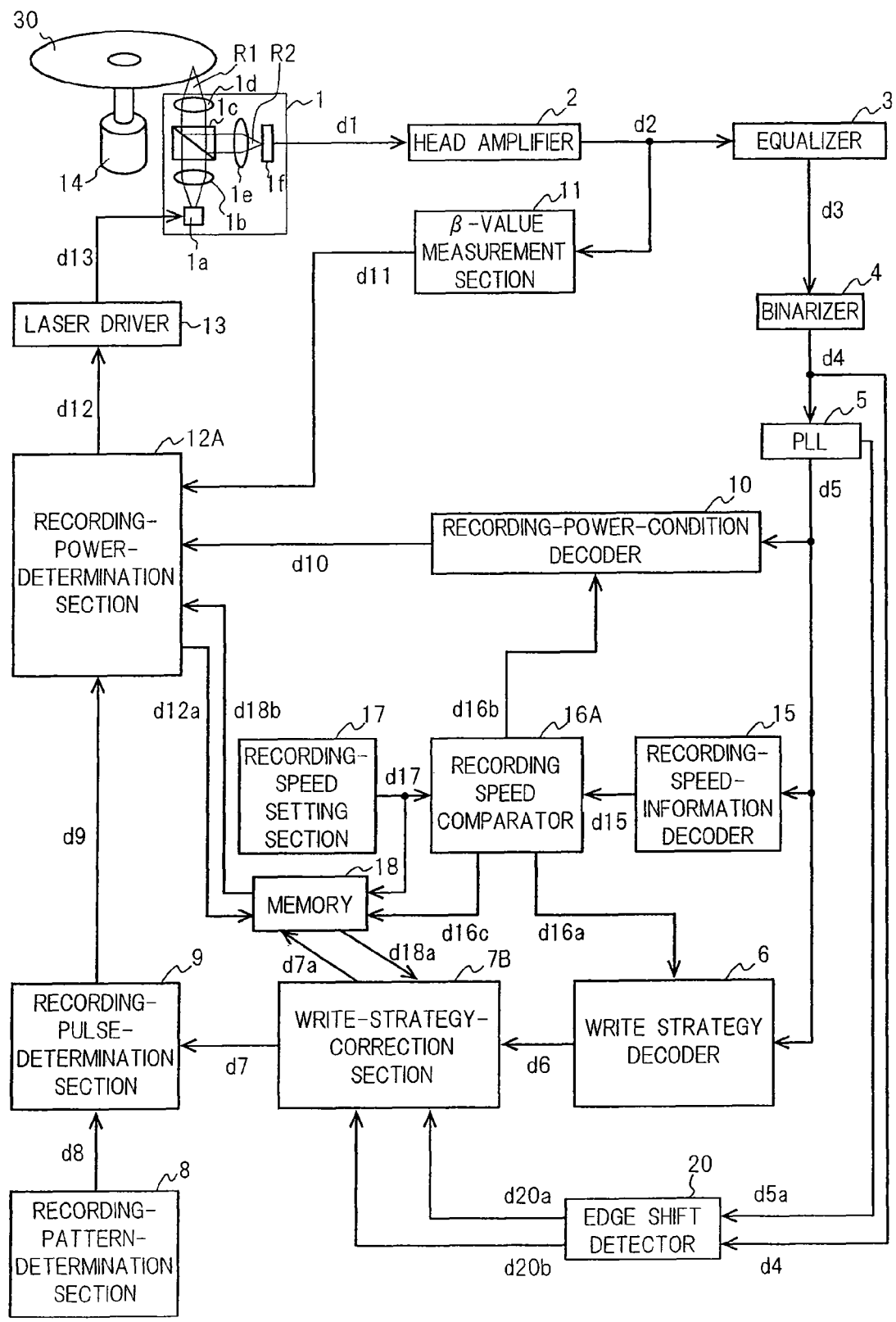
FIG. 11 is a block diagram showing a DVD-R recorder according to Example 4 of the invention.

FIG. 11 is a block diagram showing a DVD-R recorder according to Example 4 of the invention. The DVD-R recorder according to Example 4 comprises a memory 18 in addition to the configuration of Example 2. In FIG. 11, the same reference symbols as those in FIG. 4 designate components similar to those of Example 2. Furthermore, the description of Example 2 is cited as details of the components.

The recording speed comparator 16A compares the decoded item of recording speed information d15 from the recording-speed-information decoder 15 with the set item of recording speed information d17 from the recording-speed setting section 17. When the result of the comparison indicates an agreement between the decoded item of recording speed information d15 and the set item of recording speed information d17, the recording speed comparator 16A transmits a first decoding signal d16a and a second decoding signal d16b to the write strategy decoder 6 and the recording-power-condition decoder 10, respectively. Thereby, the write strategy decoder 6 outputs the decoded write strategy d6, while the recording-power-condition decoder 10 outputs the decoded recording power condition d10. On the other hand, when the above-mentioned results of the comparisons indicate that no item of recording speed information recorded on the DVD-R 30 agrees with the set item of recording speed information d17, the recording speed comparator 16A transmits a predetermined, output instruction signal d16c to a memory 18.

The memory 18 is preferably an EEPROM (electrically erasable programmable nonvolatile memory). The DVD-R recorder according to Example 4 stores into the memory 18, histories of recording speed information, write strategy, and recording power level regarding past title recordings. The history of the recording speed information stored in the memory 18 is searched for an item of recording speed information agreeing with the set item of recording speed information d17. In response to the output instruction signal d16c received from the recording speed comparator 16A, the memory 18 transmits the write strategy d18a and the recording power condition d18b corresponding to the retrieved item of the recording speed information to the write-strategy-correction section 7B and the recording-power-determination section 12A, respectively. At the end of the title recording, the memory 18 further receives a write strategy d18a and a recording power condition d12a from the write-strategy-correction section 7B and the recording-power-determination section 12A, respectively, and establishes a correspondence between them, and stores them.

The write-strategy-correction section 7B receives a decoded write strategy d6 from the write strategy decoder 6, or receives a write strategy d18 from the memory 18, and stores it into an internal memory. When correcting the stored write strategy, in addition, the write-strategy-correction section 7B compares the front-end edge shifts d20a and the rear-end edge shifts d20b of the digital signal d4 with respective, predetermined, acceptable limits. The results of the comparisons are brought into correspondence with the stored write strategy and stored. After that, the write-strategy-correction section 7B corrects the write strategy by a predetermined correction value, and then transmits the corrected write strategy d7 to the recording-pulse-determination section 9 while storing it.

The recording-power-determination section 12A determines recording power levels of the semiconductor laser 1a as follows. The recording-power-determination section 12A receives either a decoded recording power condition d10 from the recording-power-condition decoder 10 or a recording power condition d18b from the memory 18, and set it as the initial condition. Next, the recording-power-determination section 12A performs an OPC according to the recording power condition. The recording-power-determination section 12A then receives a β value d11 from the β-value measurement section 11 and calibrates the recording power levels on the basis of this β value d11, thus determining the optimum recording power levels. The new recording power condition d12a obtained through the OPC is transmitted to the memory 18 and stored into it at the end of the title recording.

Figure 12:
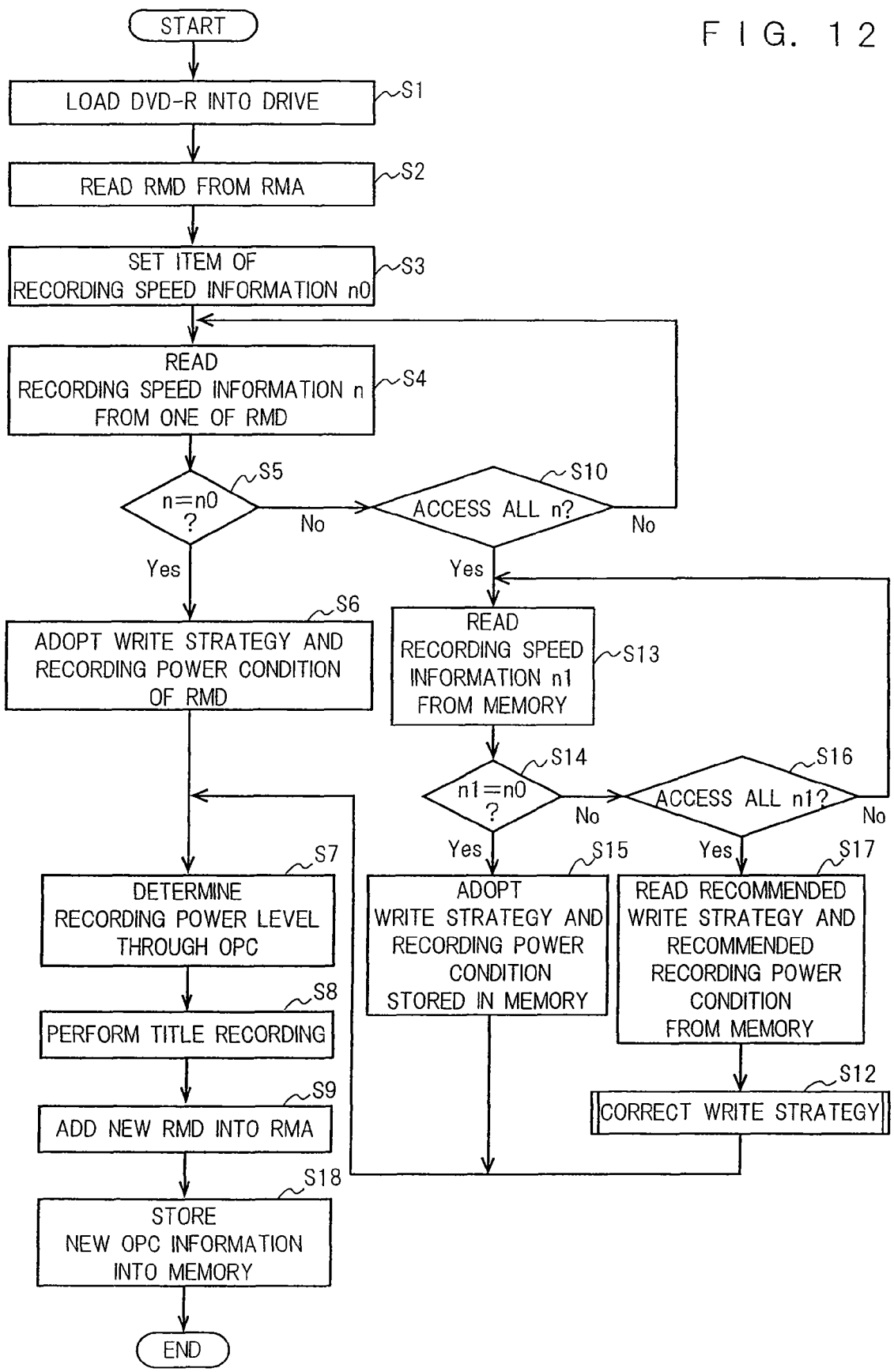
FIG. 12 is a flowchart showing a title recording of the DVD-R recorder according to Example 4 of the invention.

The DVD-R recorder according to Example 4 performs title recordings as follows. FIG. 12 is a flowchart showing a title recording of the DVD-R recorder according to Example 4 of the invention. The following describes the steps different from those of Example 2. The same reference symbols as those in FIGS. 5 and 6 designate steps similar to those of Example 2. The description of Example 2 is cited as details of the similar steps. In particular, Step S12 is similar to that of Example 2 shown in FIG. 6.

<Step S10>

A judgment whether accessing the whole history of recording speed information stored in the RMA ends is performed. When accessing the whole history has already ended, the process goes to Step S13. Otherwise, the process returns to Step S4.

<Step S13>

Items of recording speed information stored in the memory 18 are read preferably in the order of the title recordings. When the read item of recording speed information indicates a positive integer n1, for example, the recording speed of the corresponding title recording is an n1-times speed.

<Step S14>

The item n1 of recording speed information is compared with the set item n0 of recording speed information. When the item n1 of recording speed information agrees with the set item n0 of recording speed information, the process goes to Step S15. Otherwise, the process goes to Step S16.

<Step S15>

Regarding the item n1 of recording speed information read from the memory 18 at Step S13, a write strategy d18a and a recording power condition d18b each corresponding to the item are read from the memory 18. The memory 18 transmits the write strategy d18a to the write-strategy-correction section 7B. The write-strategy-correction section 7B stores the write strategy d18a into the internal memory, and transmits it to the recording-pulse-determination section 9. The memory 18 transmits the recording power condition d18b to the recording-power-determination section 12A. Thus, the DVD-R recorder according to Example 4, when recording a new title, may search both the histories stored on the DVD-R 30 and in the memory 18 for the write strategy and the recording power condition adopted in the title recording at the recording speed equal to the set recording speed, which are more appropriate to the set recording speed than the standard write strategy and the standard recording power condition, in general. This allows the write strategy and the recording power condition to be optimized reliably and within a short time.

<Step S16>

A judgment whether accessing the whole history of recording speed information stored in the memory 18 ends is performed. When accessing the whole history has already ended, the process goes to Step S17. Otherwise, the process returns to Step S13.

<Step S17>

A recommended write strategy and a recommended recording power condition are read from the memory 18. The write-strategy-correction section 7B stores the recommended write strategy into the internal memory, while passing on the recommended write strategy from the memory 18 to the recording-pulse-determination section 9.

<Step S18>

At the end of the title recording of Example 4, the write-strategy-correction section 7B and the recording-power-determination section 12A transmit the write strategy d7a and the recording power condition d12a to the memory 18, respectively, following Step S9 similar to that of Example 2. The memory 18 brings the write strategy d7a and the recording power condition d12a into correspondence with the set item of recording speed information d17 received from the recording-speed setting section 17, and then stores them.

As described above, the DVD-R recorder according to Example 4 may search the histories of recording speed information, write strategy, and recording power condition used in the past title recordings, which are stored both on the DVD-R 30 and in the memory 18, for the write strategy and the recording power condition used for the recording speed equal to the set recording speed. The write strategy and the recording power condition are appropriate to the set recording speed. For example, using them as the initial conditions accordingly enable the OPC to be accurately and rapidly performed, and in particular, may reduce the number of the write strategy corrections, thereby suppressing reduction of available areas in the PCA resulting from the trial writings onto the DVD-R 30.

The optical disk recording apparatus according to Example 4 is the DVD-R recorder. Alternatively, the optical disk recording apparatus according to Example 4 may be a DVD-RW or DVD-RAM drive similar to that of Example 2.

Example 5

Figure 13:
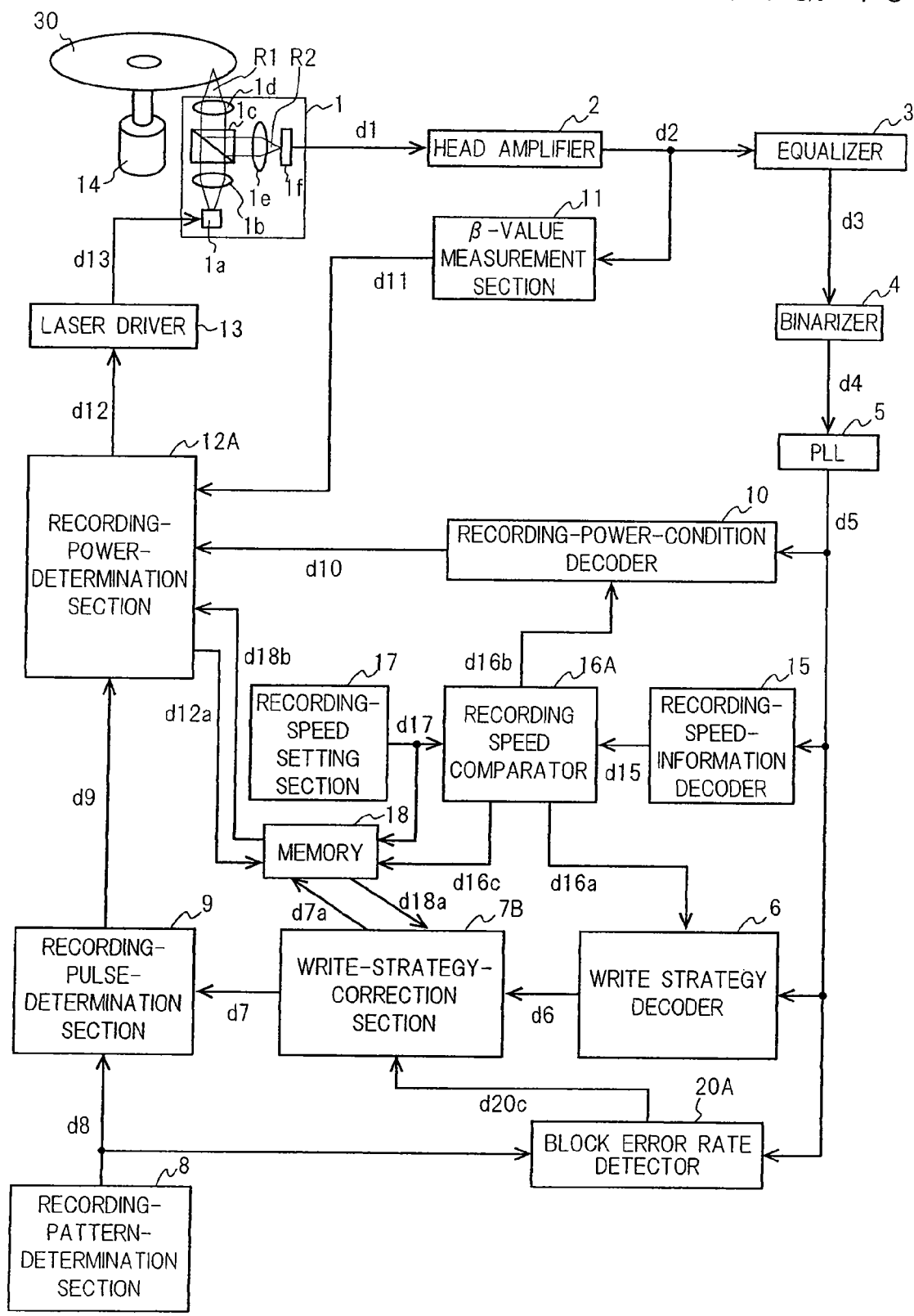
FIG. 13 is a block diagram showing a DVD-R recorder according to Example 5 of the invention.

FIG. 13 is a block diagram showing a DVD-R recorder according to Example 5 of the invention. The DVD-R recorder according to Example 5 comprises a block error rate detector 20A in place of the edge shift detector, in contrast to Example 4. In FIG. 11, the same reference symbols as those in FIG. 11 designate components similar to those of Example 4. The description of Example 4 is cited as details of the similar components. In addition, the block error rate detector 20A is similar to that of Example 3, and hence, the description of Example 3 is cited as details of the detector.

The write-strategy-correction section 7C receives a write strategy d6 from the write strategy decoder 6, or a write strategy d18a from the memory 18, and stores it into an internal memory. When correcting the stored write strategy, the write-strategy-correction section 7C compares the block error rate d20c of the digital signal d5 with a predetermined, acceptable limit. The result of the comparison is brought into correspondence with the stored write strategy and stored. After that, the write-strategy-correction section 7C corrects the write strategy by a predetermined correction value, and then, transmits the corrected write strategy d7 to the recording-pulse-determination section 9 while storing it.

The DVD-R recorder according to Example 5, when performing title recordings, uses the block error rates in place of the edge shifts at Step S12 of correcting the write strategies, especially its Substeps S12e-S12g, in contrast to that of Example 4. The other steps are similar to those of Example 4, and hence, the description of Example 4 is cited as details of the other steps. Furthermore, Step S12 of correcting the write strategy is similar to that of Example 3 shown in FIG. 13, and hence the description of Example 3 is cited as details of Step S12.

As described above, Example 5 corrects the write strategies on the basis of block error rates in place of edge shifts in contrast to Example 4, and thereby may reduce the block error rates of digital signals reproduced from the DVD-R 30 to or below an acceptable limit.

Example 6

A DVD-R recorder according to Example 6 uses degrees of modulation of reproduced analog signals as a parameter indicating distortions of recording marks. Here, the degree of modulation of analog signal refers to the ratio between the maximum level within one period and the amplitude of the period of an analog signal. More specifically, the degree of modulation is expressed by the formula: degree of modulation=(a−b)/a, using the maximum level a and the minimum level b within one period of the analog signal. The degree of modulation of analog signal indicates, in particular, the ratio between intensities of light reflected off recording marks and recording spaces, namely the degree of contrast between recording marks and recording spaces. Thereby, the degree of modulation has been previously known as one of evaluative parameters for the recording performance of an optical disk.

The degrees of modulation of the reproduced analog signal increase with increases in distortions of the recording marks. The cause is considered as follows. FIG. 25 is a schematic diagram showing recording marks M2 when the write strategy used in single-speed recordings is adopted into a quadruple-speed recording. FIG. 25 further shows recording marks M formed in a single-speed recording in broken lines for the purpose of comparison. The recording marks M2 formed in the quadruple-speed recording have the middle portions Mb thicker than those of the recording marks M formed in the single-speed recording, and in particular, exceed the groove g in width. Furthermore, the rear edges Mc shifts backward from those of the recording marks M formed in the single-speed recording. The distortions indicate that the range from the middle portion Mb to the rear edge Mc of the recording mark M2 is overheated in the quadruple-speed recording. The distortion at the rear edge Mc of the recording mark M2 shrinks the recording space S2. In addition, excessive amounts of heat built up in the latter half portion Mb and Mc are dissipated into the recording space S2, thereby reducing the reflectance. Thus, the intensities of the reflected light are reduced across the whole of the recording marks M2 and the recording spaces S2. This reduction results in increases of the degrees of modulation of analog signals reproduced from the trains of the recording marks.

Figure 14:
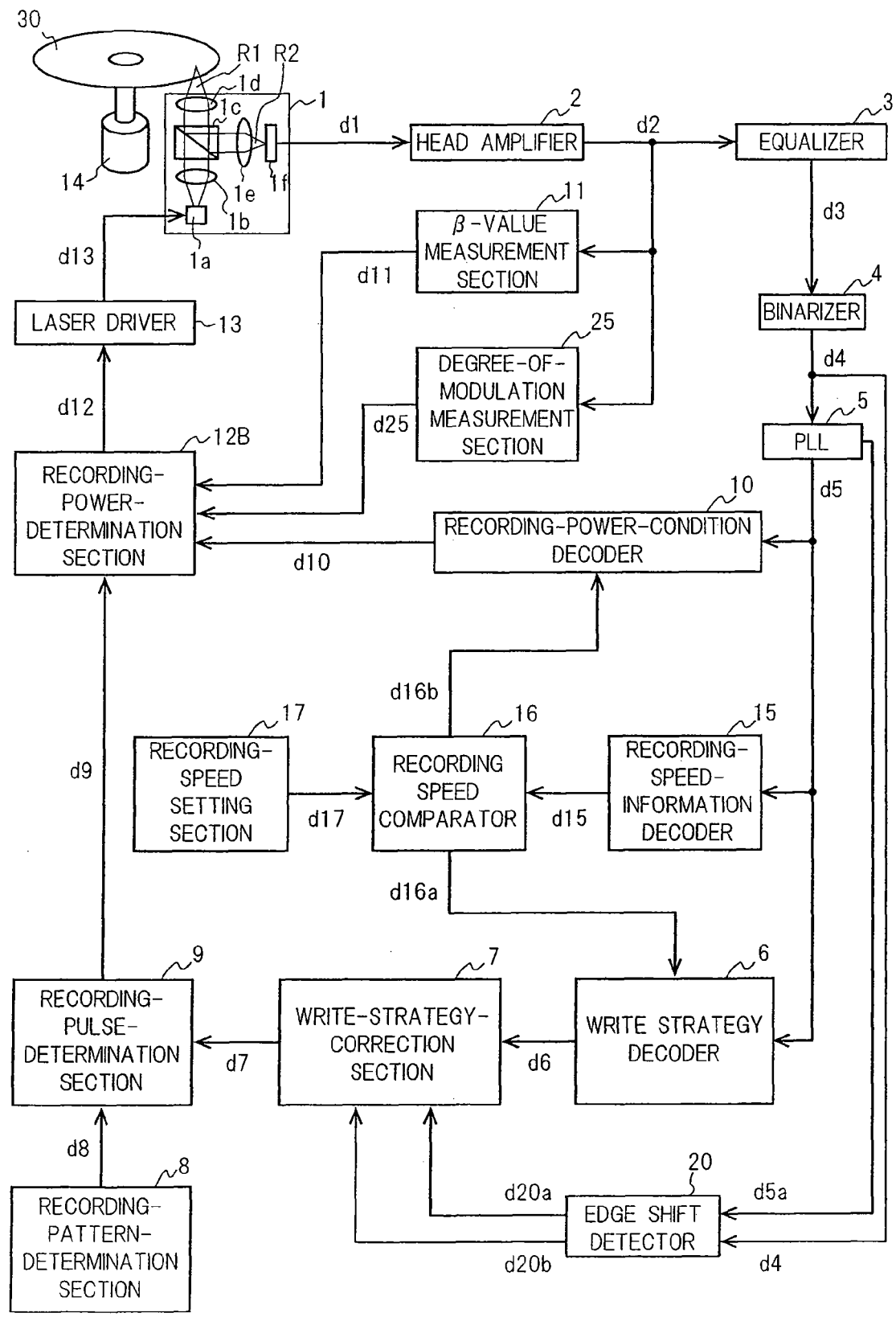
FIG. 14 is a block diagram showing a DVD-R recorder according to Example 6 of the invention.

FIG. 14 is a block diagram showing a DVD-R recorder according to Example 6 of the invention. The DVD-R recorder according to Example 6 comprises a degree-of-modulation measurement section 25 in addition to the configuration of Example 2. In FIG. 14, the same reference symbols as those in FIG. 4 designate components similar to those of Example 2. The description of Example 2 is cited as details of the similar components.

The degree-of-modulation measurement section 25 receives the analog signal d2 that is reproduced by the pickup 1 and amplified by the head amplifier 2, then measuring a degree of modulation on the analog signal d2. Example 6 measures a degree of modulation, in particular, on a synchronization signal, i.e., an analog signal reproduced from a train of a recording mark having the maximum mark length of 14 T and a recording space having the maximum space length of 14 T.

At the beginning of a title recording, a recording power condition appropriate to a set recording speed is retrieved from the history of recording power condition stored on the DVD-R 30, in a manner similar to that of Embodiment 2. The recording power condition is entered as the decoded recording power condition d10a into the recording-power-determination section 12B. The decoded recording power condition d10a includes, in particular, information on correspondences between recording patterns and recording power levels. The information specifies a first recording power level assigned to the recording pulse corresponding to the front edges of recording marks, and a second recording power level that is lower than the first recording power level and assigned to the other recording pulses. More specifically, items of the information are pairs of an additional recording power level Pa and a reference recording power level Pm. Alternatively, items of the information may be pairs of a ratio $\epsilon=Pa/(Pm+Pa)$ between the additional recording power level Pa and the first recording power level Pm+Pa, and the first recording power level Pm+Pa. Furthermore, items of the information may be pairs of the first recording power level itself and the second recording power level. The information is recorded as running OPC information onto the DVD-R 30 in a manner similar to that of Example 1.

The recording-power-determination section 12B performs the following OPC based on the decoded recording power condition d10a: First, test recording marks are written onto the DVD-R 30 according to a test recording pattern on a trial basis. Then, the recording power level d12a provided for the laser driver 13 is the sum Pm+Pa of the reference and additional recording power levels assigned to the top pulses of the test recording pulses d9, as well as the reference recording power level Pm assigned to other pulses of the recording pulses d9. Next, an analog signal is reproduced from the test recording marks. The β-value measurement section 11 measures the β values of the analog signal. Furthermore, the degree-of-modulation measurement section 25 measures degrees of modulation on synchronization signals in the analog signal. The measured β values d11 and the measured degrees of modulation d25 are fed back to the recording-power-determination section 12B. The recording-power-determination section 12B calibrates the reference recording power level Pm and the additional recording power level Pa on the basis of the values d11 and the degrees of modulation d25. Thereby, the reference recording power level Pm and the additional recording power level Pa are optimized such that β values and degrees of modulation fall within a predetermined acceptable range.

Figure 15:
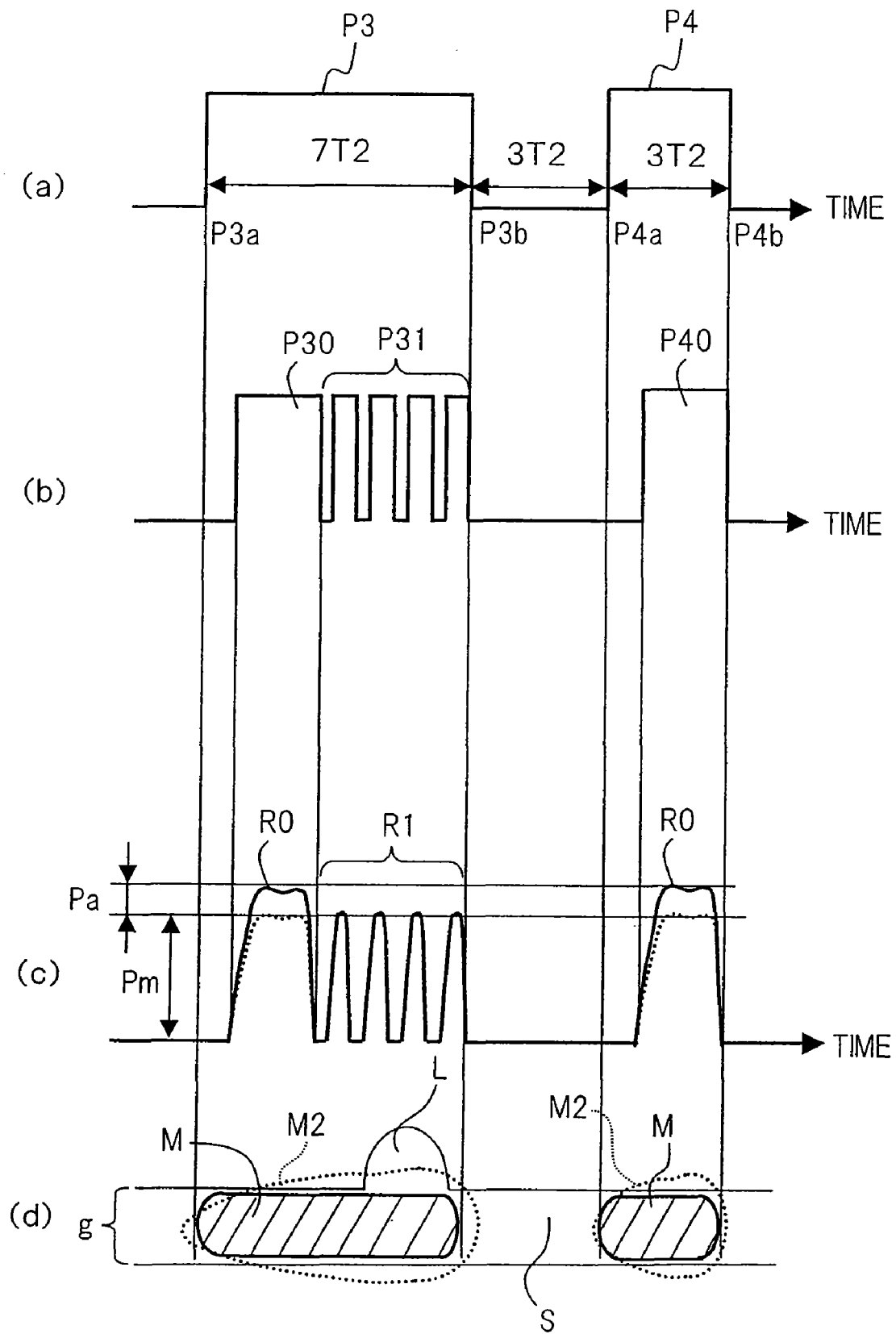
FIG. 15 is a schematic diagram showing a relation between recording power levels and recording marks resulting from a quadruple-speed recording of the DVD-R recorder according to Example 6 of the invention, where (a)-(c) show the waveforms of a recording pattern, recording pulses, and laser pulses of a semiconductor laser 1a, respectively, and (d) shows recording marks M and recording spaces S formed in the recording layer of the DVD-R 30 by the laser pulses shown in (c)

FIG. 15 is a schematic diagram showing a relation between recording power levels and recording marks regarding a quadruple-speed data recording according to Example 6 of the invention. The parts (a)-(c) of FIG. 15 show the waveforms of a recording pattern, recording pulses, and laser pulses of the semiconductor laser 1a, respectively. The part (d) of FIG. 15 shows recording marks M and recording spaces S formed in the recording layer of the DVD-R 30 by the laser pulses shown in (c). In (a)-(c) of FIG. 15, the unit length of pulse width, i.e., a clock period T2 is ¼ of the clock period T used in single-speed recordings: T2=T/4. The broken lines shown in (d) of FIG. 15 represents the recording marks M2 formed in the case where a constant recording power level is assigned to the whole recording pulses, for the purpose of comparison.

The write strategy used in quadruple-speed recordings establishes the following correspondences between the recording pattern and the recording pulses. The recording pattern consists of, for example, a first pulse P3 having 7 T2 in width, a negation time having 3 T2 in length, and a second pulse P4 having 3 T2 in width. Then, the recording pulse corresponding to the first pulse P3 consists of a first top pulse P30 and the subsequent multi-pulses P31. On the other hand, the recording pulse corresponding to the second pulse P4 consists of a second top pulse P40 only.

The quadruple-speed recording of Example 6 assigns the reference recording power level (the second recording power level) Pm to the multi-pulses P31, and in addition, the sum of the reference recording power level Pm and the additional recording power level Pa to the first top pulse P30 and the second top pulse P40. That is, the recording power level of the laser pulses R0 corresponding to the top pulses is higher than that R1 corresponding to the multi-pulses by the additional recording power level Pa. Thereby, the additional recording power level compensates for lacks of power resulting from lags of the rising edges of the laser pulses R0 at the front edges of the recording marks. On the other hand, the reduction of the reference recording power level Pm suppresses overheating of the latter half portion of the recording mark resulting from the laser light. As a result, distortions of the recording marks M are reduced smaller than distortions of the recording marks M2 formed at the constant recording power level. In particular, the mark edges accurately correspond to ends of the pulses P3 and P4 in the recording pattern. In addition, the recording marks M do not exceed the groove g in width, in contrast to the recording marks M2 formed at the constant recording power level. Therefore, the recording marks M cause neither losses of wobble signals and LPP signals nor plastic deformations in the edges of the groove g and the LPPs L.

Figure 16:
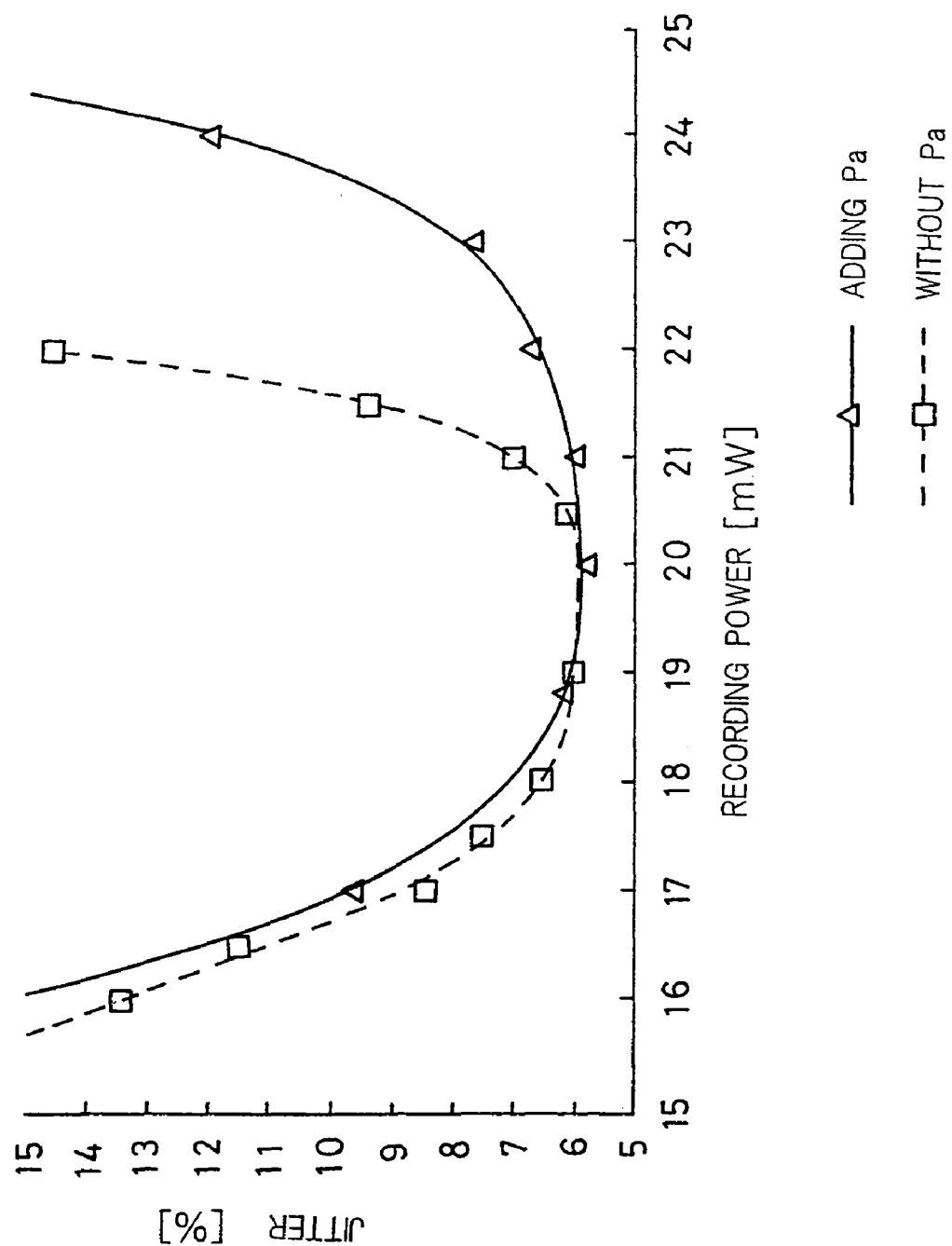
FIG. 16 is a graph showing a relation between recording power levels and edge shifts established in the formation of recording marks of a constant length, regarding the DVD-R recorder according to Example 6 of the invention.

FIG. 16 is a graph showing a relation between recording power levels used in formations of recording marks of a constant length and amounts of jitter of the digital signal reproduced from the recording marks, regarding the DVD-R recorder according to Example 6. Here, the recording power level is the first recording power level, i.e., the sum of the reference and additional recording power levels, and the additional recording power level is maintained at a constant level of 2 mW. The amount of jitter of the digital signal corresponds to the range of variation of the edge shifts, and is expressed in terms of a ratio of the range to the clock period of the PLL 5. The smaller amounts of the jitter, the smaller the average edge shifts. In the graph of FIG. 16, the vertical axis indicates amounts of the jitter, while the horizontal axis indicates the reference recording power levels. In addition, broken lines shown in FIG. 16 indicate the relation established in a prior art DVD-R recorder, for the purpose of comparison. Here, triangle and rectangular marks indicate measurement points regarding the DVD-R recorder according to Example 6 and the prior art DVD-R recorder, respectively.

The DVD-R recorder according to Example 6 has a range of recording power level where the amount of the jitter may be suppressed to or below a constant level, namely a recording power margin extending wider, especially upward in power, than that of the prior art DVD-R recorder, as shown in FIG. 16. The result is understood as follows. The increase of the first recording power level compensates for the lacks of power of the laser pulses at the front edges of the recording marks, thereby reducing the edge shifts of the front mark edges. On the other hand, the amount of increase of the second recording power level is suppressed below that of the first recording power level. This suppresses overheating of the latter half portion of the recording mark. As a result, increases in edge shift associated with increases in recording power are suppressed regarding the rear mark edges. Thus, it is understood that the recording power margin extends upward in power.

The wider the recording power margin extends, the wider an acceptable range of optimum recording power levels extends. Accordingly, the DVD-R recorder according to Example 6 may optimize the recording power levels through the OPCs reliably and within a short time.

Figure 17:
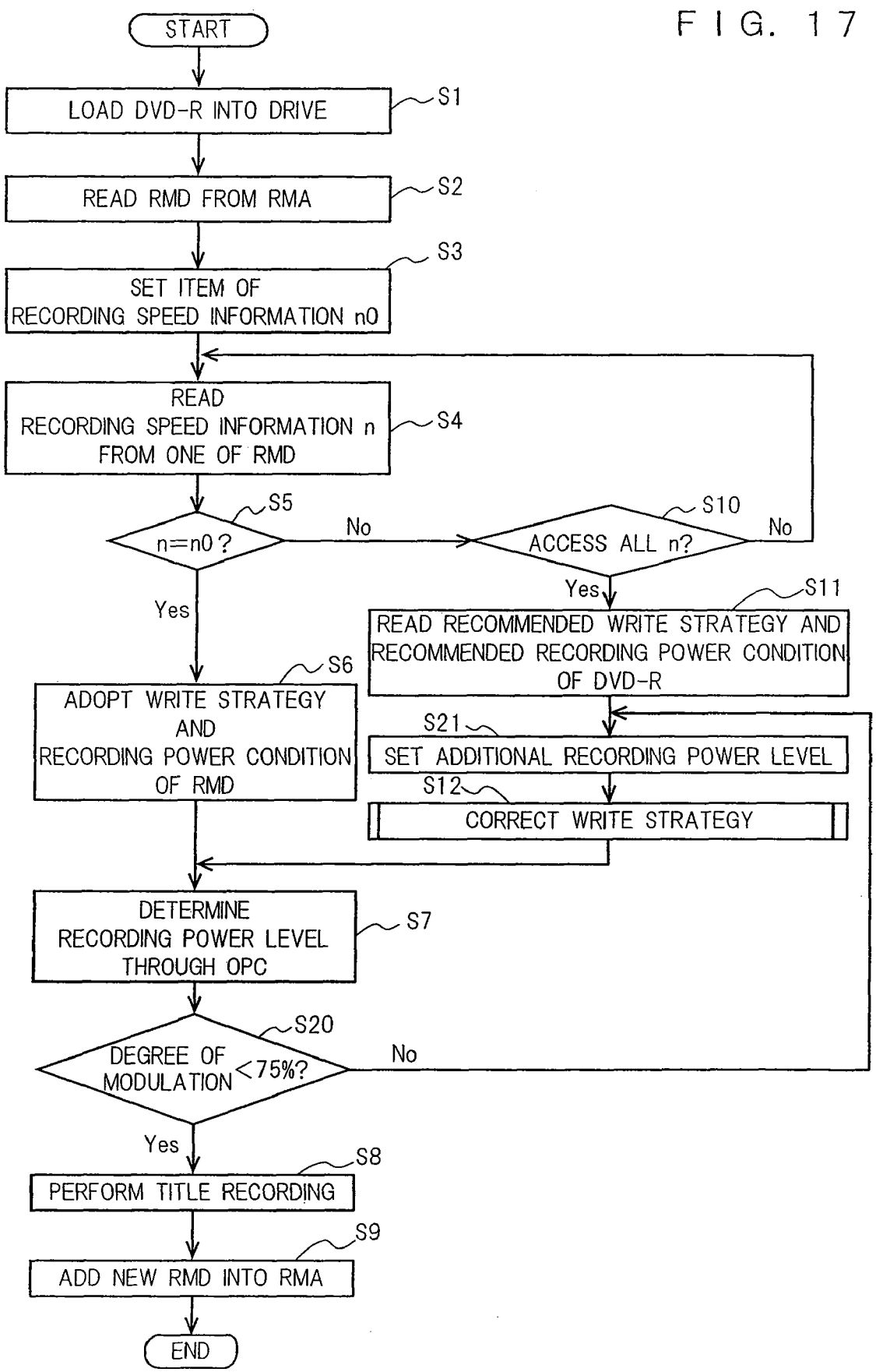
FIG. 17 is a flowchart showing a title recording of the DVD-R recorder according to Example 6 of the invention.

The following specifically describes a method of determining recording power levels in the DVD-R recorder according to Example 6. FIG. 17 is a flowchart showing a title recording of the DVD-R recorder according to Example 6. Here, the same reference symbols as those in FIG. 5 designate steps similar to those in the title recording of Example 2. The description of Example 2 is cited as details of the similar steps.

<Step S6>

The OPC information including the decoded item of recording speed information d15 obtained at Step S4 are decoded into a write strategy and a recording power condition. Then, the decoded recording power condition d10a includes, in particular, reference and additional recording power levels. Thus, the reference and additional recording power levels appropriate to the set recording speed are selected from the history of the OPC information stored on the DVD-R 30.

<Step S11>

A recommended write strategy and a recommended recording power condition are read from the DVD-R 30 in a manner similar to that of Example 2. Here, the recommended recording power condition includes recommended levels of the reference and additional recording power. The recommended levels generally vary with DVD-Rs and DVD-R recorders. The recommended additional recording power level is, for example, 10-20% of the recommended reference recording power level, i.e., about 2.0-4.0 mW.

<Step S21>

The additional recording power level is set. In particular, at the first iteration of Step S21, the recommended additional recording power level read at Step S11 is set as an initial value. After that, the additional recording power level is incremented by, for example, 1.0 mW at each iteration of Step S21.

<Step S12>

The correction of write strategy is performed in a manner similar to that of Example 2, thereby optimizing the recommended write strategy. Here, a correction value of write strategy varies with not only the edge shifts but also the additional recording power levels set at Step S21.

<Step S7>

The OPC is performed in a manner similar to that of Example 2. Here, the recording-power-determination section 12B maintains the additional recording power level at constant, while changing the reference recording power level in a manner similar to that of Example 2. Then, the range of the change is based on the initial recording power condition. For example, the reference recording power level is changed within a range of 8.0-24.0 mW by 1.0 mW steps. At each time when a train of test recording marks is formed at one of the reference recording power levels, a β value and a degree of modulation are measured and stored on an analog signal reproduced from the train of test recording marks. Thereby, a list showing correspondences between the β values and the degrees of modulation, organized according to the reference recording power levels, namely a new recording power condition is obtained. A reference recording power level corresponding to a target β value is selected from the new recording power condition. For example, the reference recording power level when the β values fall into the −5%-to-+5% range is selected.

<Step S20>

The degree of modulation corresponding to the reference recording power level selected at Step S7 is compared with a predetermined acceptable limit, for example, 75%. When the degree of modulation is smaller than 75%, the process goes to Step S8. Otherwise, the process returns to Step S21.

Thus, the additional and reference recording power levels are optimized such that the β value falls into the −5%-to-+5% range and the degree of modulation is below 75%.

<Step S9>

A finishing process of the title recording is performed. Then, the new recording power condition stored into the RAM and the border-out area includes the optimized additional and reference recording power levels. Thus, the recording power levels as well as the write strategy are brought into correspondence with the recording speed and stored.

Example 6 adopts the write strategy with the multi-pulses P31 as shown in (c) of FIG. 15. Alternatively, a single laser pulse of the reference recording power level and the same width as that between the front and rear extremities of the multi-pulses P31 may be emitted in place of the multi-pulses P31, when the recording speed is increased. Thereby, the single pulse may compensate for lacks of power resulting from lags of the rising edges of the multi-pulses P31. As a result, edge shifts of reproduced digital signals may be reduced with respect to the rear mark edges of the recording marks.

Example 6 assigns the first recording power level only to the top pulses. Alternatively, the first recording power level may be assigned to the last pulses in the multi-pulses with respect to recording pulses corresponding to, in particular, long pulses in the recording pattern. Thereby, the additional recording power level Pa compensates for lacks of amounts of heat at the rear edges of long recording marks having a mark length of, for example, 9 T, 10 T, or 11 T, when the reference recording power level (the second recording power level) Pm is set to be low. As a result, the rear mark edges of the long recording marks do not shift forward. Thus, the edge shifts of the digital signals are reduced, and hence the error rates of data are reduced.

The optical disk recording apparatus according to Example 6 of the invention is the DVD-R recorder. Alternatively, the optical disk recording apparatus according to Example 6 may be a DVD-RW or DVD-RAM drive.

Example 7

Figure 18:
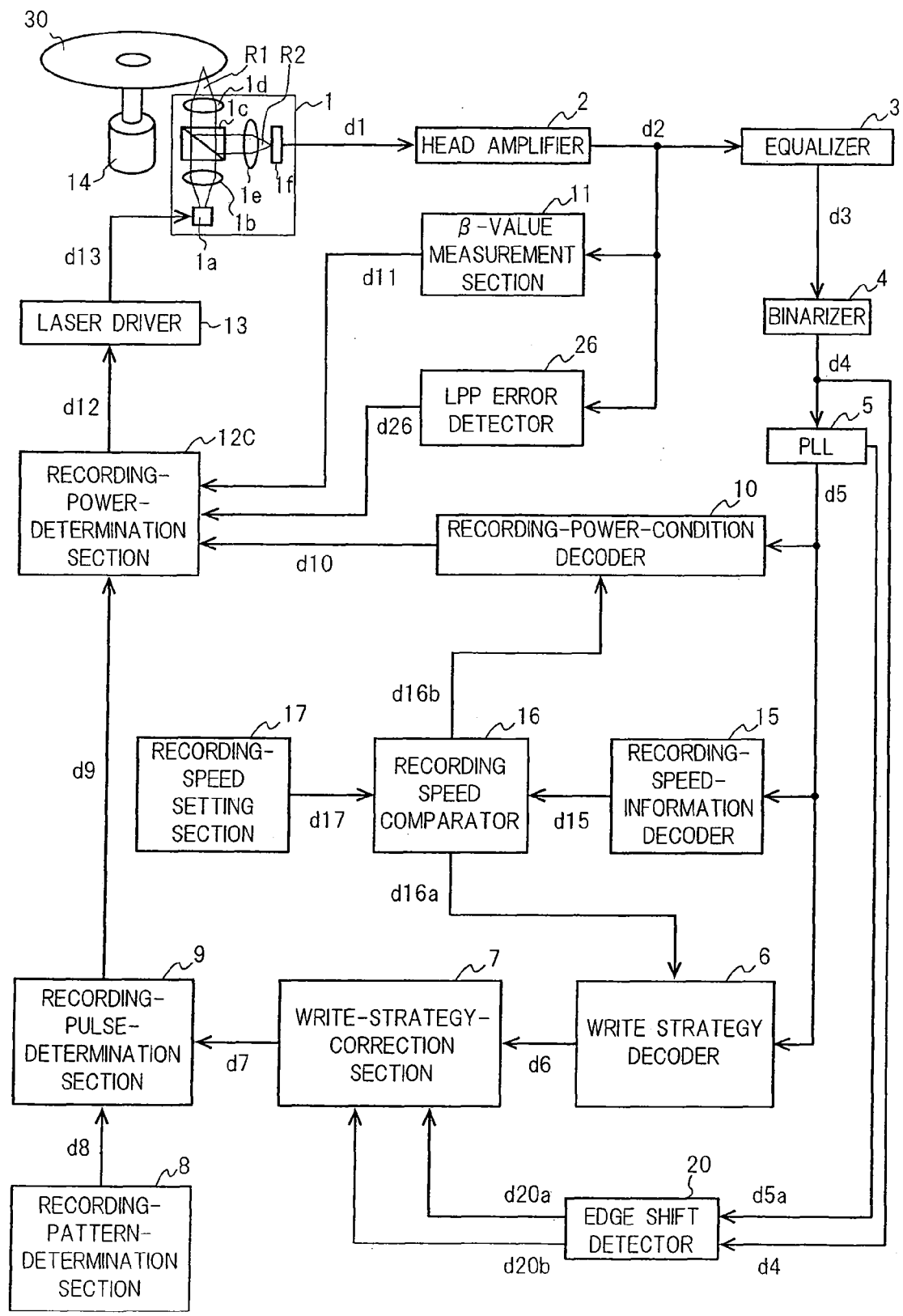
FIG. 18 is a block diagram showing a DVD-R recorder according to Example 7 of the invention.

FIG. 18 is a block diagram showing a DVD-R recorder according to Example 7 of the invention. The DVD-R recorder according to Example 7 comprises a an LPP error detector 26 in place of the degree-of-modulation measurement section 25 in contrast to Example 6 (See FIG. 14). In FIG. 14, the same reference symbols as those in FIG. 14 designate components similar to those of Example 6 shown in FIG. 14. The description of Example 6 is cited as details of the similar components.

The LPP error detector 26 receives the analog signal d2 that is reproduced by the pickup 1 and amplified by the head amplifier 2, and detects a LPP signal from the analog signal. Furthermore, the detector detects the jitter or the block error rates (which are hereafter, collectively referred to as LPP errors) on the detected LPP signal. The detected LPP error d26 is transmitted to the recording-power-determination section 12C.

Here, the LPP error is used as a parameter indicating the distortions of recording marks, similar to the degree of modulation. In fact, when recording marks are distorted more largely with increases in recording speed as shown in FIG. 25, and, in particular, expands to the LPPs L, the LPP signal recorded in the LPPs L is lost. This reduces the S/N ratio of the LPP signal and increases the LPP errors. Thus, the LPP errors are increased with the distortions of recording marks.

The recording-power-determination section 12C performs an OPC based on the decoded recording power condition d10a and similar to that of Example 6. Then, the recording-power-determination section 12C calibrates the reference recording power level Pm and the additional recording power level Pa based on the fed-back β value d11 and LPP errors d26, thereby optimizing the reference recording power level Pm and the additional recording power level Pa such that the β value d11 and the LPP error d26 fall within respective predetermined, acceptable ranges.

Figure 19:
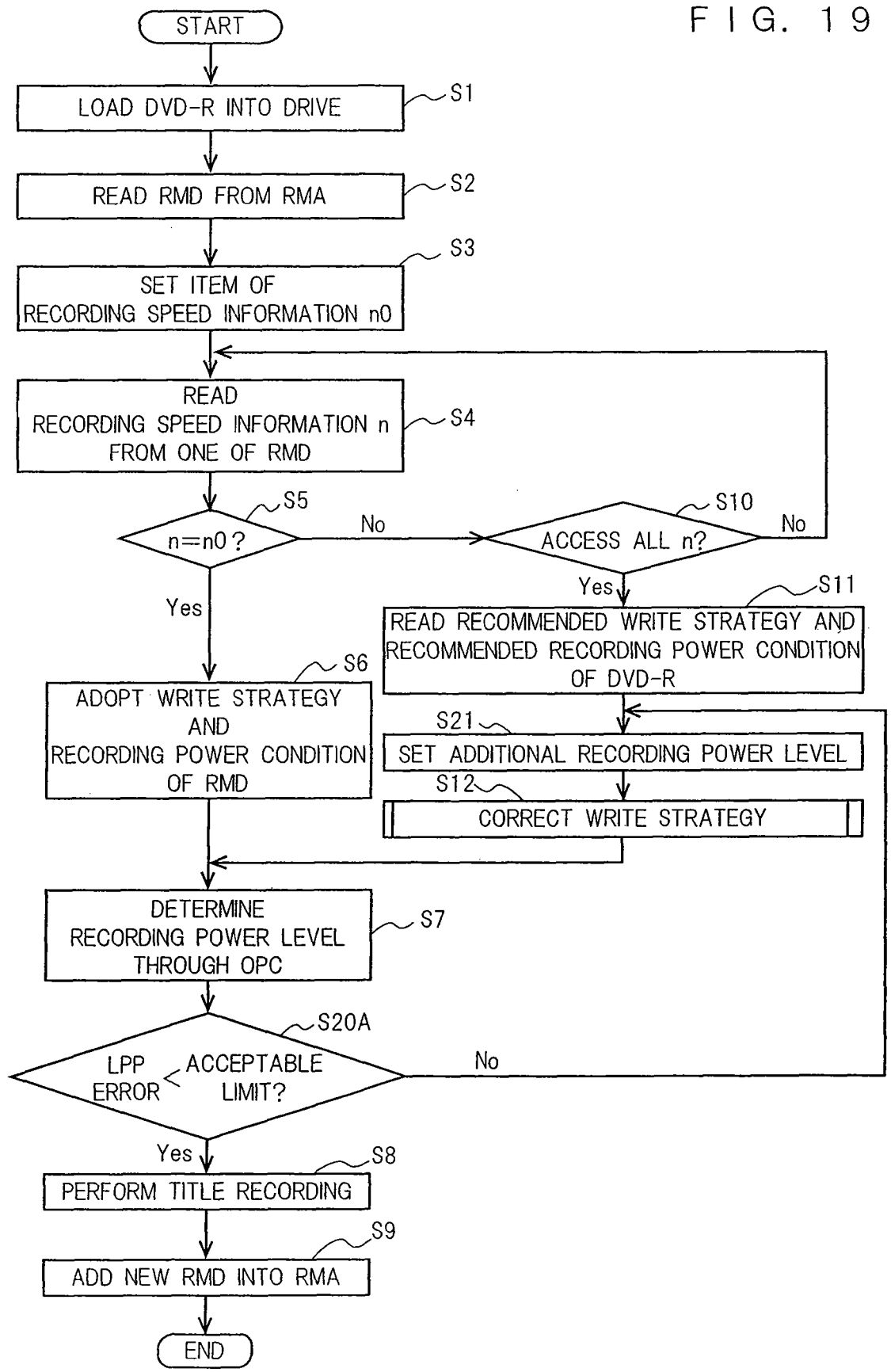
FIG. 19 is a flowchart showing a title recording of the DVD-R recorder according to Example 7 of the invention.

The following specifically describes a method of determining recording power levels in the DVD-R recorder according to Example 7. FIG. 19 is a flowchart showing a title recording of the DVD-R recorder according to Example 7. Here, the same reference symbols as those in FIG. 17 designate steps similar to those of the title recording according to Example 6. The description of Example 6 is cited as details of the similar steps.

<Step S7>

An OPC is performed in a manner similar to that of Example 6. Here, the recording-power-determination section 12C maintains the additional recording power level at constant, while changing the reference recording power level in a manner similar to that of Example 6. In addition, at each time when test recording marks are formed at one of the reference recording power levels, the β value and the LPP error of an analog signal reproduced from the test recording marks are measured and stored. Thereby, a list showing correspondences between the β values and the LPP errors organized according to the reference recording power levels, namely a new recording power condition is obtained. A reference recording power level corresponding to the target β value is selected from the new recording power condition. For example, the reference recording power level when the β values fall into the −5%-to-+5% range is selected.

<Step S20A>

The LPP error corresponding to the reference recording power level selected at Step S7 is compared with a predetermined acceptable limit. An acceptable range is set, for example, for the jitter of the LPP signals to be 50 ns or less and for the block error rates of the LPP signals to be 5% or less. When the LPP error is smaller than the acceptable limit, the process goes to Step S8. Otherwise, the process returns to Step S21.

Thus, the additional and reference recording power levels are optimized such that the β values fall within the −5%-to-+ 5% range and the LPP errors are below the acceptable limit.

Example 8

Figure 20:
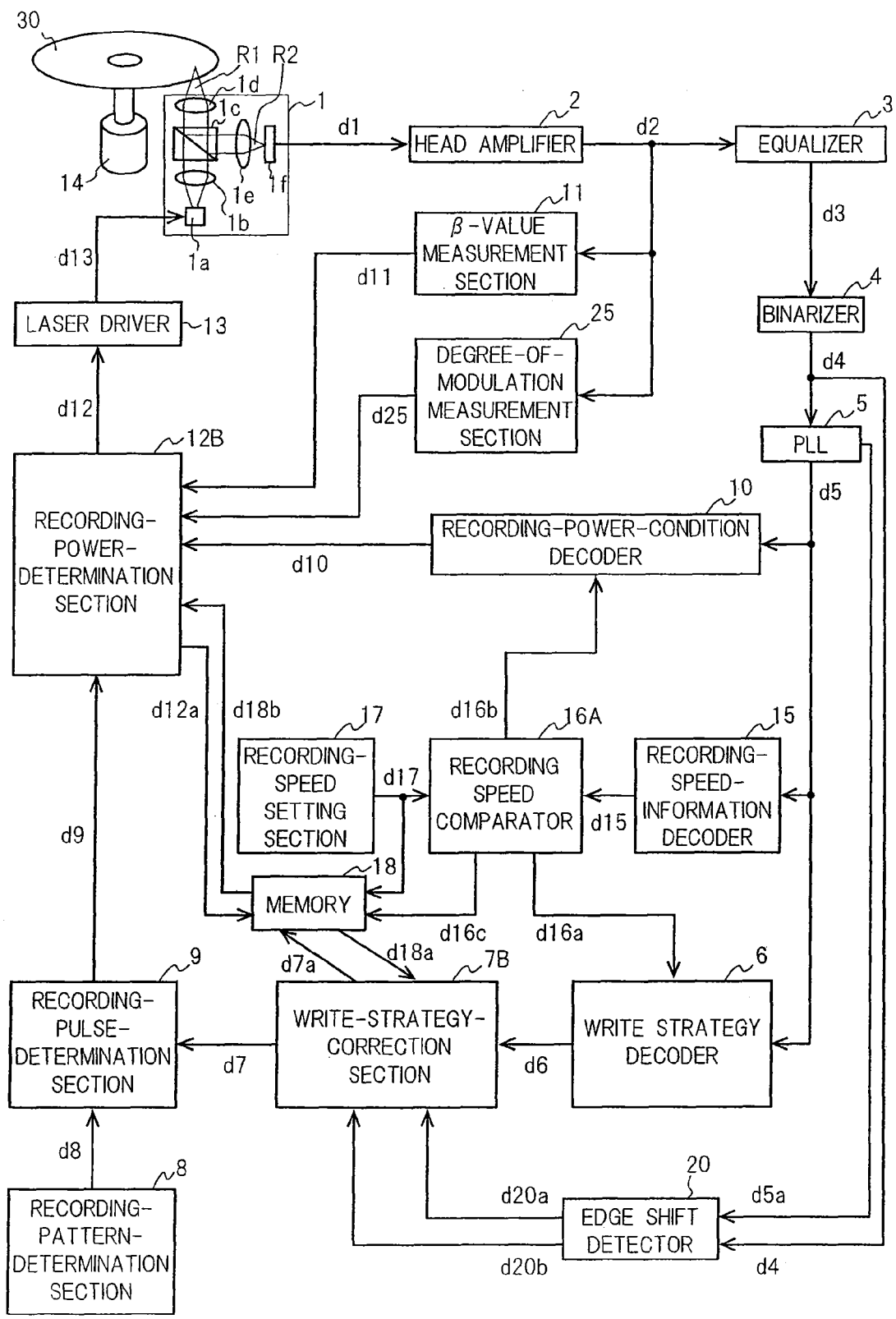
FIG. 20 is a block diagram showing a DVD-R recorder according to Example 8 of the invention.

FIG. 20 is a block diagram showing a DVD-R recorder according to Example 8 of the invention. The DVD-R recorder according to Example 8 comprises a memory 18 similar to that of Example 4, in addition to the configuration of Example 6. In FIG. 20, the same reference symbols as those in FIGS. 11 and 14 designate components similar to those of Examples 4 and 6. Furthermore, the description of Examples 4 and 6 is cited as details of the similar components.

The memory 18 is preferably an EEPROM. The DVD-R recorder according to Example 8 stores into the memory 18, histories of recording speed information, write strategy, and recording power level on the past title recordings. In particular, the recording power conditions include reference and additional recording power levels.

In the OPC, the recording-power-determination section 12C receives either a decoded recording power condition d10a from the recording-power-condition decoder 10 or a recording power condition d18c from the memory 18. The new recording power condition d12b obtained through the OPC is transmitted to and stored into the memory 18 at the end of the title recording. Each of the recording power conditions includes reference and an additional recording power levels.

Figure 21:
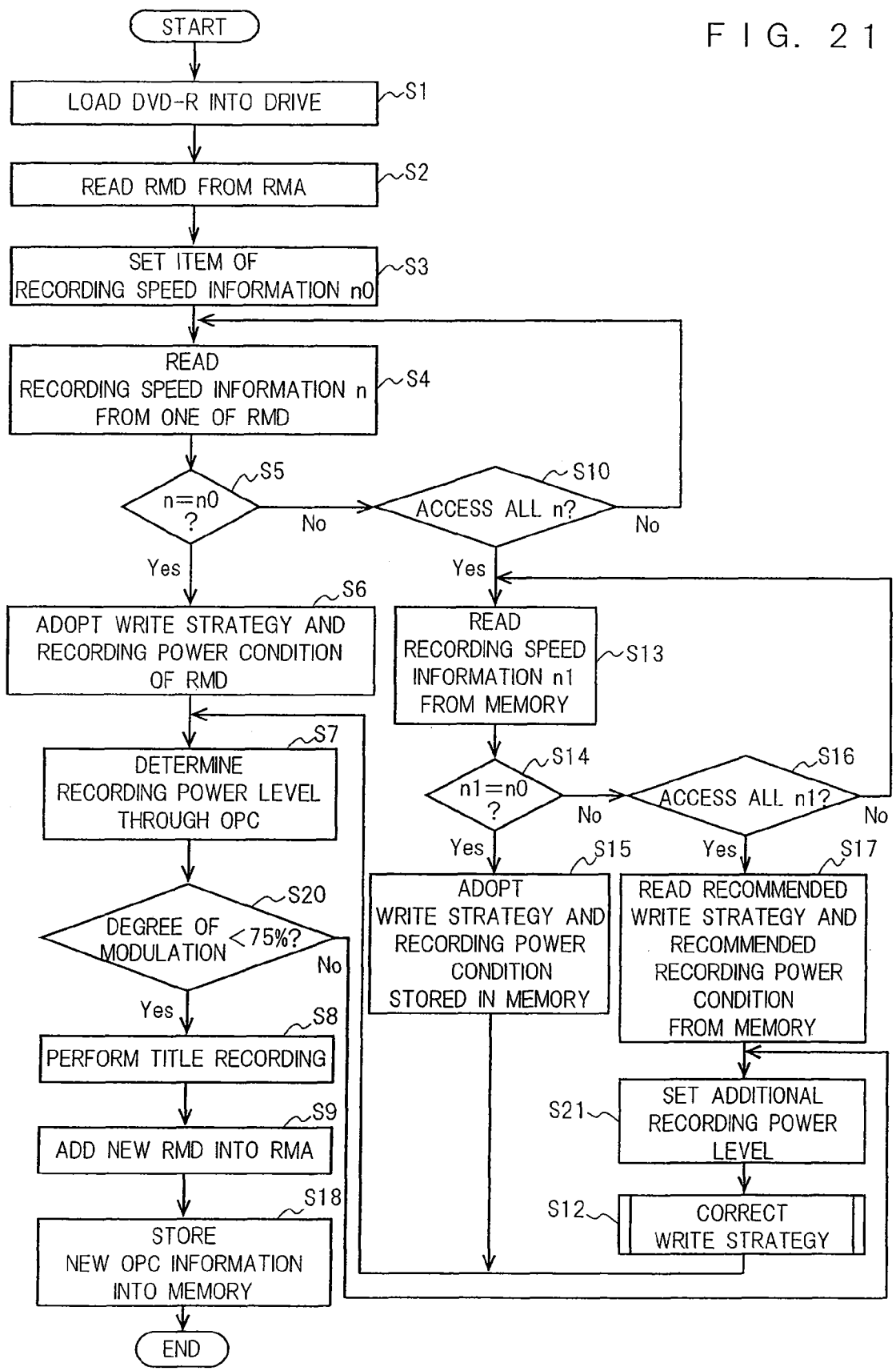
FIG. 21 is a flowchart showing a title recording of the DVD-R recorder according to Example 8 of the invention.

FIG. 21 is a flowchart showing a title recording of the DVD-R recorder according to Example 8 of the invention. The same reference symbols as those in FIGS. 12 and 17 designate steps similar to those of according to Examples 4 and 6. The description of Examples 4 and 6 is cited as details of the similar steps.

The DVD-R recorder according to Example 8 may search histories of recording speed information, write strategy, and recording power condition used in the past title recordings, which are stored both on the DVD-R 30 and in the memory 18, for the write strategy and the recording power condition used at the recording speed agreeing with a set recording speed. The write strategy and the recording power condition are appropriate to the set recording speed. For example, using them as the initial conditions accordingly enable the OPC to be accurately and rapidly performed, and in particular, may reduce the number of the write strategy corrections, thereby suppressing reduction of available areas in the PCA resulting from the trial writings onto the DVD-R 30.

The optical disk recording apparatus according to Example 8 is the DVD-R recorder. Alternatively, the optical disk recording apparatus according to Example 8 may be a DVD-RW or DVD-RAM drive, in a manner similar to that of the above-described Examples.

Example 9

Figure 22:
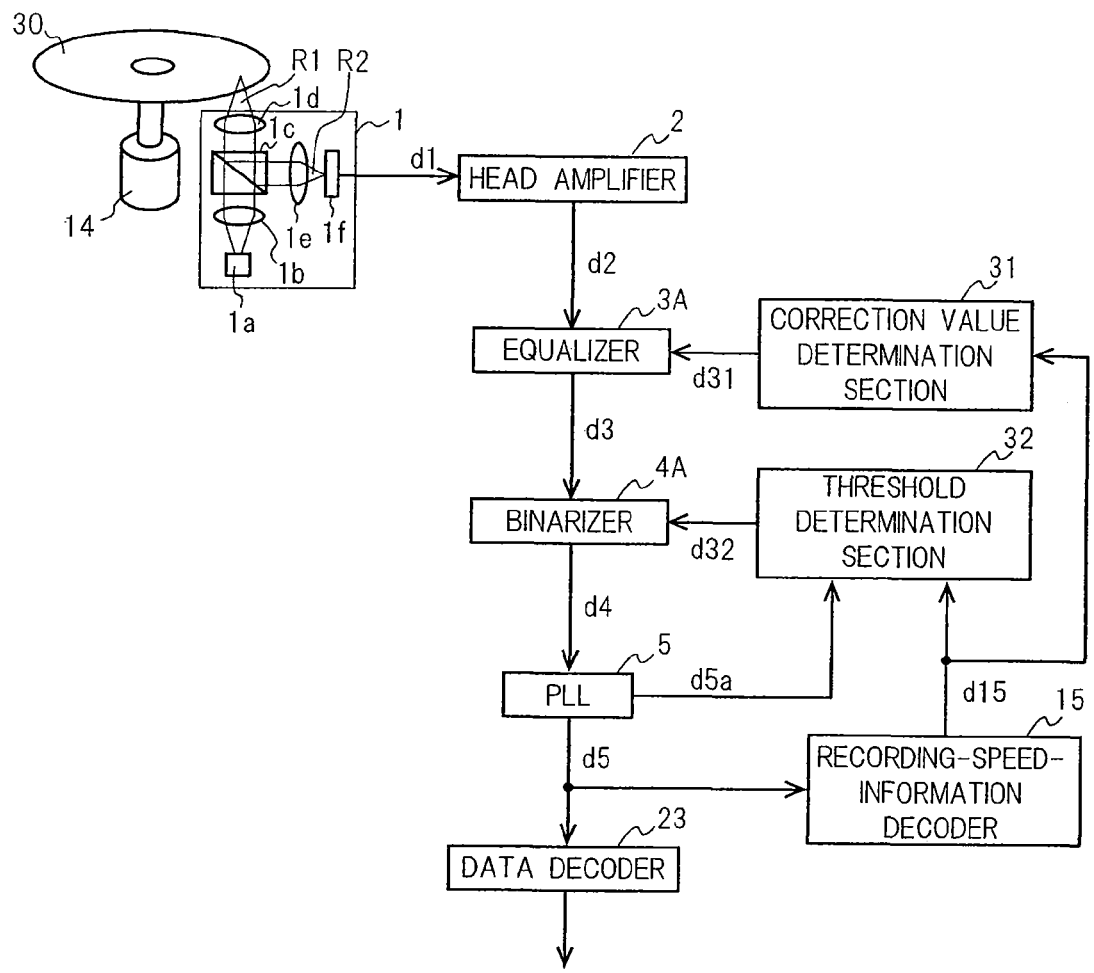
FIG. 22 is a block diagram showing a DVD player as an optical disk reproducing apparatus according to Example 9 of the invention.
Figure 23:
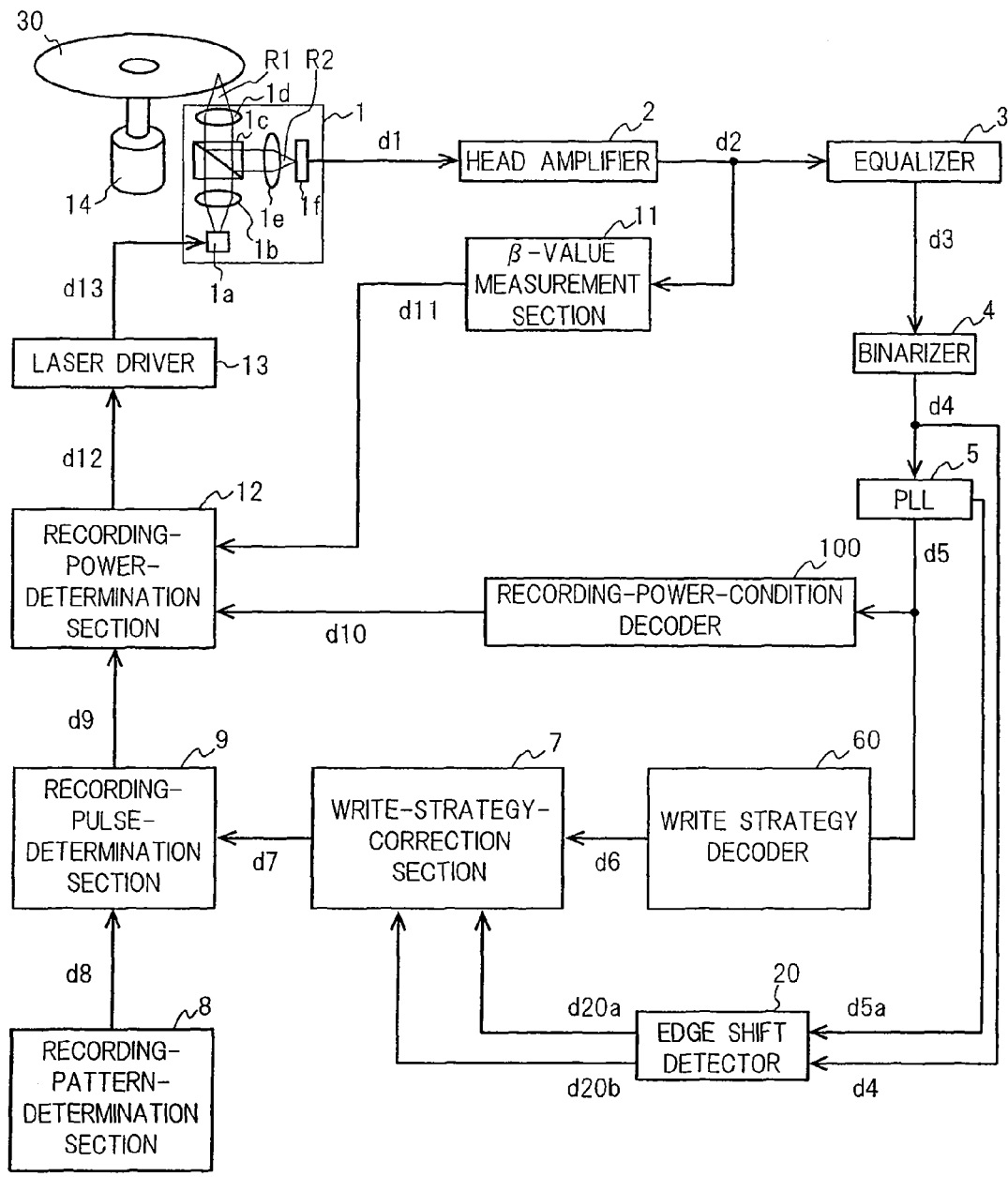
FIG. 23 is a block diagram showing an example of an optical disk recording and reproducing apparatus according to the prior art.
Figure 24:
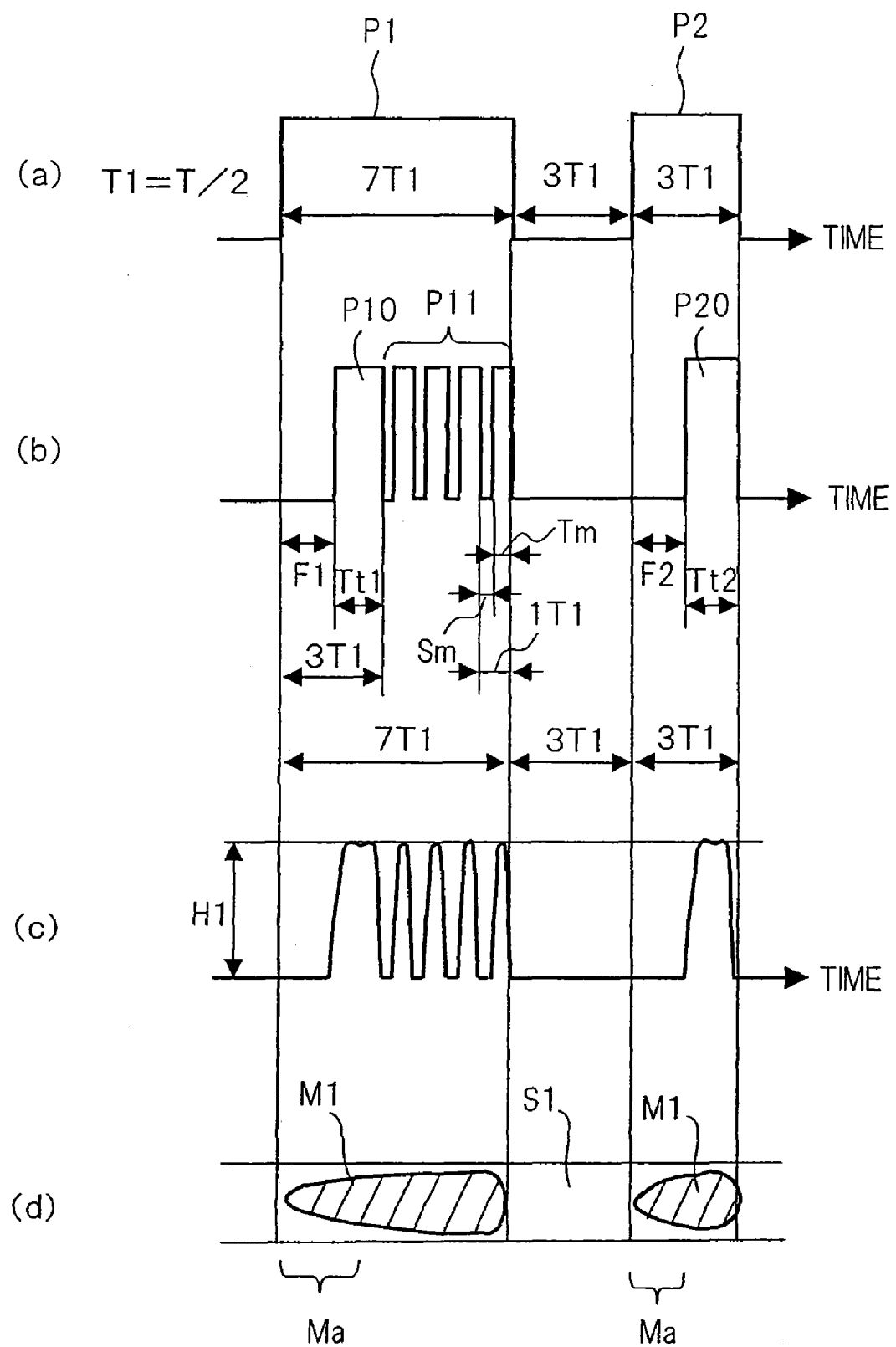
FIG. 24 is a schematic diagram showing a recording pattern, recording pulses, and recording marks when a double-speed recording of the prior art optical disk recording and reproducing apparatus adopts the write strategy used in single-speed recordings, where (a)-(c) show the waveforms of the recording pattern, the recording pulses, and laser pulses of a semiconductor laser 1a, respectively, and (d) shows recording marks M1 and recording spaces S1 formed in the recording layer of the optical disk D by the laser pulses shown in (c)

FIG. 22 is a block diagram showing a DVD player serving as an optical disk reproducing apparatus according to Example 9 of the invention. The DVD player according to Example 9 comprises the configuration similar to the reproduction block of the DVD-R recorder according to Example 2. Accordingly, the same reference symbols as those used in Example 2 designate components similar to those of Example 2, and the description of Example 2 is cited as details of the similar components.

An equalizer 3A corrects the analog signal d2 from the head amplifier 2, based on a predetermined correction value d31, and thereby performs shaping on the analog signal d2.

A correction value determination section 31 determines the correction value d31 of the equalizer 3A based on the recording speed information d5 from the recording-speed-information decoder 15. The correction value d31 is, for example, an amount of boost at each frequency band and a cut-off frequency of a filter.

A binarizer 4A compares the analog signal d3 undergoing the shaping with a predetermined threshold value, and binarizes the analog signal d3 with respect to the threshold value, thereby converting the analog signal d3 into a digital signal d4.

A threshold determination section 32 determines the threshold value d32 of the binarizer 4A based on the recording speed information d5 from the recording-speed-information decoder 15.

A data decoder 23 decodes the digital signal d5 received from a PLL 5 and extracts a target data.

The DVD player according to Example 9, when reproducing one of the titles stored on the DVD-R 30, first refers to RMD in the RMA of the DVD-R 30 or in the border-out area corresponding to the target title. The DVD player then reads the recording speed information d15 on the recording of the target title, by means of the recording-speed-information decoder 15.

The correction value determination section 31 determines the correction value d31 of the equalizer 3A based on the recording speed information d15 from the recording-speed-information decoder 15. More specifically, the amounts of boost at high-frequency bands are raised with increases in recording speed, since the amplitudes of the analog signals d2 in high-frequency bands, especially in the band corresponding to the minimum 3 T length of recording marks, decrease with increases in recording speed. The corrections may compensate for blunt waveforms of the analog signals d2 associated with increases in recording speed.

The threshold determination section 32 determines the threshold value d32 of the binarizer 4A based on a clock signal d5a of the reproduced analog signal d4 and the recording speed information d15. More specifically, the threshold value is reduced with increases in recording speed. The reason is as follows: The amount of energy absorbed in the recording layer of the DVD-R decreases with increases in recording speed, and hence recording marks shrink. Accordingly, the DC component of the analog signal d2 reproduced from the recording marks decreases, and then the mesial level drops. The above-described determination of the threshold value may compensate for the decrease of the DC component of the analog signal d2 associated with increases in recording speed.

Thus, the DVD player according to Example 9 may compensate for the distortions of the reproduced analog signal d2 caused by the deformations of recording marks associated with increases in recording speed, on the basis of the recording speed information d15 stored on the DVD-R 30. Accordingly, error rates of the reproduced digital signal d5 may be reduced.

In addition, the DVD player according to Example 9 may read the recording speed information d15 from the border-out area corresponding to the target title. Accordingly, seek times of the pickup are reduced, especially in the case of a successive playback of multiple titles. This may reduce the switching time between titles.

As clarified from the above description, the recording speed information on data recordings is recorded, together with the write strategy and the recording power condition, onto the recordable optical disk according to the invention. This allows an optical disk recording apparatus to read the recording speed information together with the write strategy and the recording power condition from the recordable optical disk in a data recording. Accordingly, the optical disk recording apparatus may search the write strategies and recording power conditions stored on the recordable optical disk for the write strategy and recording power condition appropriate to a set recording speed. As a result, the optical disk recording apparatus may optimize the write strategy and recording power condition reliably and within a short time.

In addition, an optical disk reproducing apparatus may read the recording speed information from the recordable optical disk. Accordingly, the optical disk reproducing apparatus may optimize the correction value of the equalizer and the threshold value of the binarizer to suit the recording speed of a target data of reproduction. As a result, error rates of the reproduced data may be reduced.

The optical disk recording apparatus and its method of recording according to the invention may read items of the recording speed information from recordable optical disks, together with the write strategies and the recording power conditions in data recordings. Accordingly, the optical disk recording apparatus may search the write strategies and recording power conditions stored on the recordable optical disk for the write strategy and recording power condition appropriate to a set recording speed. As a result, the optical disk recording apparatus may optimize the write strategy and recording power condition reliably and within a short time.

The above-mentioned optical disk recording apparatus and the method of recording further may search a memory in the optical disk recording apparatus for the write strategy and recording power condition appropriate to the set recording speed, when none of the write strategies and recording power conditions stored on the recordable optical disk corresponds to the set recording speed. Thereby, the optical disk recording apparatus may optimize the write strategy and the recording power condition reliably and within a short time.

The above-mentioned optical disk recording apparatus and the method of recording according to the invention, in particular, may assign to the recording pulses corresponding to the specific portions of recording marks, a recording power level higher than that assigned to the other recording pulses. Thereby, the distortions of the recording marks associated with increases in recording speed may be efficiently reduced. As a result, the optimization of the recording power levels may be reliably and rapidly achieved.

The optical disk reproducing apparatus according to the invention determines the correction value of the equalizer and the threshold value of the binarizer appropriate to the recording speed of the target data of reproduction. Thereby, the apparatus, when reproducing data, may compensate for blunt waveforms and shifts of mesial levels of reproduced analog signals caused by the distortions of recording marks associated with increases in recording speed. As a result, error rates of the reproduced data may be reduced.

The above-described disclosure of the invention in terms of the presently preferred embodiments is not to be interpreted as intended for limiting. Various alterations and modifications will no doubt become apparent to those skilled in the art to which the invention pertains, after having read the disclosure. As a corollary to that, such alterations and modifications apparently fall within the true spirit and scope of the invention. Furthermore, it is to be understood that the appended claims be intended as covering the alterations and modifications.

According to the invention, optical disk recording apparatuses may optimize the write strategies and recording power levels reliably and within a short time, with respect to any recording speed from single- to n-times speed. Therefore, the invention has an extremely high industrial applicability.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An optical disk comprising:
a storage area storing recording power condition information and recording write strategy information which correspond to recording speed information, the recording speed information being indicative of a first linear velocity and a different linear velocity from the first linear velocity, data being recorded over the entirety of a data area of said optical disk at one of said first linear velocity and said different linear velocity.

2. The optical disk according to claim 1, wherein the recording power condition information and the recording write strategy information are stored on the optical disk such that the recording power condition information and the recording write strategy information correspond to recording speed information, the recording speed information being indicative of the first linear velocity and a plurality of linear velocity different from the first linear velocity.

3. An optical disk recording method, comprising:
acquiring recording power condition information and recording write strategy information which correspond to a set recording speed, from among recording power condition information and recording write strategy information which are stored in a predetermined area on the optical disk and correspond to recording speed information, the recording speed information being indicative of a first linear velocity and a different linear velocity from the first linear velocity, data being recorded over the entirety of a data area of said optical disk at one of said first linear velocity and said different linear velocity;

determining a recording power and a recording strategy to be used based on the recording power condition information and recording write strategy information which correspond to the recording speed information and are acquired at the acquiring step; and generating laser light, according to information to be recorded, with the determined recording power and the determined recording strategy at the determining step, and recording the information to be recorded by emitting the generated laser light into a storage area in the optical disk.

4. The optical disk recording method according to claim 3, further comprising:
storing the recording power condition information and the recording strategy information which correspond to recording speed information used at the step of recording the information to be recorded, in a recording management area in the optical disk.

5. The optical disk recording method according to claim 3, wherein the determining step includes performing OPC to the storage area of the optical disk, using the recording power condition information and the recording strategy information which correspond to the recording speed information and are acquired at the acquiring step.

6. The optical disk recording method according to claim 3, wherein when no recording power condition information and no recording strategy information correspond to the recording speed which is set at the acquiring step, the recording strategy is corrected, by using recording power condition information and recording strategy information which correspond to other recording speed different from the set recording speed.

* * * * *